US012584025B2

(12) United States Patent
Virkar et al.

(10) Patent No.: US 12,584,025 B2
(45) Date of Patent: Mar. 24, 2026

(54) HIGH LOADINGS OF SILVER NANOWIRES: DISPERSIONS AND PASTES; CONDUCTIVE MATERIALS; AND CORRESPONDING METHODS

(71) Applicant: EKC Technology, Inc., Hayward, CA (US)

(72) Inventors: Ajay Virkar, San Mateo, CA (US); Xiqiang Yang, Hayward, CA (US); Amir Tork, Hayward, CA (US); Nazim Uddin, Hayward, CA (US); Xinxing Liu, Fremont, CA (US); Jiteng Xu, Hayward, CA (US); Ying-Syi Li, Fremont, CA (US); Alexander Seung-Il Hong, San Mateo, CA (US)

( * ) Notice: Subject to any disclaimer, the term of this patent is extended or adjusted under 35 U.S.C. 154(b) by 0 days.

(21) Appl. No.: 18/634,300

(22) Filed: Apr. 12, 2024

(65) Prior Publication Data

US 2024/0343923 A1     Oct. 17, 2024

Related U.S. Application Data

(60) Provisional application No. 63/459,495, filed on Apr. 14, 2023.

(51) Int. Cl.
*C09D 5/24* (2006.01)
*C09D 4/06* (2006.01)
(Continued)

(52) U.S. Cl.
CPC ................. *C09D 5/24* (2013.01); *C09D 4/06* (2013.01); *C09D 7/20* (2018.01); *C09D 7/45* (2018.01);
(Continued)

(58) Field of Classification Search
CPC ........... H01B 1/00; H01B 1/22; B22F 1/0545; C09D 5/24; C09D 11/52
See application file for complete search history.

(56) References Cited

U.S. PATENT DOCUMENTS 7,922,939 B2 *  4/2011  Lewis ................... B82Y 30/00
                                              977/773
9,530,534 B2   12/2016  Hu et al.
              (Continued)

OTHER PUBLICATIONS

Elen et al "Screen-printing of flexible semi-transparent electrodes and devices based on silver nanowire networks", Nanotechnology 29 (2018) 425201 (9pp).*
(Continued)

*Primary Examiner* — Mark Kopec
(74) *Attorney, Agent, or Firm* — Christensen, Fonder, Dardi, PLLC; Peter S. Dardi; Elizabeth A. Gallo

(57) ABSTRACT

Concentrated dispersions of silver nanowires are used to prepare qualitatively distinct silver structures with a range of properties. The concentrated dispersions can have a high weight percent of silver nanowires and can be formulated to be flowable liquids or non-flowing pastes. The concentrated dispersions can be stable with no visible settling over the course of a week, can have non-Newtonian rheology, and can be diluted to a desired weight percent of silver nanowires without detrimental effects on the uniformity of the dispersions. The concentrated dispersions can be formulated with or without polymers or pre-polymer components. The concentrated dispersions can be formulated with silver salts to adjust dispersion of the silver nanowires and to improve electrical conductivity of cured silver structures formed from the dispersions. Methods for forming the concentrated dispersions are described as are methods to form silver structures from the dispersions.

15 Claims, 26 Drawing Sheets

(51) Int. Cl.

| | | |
|---|---|---|
| *C09D 7/20* | (2018.01) | |
| *C09D 7/40* | (2018.01) | |
| *C09D 7/45* | (2018.01) | |
| *C09D 7/61* | (2018.01) | |
| *C09D 7/65* | (2018.01) | |
| *C09D 133/04* | (2006.01) | |
| *H01B 1/22* | (2006.01) | |

(52) U.S. Cl.
CPC ................. *C09D 7/61* (2018.01); *C09D 7/65* (2018.01); *C09D 7/70* (2018.01); *C09D 133/04* (2013.01); *H01B 1/22* (2013.01)

(56) References Cited

U.S. PATENT DOCUMENTS

| | | | |
|---|---|---|---|
| 10,020,807 B2 | 7/2018 | Virkar et al. | |
| 10,029,916 B2 | 7/2018 | Virkar et al. | |
| 10,714,230 B2 | 7/2020 | Hu et al. | |
| 11,136,459 B2 * | 10/2021 | Boland .................... | C08K 3/04 |
| 2014/0178247 A1 | 6/2014 | Alsayed et al. | |
| 2016/0177146 A1 | 6/2016 | Mun et al. | |
| 2016/0293289 A1 | 10/2016 | Stockum et al. | |
| 2019/0283128 A1 | 9/2019 | Saito et al. | |
| 2021/0095143 A1 | 4/2021 | Zhu et al. | |
| 2022/0256694 A1 | 8/2022 | Kambe et al. | |
| 2024/0257991 A1 * | 8/2024 | Yang ........................ | H01B 1/22 |
| 2024/0290516 A1 | 8/2024 | Virkar et al. | |

OTHER PUBLICATIONS

Hemmati et al "Synthesis and Characterization of Silver Nanowire Suspensions for Printable Conductive Media", ECS Journal of Solid State Science and Technology, 4 (4) P3075-P3079 (2015).*

Vaseem et al "High-conductivity screen-printable silver nanowire Ink for optically transparent flexible radio frequency electronics", Flex. Print. Electron. 7 (2022) 044001 https://doi.org/10.1088/2058-8585/ac97a4.*

Wu et al "Syntheses of Silver Nanowires Ink and Printable Flexible Transparent Conductive Film: A Review", Coatings 2020, 10, 865; doi:10.3390/coatings10090865 (22 pages).*

Araki et al., "Low haze transparent electrodes and highly conducting air dried films with ultra-long silver nanowires synthesized by one-step polyol method", Nano Research, 7(2) p. 236-245, (2014).

Bari et al., "Simple hydrothermal synthesis of very-long and thin silver nanowires and their application in high quality transparent electrodes", Journal of Materials Chemistry A, vol. 4, p. 11365-11371, (2016).

Bartek et al., "Silver-based reflective coatings for micromachined optical filters", J. Micromech. Microeng., vol. 9, p. 162-165, (1999).

Cassagnau, "Linear viscoelasticity and dynamics of suspensions and molten polymers filled with nanoparticles of different aspect ratios", Polymer, vol. 54, p. 4762-4775, (2013).

Chen et al., "Formulation of concentrated and stable ink of silver nanowires with applications in transparent conductive films", Electronic Supplementary Material (ESI) for RSC Advances, p. 1-4, (2016).

Chen et al., "Formulation of concentrated and stable ink of silver nanowires with applications in transparent conductive films", RSC Advances, vol. 7, p. 1936-1942, (2017).

Chiou et al., "Additive-free carbon nanotube dispersions, pastes, gels, and doughs in cresols", Proceedings of the National Academy of Sciences, vol. 115, p. 5703-58, (2018).

Doi et al., "Dynamics of Rod-like Macromolecules in Concentrated Solution, Part 1", J. Chem. Society Faraday Trans 2, p. 560-570, (1977).

Doi et al., "Dynamics of Rod-like Macromolecules in Concentrated Solution, Part 2", J. Chem. Society Faraday Trans 2: Molecular and Chemical Physics, vol. 74, p. 918-932, (1977).

Ducamp-Sanguesa et al., "Synthesis and Characterization of Fine and Monodisperse Silver Particles of Uniform Shapes," Journal of Solid State Chemistry, vol. 100 (2), p. 272-280, (1992).

Fang et al., "Effects of inclusion size on thermal conductivity and rheological behavior of ethylene glycol-based suspensions containing silver nanowires with various specific surface areas", International Journal of Heat and Mass Transfer, vol. 81, p. 554-562, (2015).

Galindo-Rosales et al., "Assessment of Dispersion Quality in Polymer Nanocomposites by Rheological Methods", Macromolecular Materials and Engineering, vol. 296, p. 1-10, (2011).

Hemmati et al., "Rheological behavior of silver nanowire conductive inks during screen printing", Journal of Nanoparticle Research, vol. 18 No. 249, p. 1-11, (2016).

Hu et al., "Flexible Transparent PES/Silver Nanowires/PET Sandwich-Structured Film for High-Efficiency Electromagnetic Interference Shielding", Langmuir, vol. 28, p. 7101-7106, (2012).

Karimi-Chaleshtori et al., "Silver nanowire-embedded PDMS with high electrical conductivity: nanowires synthesis, composite processing and electrical analysis", Materials Today Chemistry, vol. 21 No. 100496, p. 1-15, (2021).

Kim et al., "Electrically conductive polystyrene nanocomposites incorporated with aspect ratio-controlled silver nanowires", Journal of Applied Polymer Science, vol. 136 No. 36, 47927, p. 1-11, (2019).

Li et al., "Direct Writing on Paper of Foldable Capacitive Touch Pads with Silver Nanowire Inks", ACS Applied Materials & Interfaces, vol. 6 No. 23, p. 21721-21729, (2014).

Lonjon, "Low filled conductive P(VDF-TrFE) composites: Influence of silver particles aspect ratio on percolation threshold from spheres to nanowires", Journal of Non-Crystalline Solids, vol. 358 No. 23, p. 3074-3078, (2012).

Lu et al., "Preparation of highly conductive silver nanowires for electrically conductive adhesives", Journal of Materials Science: Materials in Electronics, vol. 30, p. 15786-15794, (2019).

Marani et al., "Rheological Properties of Poly (Vinylpyrrolidone) as a Function of Molecular Weight", Annual Transactions of the Nordic Rheology Society, vol. 22, p. 11-18, (2014).

Mohammadpour-Haratbar et al. "Simulation of electrical conductivity for polymer silver nanowires systems", Scientific Reports, 13:5, p. 1-11, (2023).

Park et al., "Ultrasonication Assisted Production of Silver Nanowires with Low Aspect Ratio and Their Optical Properties", Ultrasonics Sonochemistry, vol. 22, p. 35-40, (2015).

Schneider et al., "Multiscale dispersionstate characterization of nanocomposites using optical coherence tomography", Scientific Reports, vol. 6 No. 31733, p. 1-12, (2016).

Seshardri et al. "Softening in Silver-Nanowire-Filled Polydimethylsiloxane Nanocomposites", Applied Physics Letters, vol. 105, 013110, p. 1-6, (2014).

Sun et al., "Uniform Silver Nanowires Synthesis by Reducing AgNO3 with Ethylene Glycol in the Presence of Seeds and Poly(Vinyl Pyrrolidone)", Chemistry of Materials, vol. 14 Issue 11, p. 4736-4745, (2002). (Abstract Only).

Tao et al., "High-reproducibility, flexible conductive patterns fabricated with silver nanowire by drop or fit-to-flow method", Nanoscale Research Letters, 81:47, p. 1-5, (2013).

Wang et al., "New insights into silver nanowires filled electrically conductive adhesives", Journal of Materials Science: Materials in Electronics, No. 2, p. 621-629, (2014).

Wang et al., "A comprehensive study of silver nanowires filled electrically conductive adhesives", Journal of Materials Science: Materials in Electronics, vol. 26, p. 7927-7935, (2015).

Wang et al., "Isotropical conductive adhesives with very-long silver nanowires as conductive fillers", Journal of Materials Science: Materials in Electronics, vol. 28, p. 10-17, (2017).

Wang et al., "Inkjet-Printed Silver Nanowire Ink for Flexible Transparent Conductive Film Applications", Nanomaterials (Basel), 12(5):842, p. 1-15, (2022).

Wierenga et al., "Low-shear viscosity of isotropic dispersions of (Brownian) rods and fibres; a review of theory and experiments", Colloids and Surfaces A: Physicochemical and Engineering Aspects, vol. 137 Issue 1-3, p. 355-372, (1998).

(56) References Cited

OTHER PUBLICATIONS

Wu et al., "Development of a Novel Isotropic Conductive Adhesive Filled with Silver Nanowires", Journal of Composite Materials, vol. 40 Issue 21, p. 1961-1969, (2005).

Wu et al., "Transparent conductive film by large area roll-to-roll processing", Thin Solid Films, vol. 544, p. 427-432, (2013).

Wu et al., "New insights into silver nanowires filled electrically conductive adhesives", Journal of Materials Science: Materials in Electronics, vol. 26, p. 621-629, (2014).

Zhang et al., "Electrically Conductive Adhesives with Sintered Silver Nanowires", International Conference on Electronic Packaging Technology & High Density Packaging, p. 834-837, (2009).

Zhu et al., "Silver Nanowires Contained Nanofluids with Enhanced Optical Absorption and Thermal Transportation Properties", Energy & Environmental Materials, 0, p. 1-8, (2019).

International Search Report from corresponding Patent Application No. PCT/US2024/024436 dated Sep. 5, 2024.

\* cited by examiner

HIGH LOADINGS OF SILVER NANOWIRES: DISPERSIONS AND PASTES; CONDUCTIVE MATERIALS; AND CORRESPONDING METHODS

CROSS REFERENCE TO RELATED APPLICATIONS

This application claims priority to U.S. provisional patent application 63/459,495 to Virkar et al. filed Apr. 14, 2023, entitled "High Loadings of Silver Nanowires Dispersions and Conductive Pastes; and Corresponding Methods," incorporated herein by reference.

FIELD OF THE INVENTION

The invention relates to high concentration silver nanowire dispersions, methods of making the dispersions and uses thereof. The invention further relates to highly conductive silver nanowire deposits and the use of silver salts to improve dispersion of the silver nanowires and to significantly improve electrical conductivity of cured metallic structures.

BACKGROUND OF THE INVENTION

Silver nanowires have been explored for various applications since the development of suitable solution based synthesis approaches that are suitable for commercial scale synthesis. In particular, there has been interest in the formation of transparent conductive films due to the ability of the nanowires to be coated as a sparse metal layer allowing for the transmission of light yet providing useful electrical conductivity. The conductive properties of metal nanowires along with their flexibility suggests utility also for devices, such as sensors, current collectors and the like.

Other forms of silver and other metal nanoparticles and microparticles have found utility as conductive fillers and the like to inclusion in composite materials. Such materials can be used for forming conductive metal traces, shielding, grounding elements and the like.

SUMMARY OF THE INVENTION

In a first aspect, the invention pertains to a flowable concentrated dispersion comprising silver nanowires and polymer dispersant in a polar solvent, wherein the dispersion exhibits non-Newtonian viscosity, no visible settling over the course of a week, and is a stable dispersion when diluted to a concentration of 0.1 wt % with isopropyl alcohol. The flowable concentrated dispersion may comprise at least about 8 wt %, at least about 15 wt %, or at least about 20 wt % of the silver nanowires, and the aspect ratio can be greater than 25. The polar solvent may comprise a volatile polar solvent and/or solvents including monomers, oligomers, or polymers that can polymerize and/or crosslink upon further processing, such as drying, heating, irradiation, blending with additional reactants, combinations thereof, or other suitable approach. The non-Newtonian viscosity can comprise shear thinning even without the addition of a thickener. In some embodiments, a salt such as a silver salt can be included in the dispersion. The silver salt can be included at any amount, for example, such that the dispersion comprises up to about 50 wt % silver ions relative to the weight of the silver nanowires. The flowable concentrated dispersion can include a reducing agent when silver salts are present. The reducing agent can be an additive such as an inorganic salt or an organic salt or other organic component. The reducing agent can also comprise the volatile polar solvent and/or solvents including monomers, oligomers, or polymers. The flowable concentrated dispersion exhibits flow when placed on a surface at a 60 degree angle from the horizontal.

In another aspect, the invention pertains to the flowable concentrated dispersion used to form conductive composites and adhesives. The dispersion can exhibit a viscosity of at least about 100 cP, or from about 500 cP to about 5000 cP, when subjected to a shear rate of 0.1 s$^{-1}$. Conductive composites and adhesives, or other solid materials, can be formed upon further processing as described above. Curing can further comprise reduction of metal salts, such as silver salts, when included in the dispersion.

In a further aspect, the invention pertains to a flowable dispersion comprising silver nanowires, polymer dispersant and silver salt in a polar solvent, wherein the dispersion exhibits non-Newtonian viscosity at a shear rate of 0.1 s$^{-1}$. The silver nanowires have an average aspect ratio from about 30 to about 1000 and are present at an amount of at least about 5 wt % of the flowable dispersion. The silver salt is present at an amount of at least about 1 wt % of the silver nanowire weight. The flowable dispersion may exhibit no visible settling over the course of a week and can be a stable dispersion when diluted to a concentration of 0.1 wt % with isopropyl alcohol. The polar solvent may be any of those described above for the flowable concentrated dispersion. The flowable dispersion may be further processed as described above for the flowable concentrated dispersion. The flowable dispersion may comprise at least about 8 wt %, at least about 15 wt %, or at least about 20 wt % of the silver nanowires. The silver salt can be included at any amount, for example, such that the dispersion comprises up to about 50 wt % silver ions relative to the weight of the silver nanowires. The flowable dispersion may comprise at least about 8 wt % silver nanowires and from about 5 wt % to about 50 wt % silver ions relative to the weight of silver nanowires. The flowable dispersion can include a reducing agent. The reducing agent can be an additive such as an inorganic salt or an organic salt or other organic component. The reducing agent can also comprise the volatile polar solvent and/or solvents including monomers, oligomers, or polymers. The flowable dispersion exhibits flow when placed on a surface at a 60 degree angle from the horizontal.

In a further aspect, the invention pertains to an electrically conductive material comprising at least about 95 wt % silver, wherein the silver has a structure formed from the reduction of silver salt in the presence of a silver nanowire deposit comprising at least about 50 wt % of the silver originating from silver nanowires having an aspect ratio of at least about 30. In some embodiments, the silver is formed from a reduced silver salt and at least about 75 wt % silver nanowires having an aspect ratio of at least about 50. The some embodiments, the silver is formed from at least about 90 wt % silver nanowires. The electrically conductive material can have a resistivity of no more than about $1\times10^4$ Ohm-cm or from about $5\times10^{-5}$ Ohm-cm to about $4\times10^{-6}$ Ohm-cm.

In a further aspect, the invention pertains to a silver paste consisting essentially of a uniform distribution of silver nanowires and optional additional silver nanostructures, a polymer dispersant, optionally a salt providing up to about 50 wt % metal ions relative to the weight of silver nanowires, and polar solvent, wherein the dispersion is stable with respect to phase separation and does not flow under zero shear, and wherein dilution and non-damaging mixing of the electrically conductive dispersion with isopropyl alcohol to a metal concentration of 0.1 weight percent results in a well dispersed solution. In some embodiments, the silver nanowires have an average aspect ratio of at least about 250, and the total metal concentration can be at least about 12 wt % with at least about 80 wt % of the metal being silver nanowires. In some embodiments, the silver nanowires have an average aspect ratio from about 15 to about 250, and the total metal concentration is at least about 25 wt % with at least about 80 wt % of the metal being silver nanowires. The silver paste can comprise a salt providing up to about 50 wt % silver ions relative to the weight of silver nanowires. The silver paste can be spread with the application of shear and, on a surfaced inclined 60 degrees from the horizontal, does not flow. The silver paste can have resistivity of no more than about $5 \times 10^{-2}$ Ohm-cm.

In a further aspect, the invention pertains to a method of forming a concentrated silver nanowire dispersion. The method comprises: evaporating a low boiling temperature solvent component of a silver nanowire dispersion comprising a polar solvent, wherein the low boiling solvent temperature component has a boiling point at atmospheric pressure of no more than about 125° C. and wherein removal of the low boiling temperature solvent component results in the formation of a well dispersed concentrated silver nanowire dispersion with a solid concentration of at least about 5 wt %, wherein prior to evaporating the low boiling temperature solvent component, the silver nanowire dispersion is a stable dispersion with no more than about 10 wt % silver nanowires. The silver nanowire dispersion can include a silver salt with the polar solvent being a low boiling solvent, wherein the silver salt is present at an amount to provide from about 1 wt % to about 50 wt % silver ions relative to the silver nanowire weight. In some embodiments, following removal of the low boiling temperature solvent component, the concentrated silver nanowire dispersion comprises from about 10 wt % silver nanowires to about 70 wt % silver nanowires. The concentrated silver nanowire dispersion can be flowable. The concentrated silver nanowire dispersion can be a paste. The method may further include curing the concentrated silver nanowire dispersion to form a conductive silver based material.

In a further aspect, the invention pertains to a method for forming an electrically conductive solid structure comprising silver. The method comprises: heating a three dimensional deposit comprising silver nanowires and silver salt at a temperature of at least about 120° C. for at least about 5 minutes to reduce the silver salt to form the electrically conductive solid structure, the deposit prior to curing having at least about 25 wt % silver nanowires and at least about 1 wt % silver ions relative to the silver nanowire weight. The three dimensional deposit can comprise a concentrated silver nanowire dispersion and a polar solvent and the polar solvent can be removed by blowing gas across the three dimensional deposit. The electrically conductive solid structure comprises a cured material comprising at least about 25 wt % silver or at least about 95 wt % silver. The electrically conductive solid structure can have a resistivity of no more than about $1 \times 10^{4}$ Ohm-cm, or from about $5 \times 10^{-5}$ Ohm-cm to about $4 \times 10^{-6}$ Ohm-cm. The electrically conductive solid structure can be opaque and have an average thickness of at least about 2 microns.

In a further aspect, the invention pertains to a composite material comprising an opaque structure of at least about 5 wt % of a polymer matrix and at least about 25 wt % silver, wherein the silver is formed with a mass of silver nanowires in a three dimensional structure through which silver salt is reduced to silver metal to contribute to an electrical conductive composite. The composite material can comprise at least about 50 wt % silver, or from about 75 wt % silver to about 90 wt % silver. The silver formed by reducing the silver salt can provide from about 2 wt % to about 40 wt % of silver relative to the silver nanowires. The composite material can have a resistivity of no more than about $1 \times 10^{-3}$ Ohm·cm, or from about $5 \times 10^{-5}$ Ohm-cm to about $4 \times 10^{-6}$ Ohm-cm.

In a further aspect, the invention pertains to a dispersion of silver nanowires consisting essentially of a uniform distribution of at least about 8 wt % silver nanowires and optional additional silver nanostructures, polymer dispersant, optionally a silver salt providing at least about 0.5 wt % silver ions relative to the silver nanowire weight, and polar solvent, wherein the dispersion is stable with respect to phase separation, and wherein dilution and non-damaging mixing of the electrically conductive dispersion with isopropyl alcohol to a metal concentration of 1 weight percent results in a well dispersed solution. The dispersion can be flowable.

The dispersion can be a non-flowable paste.

DETAILED DESCRIPTION OF THE INVENTION

Figure 1:
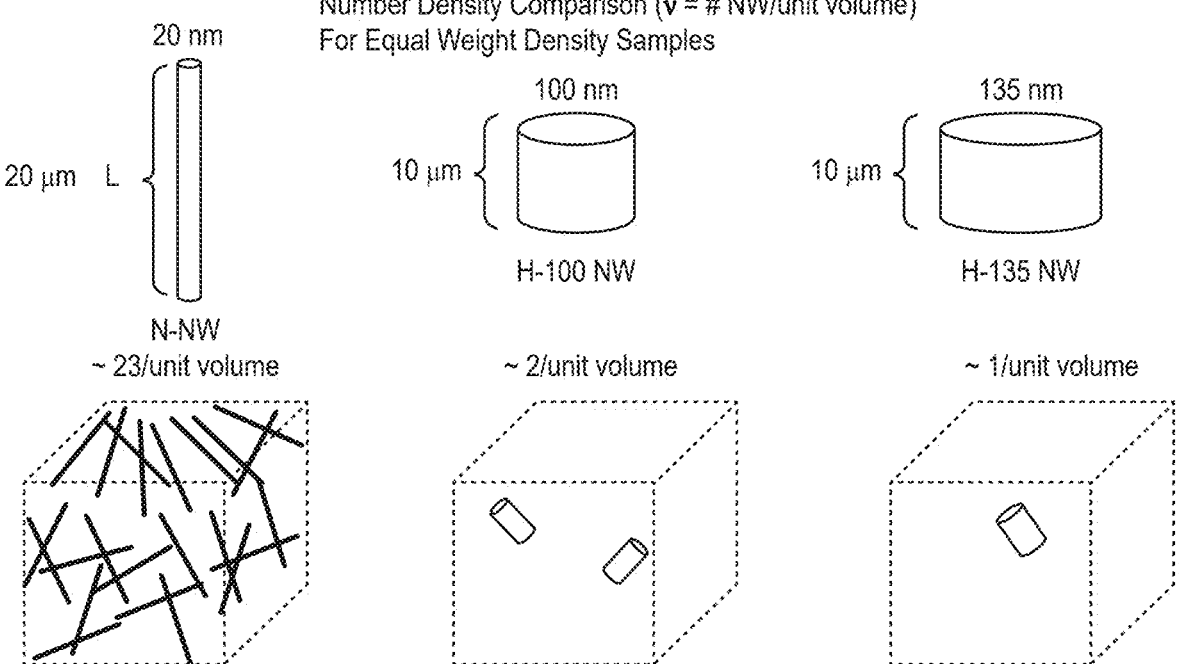
FIG. 1 is a schematic diagram comparing dispersion number densities for nanowires with different physical dimensions to show how number density varies significantly with particle size at the same weight densities.

The formation of materials with high loading of silver nanowires are described to form a range of qualitatively distinct material types. Based on an understanding of the rheology and properties of the components of the dispersions, the achievable loadings in appropriate solvents can be used to guide dispersion formation as well as product materials using the concentrated dispersions. The dispersions can be stable with respect to avoiding non-dispersible aggregates, and appropriate approaches for evaluation of stability are elucidated. The dispersions, which can take the form of high concentration flowable liquids or non-flowing pastes, can be free of dispersants and resin other than residual polyvinylpyrrolidone from silver nanowire synthesis, or the high concentration dispersions can be formed in liquid polymer matrix precursors. In other embodiments, the high concentrations of silver nanowires can be used to formulate high metal loading composites with polymers or solid materials with high amounts of silver nanowires and low amounts of polymer, in either case to form materials with moderate to high electrical conductivity. Silver salts have been found to provide surprising effects on high concentration dispersions and, subsequent reduction of the silver ions to silver can improve conductivity. Upon curing of the highly loaded material with silver salt to reduce the silver ions to silver metal, a conductive material can be formed with significantly increased conductivity due to the reduced salt, which is adapted from Applicant's Nanoglue® technology. Processing of silver salts to improve electrical conductivity of dry deposited material involve application of more heat over a longer time relative to previous work involving transparent conductive films, which seems to be related to slower rates of reduction of silver ions. Electrical resistivities comparable to values for metals, such as iron, have been achieved from cured flowable deposits. These materials provide alternative commercial material for the formation of highly conductive structures applied in flowable form as well as introducing novel paste-like conductive materials for various conductive applications. Unless specified otherwise, conduction herein refers to electrical conduction, although similarly high thermal conduction generally also would be obtained.

While high concentrations in dispersions greater than 10 wt % can be stably formed with long, thin silver nanowires, even higher concentrations can be achieved using silver nanowires with lower aspect ratios, although the aspect ratios are still relatively high such that the nanowires are suitable for forming highly conductive structures. In appropriate solvents, pastes can be formed that do not flow, but are spreadable, readily processable, and dispersible into stable dilute dispersions. The pastes can be stable but still maintain a high-volume fraction of solvent. Some of the concentrated dispersions and ancillary materials formed from the concentrated dispersions can consist essentially of solvent, the silver nanowires, optional additional metal nanostructures, from about 0.1 wt % to about 60 wt % of polymer dispersant soluble in the solvent relative to the silver weight, optional polymer matrix precursors, and optional salt having metal cations, in which these compositions may lack a polymer matrix and other additives that materially alter the rheology of electric conductivity relative to the enumerated constituents. As the silver nanowire concentration is increased in the paste a transition takes place reminiscent of a crossing of a percolation threshold past which the resistivity drops significantly. Processing can be based on formation of a good dilute dispersion in a favorable low temperature boiling solvent and then performing a desired solvent transfer and concentration through removal of at least most of the original solvent.

Polymer dispersants are generally solid polymers that dissolve into the solvent as a process aid that generally gets incorporated into a final material as an organic component. Polyvinylpyrrolidone is generally a polymer dispersant that carries over from silver nanowire synthesis. Polyvinylpyrrolidone copolymers may be similarly useful. Other polymer dispersants can include, for example, polysaccharides, such as cellulosic polymers, such as cellulose ethers and/or cellulose esters. Some solvents can be liquid polymer precursors or oligomers that may be cured into a polymer during final product formation. Thus, solvents may or may not be removed during processing. While the high concentration dispersions and pastes provide surprising properties, ultimate dried and further processed compositions formed from the dispersions provide a potential range of new products. In appropriate embodiments, a polymer matrix can be formed from polymer matrix precursors, such as monomers, oligomers, dissolved binder polymers and/or crosslinkable resin.

It has been discovered that the use of metal salts, in particular silver salts, can be reduced during curing of the material to convert the silver ions to metal to significantly lower the electrical resistivity. It has not yet been determined how the reduced silver metal is positioned within the ultimate conductive structure. Also, the metal salts have also been found to result in surprising material changes for a paste-like dispersion upon more mild heating than used to reduce the silver. It is not known why the silver salts seem to melt or soften the material at high silver nanowire concentrations with relatively mild heating for a shorter period of time.

Silver nanowires have been of significant interest for their ability to form transparent conductive structures. Silver is of particular interest due to the high electrical conductivity of silver. Based on their effective one-dimensional nature, silver nanowires can be spread across a surface to form a sparse layer through which visible light can pass. Nevertheless, the long length results in many crossing points of the nanowire that result in potential conduction pathways. Due to the two-dimensional nature of the sparse layer, the junction resistance for conduction between adjacent silver nanowires can be significant. Chemical fusing of the silver nanowire junctions based on thermodynamic preference for metal deposition at the nanowire junctions can be effective to reduce or eliminate the junction resistance through the formation of a unitary structure. See, for example, U.S. Pat.

No. 10,029,916 to Virkar et al., entitled "Metal Nanowire Networks and Transparent Conductive Material," and 10,020,807 to Virkar et al., entitled "Fused Metal Nanostructured Networks, Fusing Solutions With Reducing Agents and Methods for Forming Metal Networks," both of which are incorporated herein by reference.

In the context of nontransparent conductive materials, silver nanowires can be loaded into polymers, such as adhesives, to form electrically conductive fillers, adhesives and the like. See, for example, copending U.S. patent application Ser. No. 18/376,952 to Virkar et al., entitled "Silver Nanowire and Noble-Metal Coated Silver Nanowire Conductive Polymer Composites With Low Loading Percolation Conduction," incorporated herein by reference. The use of silver nanowire loaded composites for forming adhesives is described in published U.S. patent application 2016/0177146A to Mun et al. (hereinafter the '146 application), entitled "Adhesive Film and Display Member Including the Same," incorporated herein by reference. Based on Applicant's previous work on fusing, soluble metal salts, such as silver salts, can be added to the concentrated dispersions. The salts seem to influence the rheology in these concentrated dispersions, and as such they can be used to adjust the rheology and may be useful to influence the electrical conductivity. The metal salts can generally be added up to about 60 wt % metal ions relative to the weight of the silver nanowires.

Silver nanowires are generally synthesized in solution reactions generally involving a diol as a solvent and reducing agent and polyvinylpyrrolidone or the like as a capping agent that under appropriate conditions favors nanowire formation over other nanoscale particle shapes. For the formation of transparent conductive layers, it has generally been desirable to form thinner nanowires with long lengths. Thin nanowires scatter less light and are therefore optically superior to thicker nanowires; two dimensional films composed of longer nanowires are typically desirable because they contain fewer junction points for a given loading of silver and therefore form films with less junction resistance. Transparent conductive layers require thin coatings, and low silver content in order to achieve good optical properties. To form a silver nanowire based transparent conductive layer, typically a substrate is coated from relatively dilute inks with low viscosity and low weight percent of silver (typically <0.2 wt %). Therefore, much of the effort in the field of silver nanowires has been directed to optimization of thin, long, silver nanowires which are dispersed at low loadings—i.e. low weight and volume precents of high-aspect ratio nanowires. The synthesis of thin silver nanowires at commercial scale has been described in U.S. U.S. Pat. No. 10,714,230 B2 to Hu et al. (hereinafter the '230 patent), entitled "Thin and Uniform Silver Nanowires, Methods of Synthesis and Transparent Conductive Films Formed from the Nanowires," incorporated herein by reference. The nanowires formed in the '230 patent have been found to yield transparent conductive films with good sheet resistance values and excellent optical qualities. In these transparent conductive films, the resistivity is limited by the amount of silver present since the intrinsic resistivity of the silver provided boundaries on the electrical conduction.

While the nanowire large aspect ratio is a significant factor in terms of establishing electrically conductive pathways and narrow diameters can be helpful to obtain desirable optical qualities, for non-transparent applications it can be beneficial to back off from nanowire dimensions that are highly desirable for transparent conductors. While significantly concentrated samples were formed with state of the art silver nanowires for transparent conductor applications (Applicant's-C3 nano Activegrid™ GEN7 and GEN8 inks), higher concentration dispersions and pastes were achievable with nanowires having a smaller aspect ratio. To some degree, this can be traced to a rheology issue. With longer and thinner nanowires, the viscosity grows to very high values at relatively low loadings. While the rheology of spherical particle based dispersions, for example silver nanoparticles in solvents, has been studied in great detail and can be fit to existing models and theoretical equations and frameworks quite nicely, the complexities associated with the 1-D and considerable aspect ratios which are features of silver nanowires introduce, new and unexpected features and behaviors in higher loading dispersions where the solid particle interaction can dominate the rheology.

This dichotomy can be understood by examining the character of dispersed nanowires. Referring to FIG. 1, a comparison is schematically shown for longer and thinner nanowires and shorter and thicker nanowires. The shorter and thicker nanowires of the type-2 version still have an aspect ratio of about 100, so the nanowires have plenty of length for establishing conductive pathways. While the cartoon in FIG. 1 deemphasizes the aspect ratio, the distinctions regarding silver loading in a dispersion seems clear. It is not difficult to imagine that the dispersion with the larger number of longer and thinner nanowires has a higher viscosity relative to the dispersion with the shorter nanowires, either thin or thicker. The Examples below demonstrate this effect very clearly. Those studying dispersions of one-dimensional structures like AgNWs can gain some insight into the system properties by estimating a dimensionless number β,—which is defined below and reflects the non-spherical nature of the nanowires convoluted with the concentration in a way that is reflected in the resulting rheology. The significance of this parameter in the context of polymer solutions is discussed in Wierenga et al., "Low-shear viscosity of isotropic dispersions of (Brownian) rods and fibres; a review of theory and experiments," Colloids and Surface A: Physicochemical and Engineering Aspects 137 (1998) 355-372, incorporated herein by reference. The rheology of formulated screen printing inks which contain additional polymers with silver nanowires at concentrations up to 7 wt % are described in Hemmati et al., "Rheological behavior of silver nanowire conductive inks during screen printing," J Nanopart Res (2016) 18:249, incorporated herein by reference. This parameter corroborates observed significance of the aspect ratio of the silver nanowires.

Figure 2:
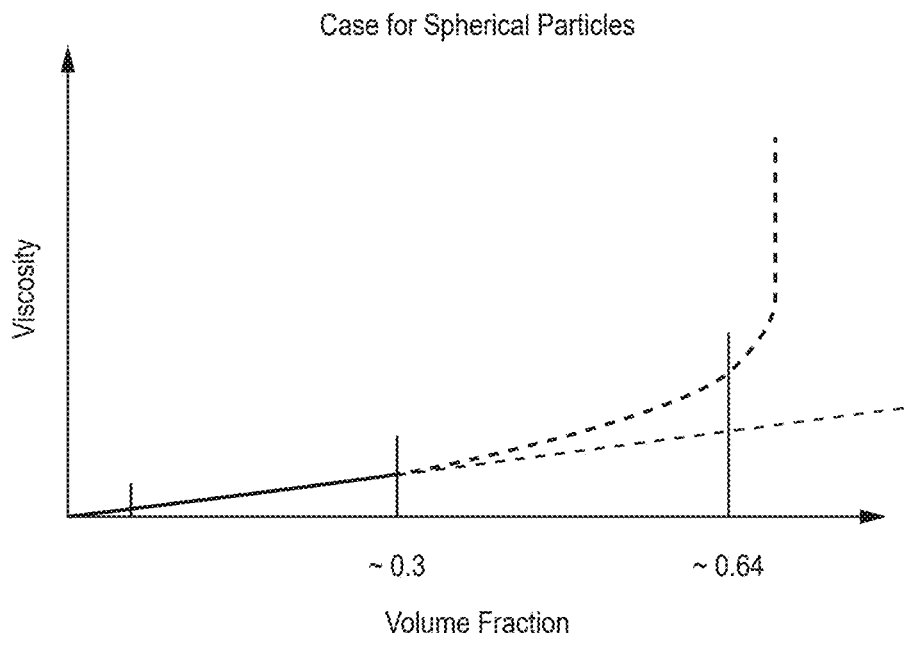
FIG. 2 is a schematic plot of viscosity as a function of volume fraction of solid spherical particles at a set low shear rate noting a transition to non-Newtonian behavior followed by a sharp increase in viscosity upon approaching a close pack density of particles.

Dilute particle dispersions in Newtonian fluids (most common solvents) generally exhibit Newtonian rheology with the viscosity proportional to the volume fraction of the particles in solution. For spherical particles of equal size, the opposite limit is a densely packed system. If particle-particle interactions do not inhibit particle packing, a closest-packed structure of equal sized spherical particles has a volume fraction of 0.52% to 0.74% depending on the particle stacking order. At such a density, solvent can only be present in interstitial locations between the particles. But from a dispersion perspective, the viscosity sharply increases making mixing extremely difficult somewhat below the closest-packing volume fraction. This is shown schematically in FIG. 2. Non-Newtonian rheology is exhibited well below the volume fraction limit. Non-Newtonian viscosity was theoretically predicted for concentrated solutions of flexible rods, see Doi and Edwards, "Dynamics of Rod-like Macromolecules in Concentrated Solution, Part 2," J. Chem. Soc., Faraday Trans. 2, 1978, 74, 918-932. The non-Newtonian behavior is generally in the form of shear thinning, in which the viscosity drops as a function of the shear rate. For shear thinning fluids, such as honey, as the mixing speed increases, the viscosity decreases. On the other hand, shear thickening is another form of non-Newtonian fluid behavior in which the viscosity increases upon applying shear. The Examples below provide results exhibiting either shear thinning or shear thickening behavior. Generally, fluids under extreme shear exhibit non-linearities, but the non-Newtonian behavior can be exhibited at low shear rate, such as 0.1 s$^{-1}$.

Figure 3:
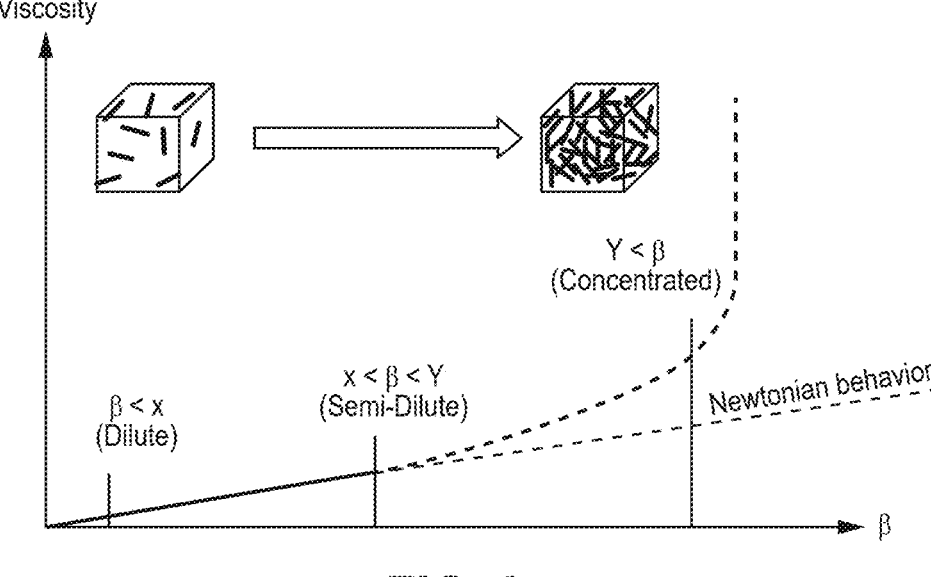
FIG. 3 is a schematic plot of viscosity as a function of nanowire density noting changes between different densities exhibiting different material behavior.

FIG. 3 schematically depicts the qualitative rheology behavior for silver nanowires. The rheology behavior though depends on the nanowire geometry. For longer and thinner nanowires, the viscosity becomes too large to effectively mix the dispersion at relatively low metal loadings. With appropriate adjustment of the silver nanowire dimensions, it is possible to get high metal loadings such that highly conductive pastes can be formed. To our knowledge, nothing close to these systems have been formed or even remotely contemplated prior to the current work. These highly conductive pastes are a remarkable material that seem to involve surprising stabilization mechanisms, which by analogy to hydrogels, would seemingly involve some form of physical crosslinking perhaps due to entanglement of the nanowires. Electrical conduction involving percolation seemingly relies on the ability to form the highly concentrated dispersions whereby, despite the presence of relatively large amounts of solvents and insulating organic materials, the metallic nanowires interact sufficiently to achieve good electrical conductivity even without removing the solvent.

Applicant has achieved considerable understanding around the formation of transparent conductive films using silver nanowires. In the two dimensional transparent films, electrical resistance is dominated by junctions between the nanowires, and the two dimensional form imposes formation of many junctions due to the large aspect ratio of the silver nanowires. In this context, Applicant developed fusing technology allowing for the formation of unitary structures termed fused metal nanostructured networks that provide for electrical conduction directly along the structure. This fusing technology is based on in situ reduction of metal salts in contact with the silver nanowires and inducing the reduction in a thin film to provide for thermodynamic driving preferentially at nanowire junctions. The direct electrical conduction along the fused unitary structure circumvents the need for electron percolation. The transparent structures are basically two dimensional structures involving sparse metal layers to allow for light transmission through the film.

Three dimensional opaque material may introduce different metal nanowire configurations. In high metal loading composites or materials with low organic amounts relative to the silver, the three dimensional opaque materials again have many points of interaction between silver nanowires. At low loading of metal nanowires in three dimensions involving a polymer matrix, the interactions between the metal nanowires are more obscure. While not wanting to be limited by theory, similar to Applicant's work on the more two-dimensional transparent conductive films, the deposited metal formed from reduction of metal salts, such as silver salts, may be thermodynamically driven to interconnect particles and particularly to contribute to formation of a conductive network. As used herein and fairly consistently used in the art, three dimensional conductive structures refer the structures with many times the silver nanowire diameters so that in a deposit any cross section through the material passes through many nanowires along a thickness parallel to a conceptual cut.

While transparent conductive films can be sparse to allow light to pass through the material, transparent structures impose restrictions on the thickness, which correspondingly limits the resistance for electrical conduction through the material. To provide for larger current flow, greater thicknesses are generally involved with corresponding loss of transparency. Highly conductive material structures are generally opaque, but intermediate thickness materials can provide some degree of light transmittance and translucent materials are contemplated. In general, highly conductive silver based materials can have an average thickness of at least a micron, in further embodiments at least 2 microns, in some embodiments at least 5 microns, and in other embodiments from about 10 microns to about 5 mm. Generally, there are no upper limits on the thickness, but there are practical limits of diminishing returns and cost. A person of ordinary skill in the art will recognize that additional ranges of thicknesses within the explicit ranges above are contemplated and are within the present disclosure.

At higher loading levels, it seems that the nanowires potentially intertwine in the materials. At the lower metal loading, more random silver nanowire orientations seem likely, although no detailed examination of such materials are known. With the incorporation of the reducible metal ions, composite materials with low resistivities have been demonstrated at <5 wt % silver, competitive with commercial adhesives which utilizes substantially more metal or other conductive fillers to achieve the same resistivities, as described further below. The reducible metal ions can be provided using an appropriate silver composition. The silver composition should be dissolvable in whatever solvent is relevant in forming the ink. The nature of the dissolved silver compositions in the solvent is not particularly relevant as long as the silver can be reduced in the processing of the composite. The solubility provides for appropriate mixing through the ink, but especially in non-aqueous solvents, the solvated nature of the metal composition may be not straightforward. Also, in three dimensional structures, it seems plausible that activation energies for diffusion are higher and general kinetics are slowed substantially compared with transparent conductive film structures, and this distinction may also explain why potentially longer times and higher temperatures may be required to achieve the lowest resistivities. Furthermore, catalysts and/or reducing agents distinct from the solvent can be added to reduce activation barriers and reduce the soluble silver ions.

Similar high conductivity silver structures have been discovered by Applicant in dried low polymer silver structures. These dense silver deposits have been found with resistivities on the order of a reasonable fraction of bulk silver. See, copending U.S. patent application Ser. No. 18/422,732 to Yang et al. (hereinafter the '732 application), entitled "Formation of Electrically Conductive Layers At Near Ambient Temperature Using Silver Nanoparticulate Processing and Inks for Forming the Layers," incorporated herein by reference. A common feature seems to be the formation of a structure with closely packed silver nanoparticulates. These structures were formed with moderately concentrated silver nanowire dispersions and low amounts of polymer binder to improve adhesive properties. For these systems, the use of silver salts in the dispersions (Nanoglue®) was found to provide minor changes in electrical conductivity. The work in the '732 application involving silver salts involved short process times and room temperature at low heat levels, which were found to be very effective for forming transparent conductive films. Based on the work herein, it is found that metal reduction involving silver salts in dense or less sparse metal layers can involve greater amounts of time at higher temperatures, so the silver reduction results in the '732 application may not have fully exploited this potential conduction improvement approach.

In contrast with the work in Applicant's '732 application, the present work achieves high electrical conductivity through the introduction of silver salts that are reduced following deposition. Again, low resistivities can be achieved comparable to metal resistivity values and several times the resistivity of bulk silver. The amount of silver from the reduced silver salt can be from a few percent to a significant fraction of the total silver amount. Slightly higher values of resistivity have been obtained by Applicant using silver particulate blends, with silver nanowires mixed with silver flakes and/or silver micron particles, along with up to 50 wt % polymer binder and reduced silver salt. See copending U.S. provisional patent application 63/540,772 to Virkar et al., entitled "Silver Nanowire Based, Electrically Conductive Inks, Pastes and Electrically Conductive Adhesives," incorporated herein by reference, now included in U.S. patent application publication US 2025/0101238 A1. In contrast, the highly conductive dry deposits in present work essentially is directed to materials with primarily silver nanowires and optionally reduced metal salts and optionally silver nanoparticles for nucleation of salt reduction. The materials herein following solvent removal may have, in some embodiments, little or no binder, a small amount of polymer dispersant and reduced silver salt to improve electrical conductivity, and in other embodiments, a high loading in a polymer matrix having at least about 25 wt % metal.

The processing to reduce silver salts in these denser metal deposits to form highly conductive structures involves heat treatment generally at temperatures of at least about 115° C. for at least about 5 minutes. This processing is described in detail below. In contrast with earlier work involving transparent conductive films to form fused metal nanostructured networks, the metal deposition may not take place primarily or even significantly in the context of drying, although this may not be clear since some solvents boil at a significantly higher temperatures. A reducing agent can be a higher boiling point solvent, a specifically added reducing agent, or a polymer, such as a polymer or polymer precursor used for forming a polymer matrix. A higher boiling point solvent can be used such that the solvent persists to perform the silver reduction over the longer time frame involved in the metal reduction process in these three dimensional materials.

The ability to form high concentration silver nanowire dispersions opens up the possibilities for forming a range of significant new materials. In some embodiments, the high concentration dispersions of silver nanowires can be directly formed into highly conductive silver deposits, with or without the use of reduced silver salts, Nevertheless, to form materials with desirable mechanical properties and good adhesion for specific applications, it can be useful to form composites of the silver nanowires in a polymer matrix, such as for the formation of electrically conductive adhesives or other composites. With the use of reduced silver salts, surprisingly low resistivity values have been obtained over a wide range of loading levels of silver in a polymer matrix. These new materials are then able to provide desirable mechanical properties due to the polymer matrix while providing good electrical conductivity. At lower loading levels of no more than 25 wt % metal, these remarkable novel materials are described in copending U.S. provisional patent application 63/551,737 to Virkar et al. (hereinafter the '737 application), entitled "Conductive Composites, Inks and Adhesives, With Low Silver Nanowire Loading and Low Resistivity and Methods for Forming Conductive Features," incorporated herein by reference. These lower metal loading materials are remarkable with good electrical conductivity obtained at metal loadings of 5 wt % or less. The present work extends the work of the '737 application to higher silver nanowire loadings to achieve even lower resistivities and generalizing low polymer embodiments to provide composites with a significant polymer matrix to allow for a broader range of material properties.

As noted above, commercial synthesis of silver nanowires has generally relied upon the use of polyvinyl pyrrolidone as a capping agent. Standard nanowire purification can remove at least some of the excess polyvinyl pyrrolidone (PVP), but significant PVP generally remains including some more tightly bound PVP, without more aggressive processing to remove it. PVP tends to inhibit aggregation of the nanowires, so a modest amount of PVP can be beneficial, and residual PVP is found in the silver nanowires and dispersions thereof as described herein. Applicant's proprietary fusing process to form fused metal nanostructured networks with a unitary conductive transparent structure is not inhibited by the PVP, and once a unitary conductive structure is formed, the presence of PVP does not interfere with electrical conduction. In the present circumstances, even without metal deposition in situ, some PVP does not seem to significantly interfere with electrical conductivity.

Due to the significantly higher density of the silver relative to the organic components including the solvent, a comparison of relative volume percent versus relative weight percent discloses a significant different with respect to comparisons of silver components and organic components. Thus, a dispersion can generally be divided into solids and solvents. Solids can comprise silver particulates and organic materials like polymers, monomers and oligomers. For the purpose of identifying components of the materials, components that are solids in isolated form are still referred to as solids following dissolving in a solid, so the PVP is generally referred to as a solid for convenience. Note in some cases the solvents need not be volatile and can comprise monomers, oligomers, other polymers liquid at the appropriate processing ranges, or even ionic liquids which are non-volatile, but solvents are liquids in isolated form. This definition of solvents may be contrary to that used in earlier work of Applicant, but it acknowledges that some liquids may polymerize or crosslink at some point in processing, so a potentially volatile liquid can convert to a non-volatile solid during processing. So liquids can be further divided into nonvolatile liquids, volatile liquids that transform to non-volatile compositions during processing and volatile liquids that remain volatile. Specific relative amounts of these components are discussed further below and in the Examples. A representative paste could comprise roughly 60 wt % solids with 50 wt % silver and 10 wt % PVP, and 40 wt % solvent. This would correspond to roughly 10 volume % silver. For high aspect ratio silver nanowires, pastes are observed at significantly smaller weight percent solids, so that the solvent weight percent may be roughly 75 wt % or more. The fact that a paste that is on the order of 70 vol % or even 90 vol % liquid solvent and yet does not flow and has a high resistance to deformation is somewhat mindboggling. This is also highlights unique features of the 1-D structure of the NWs whose excluded volume can be significantly larger than their actual physical volumes—this is conceptually similar to excluded volume fractions common in polymer physics developed by Werner Kuhn and Paul Flory. Perhaps a close analogy would be an organic hydrogel, or organogel, which can have very high liquid swelling while maintaining good structural integrity. But in a hydrogel or organogel, the polymer is crosslinked so the polymer itself provide an integral mass for imbibing the liquid. There is no corresponding integral mass in the current pastes, although nanowire entanglement can provide a physical crosslinking. The cohesive forces holding together the pastes are not yet fully understood. While not wanting to be limited by theory, the PVP can have a relatively low molecular weight, so PVP would not be expected to form significant physical crosslinking, but the silver nanowires seem to contribute to a form of physical crosslinking in combination with the other components with the solvent swollen into the stabilized polymer. Other analogies which may be somewhat descriptive of these systems include concrete and wet beach sand wherein the solid particles can be involved in cohesively holding the liquid molecules and allowing for some properties intermediate between pure liquids and pure solids.

The surprising nature of the silver nanowire pastes extends to concentrated dispersions. Starting from a dilute solution, conceptually, the nanowire mass should crash out as the concentration is increased due to interparticle forces exceeding solvation forces. This expected view has been discovered to be somewhat off point. Based on the work herein, overall, five distinct domains can be identified for the materials as a function of concentration for a particular identity of the dispersion components, silver nanowires, PVP and solvent. Prior to elaborating more on these domains, we consider expectations from the art.

Consider a discussion in the article by Chen et al., "Formulation of concentrated and stable ink of silver nanowires with applications in transparent conductive films," RSC Advances 2017, 7, 1936, incorporated herein by reference (hereinafter the Chen article). The Chen article discusses the difficulty in forming stable dispersions of silver nanowires. The Chen article discusses the formation of a roughly 0.5 wt % silver nanowire ink. There are several issues worthy of consideration from Chen: the silver nanowires, processing to stabilize their dispersions, their definition of stability and their consideration of related work on higher concentration silver nanowire inks. The silver nanowires in Chen have an average diameter of 36 nm and an average length of 72 microns and were synthesized with a mixture of PVP having molecular weights of 360,000 and 55,000. Thus, the Chen nanowires have an average aspect ratio of roughly 2000.

With respect to stability, Chen refers to a lack of settling as a basis for evaluating stability. Applicant's commercial inks for forming transparent conductive films are stable against settling for many months; these inks also include other polymeric components which can increase the viscosity, network structures and prevent settling of the relatively thin and low concentrations of nanowires. While this is reasonable for dilute dispersions, it can be overly restrictive for more concentrated silver nanowire dispersions. In particular, more useful tools for evaluating stability for concentrated dispersions have been found. In this context, settling does not necessarily involve the avoidance of the formation of hard aggregates. As used herein, hard aggregates refer to nanowire aggregates that cannot be redispersed without breaking the nanowires. Thus, settling that does not involve hard aggregates can be diluted and mixed to reproduce a stable dilute dispersion. The lack of hard aggregates can be confirmed through dilution to a lower concentration dispersion to check for any settling and to check an ultraviolet/visible extinction spectrum, which can provide a characteristic spectrum based on the nanowire morphology.

The extinction spectrum is shown to be distorted in the presence of hard agglomerates. As Nanowires irreversible aggregate, their plasmonic responses change and this can be measured using a UV-Visible spectrophotometer. Visible observation and microscopic examination may provide useful information also.

With respect to their processing, Chen uses a portion of high molecular weight PVP in their nanowire synthesis. Higher molecular weight PVP could be expected to provide improved dispersions stabilities versus lower molecular weight PVP as much of the dispersion stability as steric hinderance which helps provide stability increases with polymer molecular weight. Higher molecular weight PVP is also associated with higher viscosities. On the other hand, Applicant has not found that the PVP molecular weight being a very significant factor in silver nanowire processing. As typically done, the silver nanowire purification at the end of the synthesis partially removes some of the PVP, which started at a relatively high weight percent relative to silver. Chen goes to great lengths in order to obtain a stable dispersion at 5 milligrams Ag per milliliter dispersion (mg/ml). In particular, they use 30 mg PVP/ml. This is a very large amount of PVP, and on volume percent basis, the PVP volume in the dispersion is much larger than the silver nanowires. Based on the results herein, we can understand the need of Chen to use such large amounts of PVP to obtain a good dispersion since it would stabilize the nanowire dispersion.

The formation of a silver nanowire dispersion at roughly 1 wt % and studies of the rheology are described in Fang et al. (hereinafter the Fang article), "Effects of inclusion size on thermal conductivity and rheological behavior of ethylene glycol-based suspensions containing silver nanowires with various specific surface areas," International Journal of Heat and Mass Transfer 81 (2015) 554-562, incorporated herein by reference. The experiments in the Fang article were based on commercial silver nanowires obtained with advertised very long lengths. According to the Fang article, the as obtained silver nanowires were ultrasonicated to disperse initially un-dispersible agglomerates, and the ultrasonication resulted in fragmenting the nanowires to average lengths that were a fraction of their initial sizes. Rheology results are presented in the Fang article for three silver nanowires at four concentrations each, with the highest concentration at 10 mg/ml. For their highest aspect ratio silver nanowires (250) at the highest concentration 10 mg/ml, they observed shear thinning behavior, while the other samples exhibited Newtonian rheology. Reports of higher concentration silver nanowire dispersions generally involve formation of the dispersions from purified as synthesized silver nanowires and use of the inks without significant storage, such that stability is not an issue. See, for example, Li et al., ACS Appl. Mater. Interfaces 2014, 6, 21721-21729 (5 wt %), and Tao et al., Nanoscale Research Letters 2013, 8:147 (15 wt %), both of which are incorporated herein by reference. Wu et al. form 10 wt % and 20 wt % silver nanowire dispersions using a silane surface modifying agent, Thin Solid Films 544 (2013) 427-432, incorporated herein by reference. As used herein, a silane surface modifying agent is not considered to be a dispersant, and such agents may become covalently bound to the metal surface. Unless explicitly stated otherwise, the silver nanowires described herein are considered to be not surface modified. It is not clear if surface modification inhibits electrical conductivity.

Silver nanowires are generally synthesized using a chemical reduction of silver salt with a glycol, with a PVP capping polymer and various salt catalysts. The basic synthesis was pioneered by DuCamp-Sanguesa et al. ("Synthesis and Characterization of Fine and Monodisperse Silver Particles of Uniform Shapes," Journal of Solid State Chemistry, Vol. 100 (2), 1992, 272-280) and Xia and coworkers (Sun et al., "Uniform Silver Nanowire Synthesis by Reducing AgNO$_3$ in Ethylene Glycol in the Presence of Seeds and Poly(Vinyl Pyrrolidone)," Chemical Materials, 2002, 14:4736-4745), both of which are incorporated herein by reference. Applicant has developed commercial scale synthesis of silver nanowires with sub-20 nm average diameters and has commercial inks suitable for forming state of the art transparent conductive films. See, U.S. Pat. No. 10,714,230 to Hu et al., entitled "Thin and Uniform Silver Nanowires, Methods of Synthesis and Transparent Conductive Films Formed From the Nanowires," incorporated herein by reference. For the formation of transparent conductive films, the optical properties have been found to be improved with thinner nanowires, although with potentially gradually diminishing improvement with nanowire thinning as the plasmonic responses are still present in the visible region of the spectrum regardless of nanowire diameter. Applicant has found that over a certain length of nanowire, further elongation does not result in a significant improvement in electrical conductivity.

Transparent conductive films are based on forming a sparse metal coating in which light can be transmitted through gaps in the nanowire film. Due to the small values of nanowire diameters relative to the wavelength of visible light, good optical properties can be achieved. Applicant has developed a fusing process to transform the sparse metal layer into a unitary, fused metal nanostructured network, which is effective to reduce or eliminate junction resistance between adjacent metal nanowires. Applicant has extensive patent protection in the U.S. and internationally for this technology, see references cited above.

With non-transparent conductive structures formed from silver nanoparticles, the design issues for a desirable material evolve significantly. Optical properties are then not relevant. The aspect ratio has been found to be an important parameter in influencing the rheology of silver nanowire concentrated dispersions. The "one-dimensional" aspect of the nanowires is still significant with respect to providing good electrical conductivity, but again results suggest that balancing of the significant rheology effects related to the aspect ratio can skew the balance of parameters to the use of intermediate values of aspect ratio to obtain desirable dispersions for further use. While desire for better transparent conductive films has driven narrower and longer silver nanowire formation, the design of good high concentration dispersions and pastes has resulted in the use of lower aspect ratios. Thus, much of the effort in the field of silver nanowires and existing paradigm has been focused on creating and synthesizing very thin, high aspect ratio silver nanowires.

For highly transparent conductive films, uniform deposition is a significant consideration, and dispersion uniformity is correspondingly significant. The concept of a good dispersion may have a different view in the context of a concentrated dispersion. Upon introduction of silver salts into the dispersions, coatings formed with the dispersions are observed to be more uniform. In addition, Applicant has discovered significant unexpected behavior for concentrated silver nanowire dispersions as the concentration is increased. To maintain a desirable material, it is significant that the nanowires remain substantially free of hard aggregates that cannot be dispersed with non-destructive mixing. If the dispersion is to be used for blending with other materials, such as for the formation of a conductive adhesive or polymer composite, a concentrated dispersion can be mixed for blending with other components, so a higher degree of maintaining the dispersion without any settling may not be needed. The higher the concentration of the silver nanowires in the dispersion, the simpler and more amenable the dispersion is to further processing and formulations; this can be a significant for commercial and technical implementation of the nanowires. Prior to Applicant's work, high concentrations of silver nanowires lead to formation of unstable dispersions composed of hard aggregates. Hard aggregates can also inhibit several attractive deposition methods due to clogging and defects.

Using conventional formation protocols for the dispersions, a pellet of purified, moist silver nanowires is diluted and mixed to form the desired concentration. As the concentrations increase, the viscosity correspondingly increases, and the formation of a well-mixed dispersion can become elusive as the viscosity increases. The formation of a well dispersed initially dilute dispersion has been found to be enabling for the formation of uniform highly concentrated dispersions, which at high enough concentrations can behave as a paste. So, starting with a dilute good dispersion seems to provide a basis for maintaining properties associated with a good dispersion even in materials at very high viscosities. As the concentration is increased, it is found that significant non-Newtonian behavior is observed; in particular, the dispersions become significantly shear thinning with no specific thickener added to induct this behavior. The nanowires themselves seem to induce this behavior. In some solvent systems, once non-Newtonian rheology is achieved, the dispersions no longer exhibit settling. As the concentration is increased further beyond the concentration at which the nanowires settle, the materials become non-flowing pastes. Even when the materials almost look almost like clay, the solvent role is significant, and the materials can be redispersed into good quality dilute dispersions. This behavior associated with the ability to be redispersed indicates that the nanowires have not formed significant numbers of hard agglomerates. This behavior is nothing short of startling even for inventors working in this area for more than a decade.

Applicant has discovered that the rheology properties depend significantly on the aspect ratio of the silver nanowires. Applicant is aware of one previously reported instance of non-Newtonian behavior of a simple silver nanowire dispersion in a solvent. See Fang, cited above. Fang reports processing three sets of nanowires that were purchased with specifications indicating very long lengths, and Fang reported that acquired nanowires were highly agglomerated. To disperse the nanowires, Fang discloses the use of extensive ultrasound that fragments the nanowires and allows for their dispersion. With three different nanowire diameters, they form dispersions with a maximum concentration of 10 mg/ml. They study the rheology of these dispersions. For the first of Fang's dispersions with nanowires having an average aspect ratio of 250 and an average diameter of 40 nm, they obtain shear thinning rheology performance as plotted in their FIG. 8. Fang did not associate a nanowire morphology connection with the concentration dependence, rheology and silver nanowire morphology. Applicant has found that with lower aspect ratios, that non-Newtonian rheology is extended out to higher concentrations. Examples are presented below with two nanowire dimensions, with one nanowire being thin with a high aspect ratio and a second having a larger diameter and a lower aspect ratio.

Applicant has discovered that achievement of sufficient concentration of the silver nanowires to result in the shear-thinning non-Newtonian rheology results in stabilization of the dispersions against settling without any additional surface modification of the nanowires or inclusion of specific solvents to modify the rheology. The control of the silver nanowire dimensions allows for the achievement of high silver concentrations for a particular rheology. This result is contrary to expectations based on conventional wisdom in which higher concentrations would be expected to result in greater agglomeration and expected settling. Applicant has discovered that the exact opposite occurs in select systems. This conventional wisdom is expressed in the Chen article. "Reported AgNW dispersions with a high concentration usually suffer from aggregation under a long-term storage condition." See Chen article Introduction and associated articles cited in Chen following this quote. As noted in the previous paragraph, Applicant has found that the concentration achievable for these high concentration stabilized silver nanowire dispersions can be moved to higher concentrations with lower aspect ratios. The extension of this understanding culminates in the discovered pastes, which can be non-flowable, re-dispersible, electrically conductive, and workable.

As the concentration of the dispersions is increased, the dispersions transition from a flowable state to a non-flowable, and with higher concentrations to spreadable paste state. As a paste, the concentrated material can be redispersed into a good quality dilute dispersion indicating that minimal irreversible agglomeration had taken place. As the concentration is made even higher, eventually a concentration is reached where irreversible changes are found, and the solid material cannot be dispersed into a stable dilute dispersion. For lower aspect ratios for the silver nanowires, a great enough concentration can be reached that the paste is conductive with the silver nanowires in a configuration past a percolation threshold past which a significant drop in resistivity is observed. This represents a unique composition wherein despite high levels of a solvent, the dispersion or paste is still electrically conductive. The applicant is not aware of any other previous work in which prior to any solvent removal, or further concentration to remove the solvent, that an electrically conductive paste has been demonstrated.

Based on conventional silver nanowire synthesis using the polyol method, the as synthesized nanowires have associated PVP. If vigorous approaches are used to remove all of the PVP, the silver nanowires tend to form hard agglomerates that cannot be redispersed. More conventional purification of the silver nanowires carries forward a reasonable amount of PVP, some of which seems to be more strongly adhered to the nanowire surface while other amounts of PVP remain in solution. Silver nanowire dispersions with lower amounts of PVP while maintaining good dispersions have been achieved. Probably not coincidently, solvents that provide good nanowire dispersions are also solvents in which PVP is soluble.

In summary, Applicant has identified five states of silver nanowire dispersions that differ by silver concentration: 1) dilute stable dispersion, 2) higher but still low concentrations that exhibit some settling if left undisturbed for some time, 3) intermediate concentrations, flowable but exhibiting shear thinning rheology, 4) high concentration pastes, non-flowable but spreadable corresponding with shear thinning behavior, 5) solids, irreversible agglomerates. If prepared appropriately, states 1) through 4) can be stable as identified by the ability to dilute the samples to a low concentration using non-destructive mixing to achieve a stable dispersion substantially free of hard agglomerates and exhibiting an expected absorption spectrum. As explained further below, the boundaries and concentration ranges between these states is significantly dependent on the silver nanowire dimensions.

While the surprising nature of some of forms of the silver nanowire materials described herein suggests that time is needed to grasp potential applications, some applications suggest themselves already. For incorporation of silver nanowires into composite materials, the ability to blend the silver nanowires starting with a more concentrated solution provides potential significant processing advantages and may allow for the formation of composites, such as polymers loaded with silver nanowires in formulations that may have been difficult or impractical if dilute dispersions of silver nanowires were needed. Of interest herein, polymer composites have a high silver loading, generally at least about 25 wt %, and as noted above, Applicant has other work involving lower loadings, less than about 25 wt % silver, that provide highly unique properties. These polymer composites can effectively include silver salts that can be reduced during processing to improve electrical conductivity, which can result in an order of magnitude or more reduction in resistivity. In these dense three dimensional systems, reduction of the silver salts involves heating to temperatures of at least about 125° C. for at least about 5 minutes. With or without silver salts, highly conductive metal structures can be formed using these dispersions.

With respect to the pastes, if these can be localized in structures that prevent solvent evaporation, the pastes can be used as electrical conductors molded into a desired shape and location. While the conductivities are somewhat below liquid metals, the silver nanowire pastes are non-toxic and formable for convenient placement while providing high conductivities. Solvents can be selected to have a relatively low vapor pressure at room temperatures. Moreover, non-toxic liquid metals based on gallium form solid oxide layers when exposed to ambient which make practical applications and large scale commercial processing very challenging. Liquid metals also exhibit extremely high surface energies which further complicate their processing. The conductive pastes made from nanowires described by the applicant do not suffer from either of these major drawbacks. Also, for use in forming transparent conductive films, a more concentrated dispersion could be conveniently shipped and diluted to a desired concentration for printing. This could result in a significant reduction in shipping costs with a very small addition of process effort. The discovery of these new materials opens up the possibilities to explore a range of additional new applications for exploration.

In some applications, the concentrated dispersions are deposited using an appropriate technique, such as any reasonable coating or printing process. Then, the deposited material can be dried and cured. Curing can comprise polymerization and/or crosslinking of a polymer or polymer precursor in the compositions. Curing can further comprise reduction of metal salts, such as silver salts, in the compositions. Concentrated silver nanowire dispersions can comprise higher boiling point solvents, so removal of the solvents may involve higher temperatures than used for drying transparent conductive films, which may be performed at room temperature or with some heat. Drying may be facilitated using radiation, such as intense pulsed light, or other light sources. Polymerization and/or polymer crosslinking, if performed, can be driven thermally or with radiation, such as UV radiation. In principle, these processes, solvent removal, polymerization/crosslink, and/or silver ion reduction, can be carried out in a single process step or with multiple process steps. In this way, desirable dried materials can be formed specific for particular desired applications. Product materials include metal loading composites (electrically conductive adhesives) comprising a polymer matrix, generally with at least 10 wt % organics and at least 25 wt % silver, with at least 75% of the silver provided in the form of silver nanowires as starting materials. With respect to materials with low organic amounts, very high electrical conductivities have been found upon drying the materials and reducing silver salts to in situ deposited silver. The resistivity of bulk silver has been reported as $1.59 \times 10^{-6}$ $\Omega$cm, and the resistivity of bulk iron is reported as $9.7 \times 10^{-6}$ $\Omega$cm. Values have been obtained for dried high loaded composites with resistivity values between bulk iron and bulk silver, as reported below. Silver pastes with significant amounts of solvent remaining in the material can have resistivities of less than about $1 \times 10^{-1}$ $\Omega$cm.

Silver Nanowire Synthesis and Characterization

Silver nanowires synthesis involves adjusting the reaction conditions to direct crystal growth along a single crystal axis. Silver nanowires are generally single crystal objects. Polyvinyl pyrrolidone (PVP) and copolymers thereof have been found to preferentially associate with certain crystal faces of silver to provide for growth of the crystal preferentially along a single axis. While synthesis not based on PVP has been reported, synthesis of good quality nanowires on a commercial scale to date has relied on PVP. While other reducing agents have been used, such as sugars in aqueous solution, commercial silver nanowire synthesis has generally relied on ethylene glycol or other glycols as both solvent and reducing agent. Salts generally are added to help influence the product nanowire dimensions. For making concentrated dispersions, the desire to make thinner nanowires to improve optical qualities is no longer a dominant driving force for many applications. Thus, thicker silver nanowires with smaller aspect ratios can be potentially more desirable for some applications since they are found to yield desirable rheology at high concentrations. However, the silver nanowires should have a sufficiently high length to provide for establishment of conduction pathways and a diameter not too large such that dilute dispersions can be formed with a high stability.

The properties of the nanowires for forming the dispersions herein first involve the ability to form a stabile dilute dispersion of the silver nanowires in a low boiling solvent, such as ethanol. This objective provides constraints on the avoidance of non-dispersible agglomeration as well as the diameters of the nanowires. The silver nanowires should remain well dispersed when dilute, which should be obtainable up to relatively large average diameters.

The average diameters of the nanowires should generally be appropriate up to no more than about 250 nm, in further embodiments, no more than about 200 nm, in other embodiments no more than about 150 nm, in some embodiments from about 15 nm to about 125 nm, in additional embodiments from about 20 nm to about 100 nm, and in further embodiments from about 35 nm to about 80 nm, as well as embodiments with ranges with alternatives of these lower boundaries (15, 20, or 35) with any of the specific upper boundaries (250, 200, 150, 125, 100, or 80), such as from 20 to 150. For the non-transparent high concentration materials of primary interest herein, having very thin nanowires may not be a primary concern, although some applications may still desire the use of thinner nanowires. The average lengths of the silver nanowires generally can be no more than about 80 microns, in some embodiments no more than about 50 microns, and in additional embodiments no more than about 35 microns. For the processing into concentrated dispersions, a perhaps particularly significant parameter is the average aspect ratio, average length divided by the average diameter. The desire for more electrical conduction pathways suggests longer nanowires, but the rheology suggests higher dispersion concentrations can be more readily achieved with smaller aspect ratios, as discussed further in the next section. So, there may be a trade off in nanowire dimensions, and selection of the average aspect ratio may be influenced by the intended application and desired electrical conductivity of the product, whatever that may be. In general, the average aspect ratio is at least about 15, in some embodiments at least about 25, in further embodiments from about 30 to about 3000, in other embodiments from about 40 to about 1000, in additional embodiments from about 50 to about 750, and in some embodiments from about 75 to about 250, as well as embodiments with ranges with alternatives of these lower boundaries (15, 25, 30, 40, 50 or 75) with any of the specific upper boundaries (3000, 1000, 750, 250), such as from 25 to 750. To reiterate, and as discussed in detail in the following section, the dispersion properties are significantly dependent on the silver nanowire dimensions, especially the aspect ratio. A person of ordinary skill in the art will recognize that additional ranges of silver nanowire dimensions within the explicit ranges above are contemplated and are within the present disclosure. References to nanowire dimensions generally refer to averages unless specifically mentioned otherwise.

Silver nanowires are available commercially from various suppliers, such as Sigma/Aldrich, NanoCintech, ACS Materials, Cheaptubes.com, Novarials, and C3nano (Applicant). Applicant produced the silver nanowires used on the Examples below. Previous efforts have generally been directed to forming thinner nanowires, but such efforts can be held back for the synthesis of thicker and shorter nanowires. In addition, ultrasonication has been found to be effective to break silver nanowires into shorter nanowires. Ultrasonication mixers are available commercially. Applicant's results with ultrasonication have been consistent with previously reported results in that the fracturing of the metal nanowires can result in reasonably uniformity of the lengths of the fractured nanowires. Silver nanowires fractured through ultrasonic treatment seem to exhibit the same properties as nanowires directly synthesized with a shorter length.

As noted above, silver nanowires have been primarily synthesized using a polyol process with a glycol, such as ethylene glycol, as the solvent and reducing agent. Polyvinylpyrrolidone has generally been used as a polymer capping agent. Various molecular weights of PVP have been used, but they have mostly been in the moderate average molecular wight range from about 10,000 g/mol to about 100,000 g/mol, although higher molecular weights can be used, and suitable PVP average molecular weights can be up to 2,000,000 g/mol or potentially higher. Silver nanowire synthesis using a copolymer, poly(vinyl pyrrolidone-co-diallyldimethylammonium nitrate), has been described, see published U.S. patent application 2014/0178247 to Alsayed et al., entitled "Process for Making Silver Nanostructures and Copolymer Useful for Such Processes," incorporated herein by reference. Herein, references to polyvinylpyrrolidone refers also to reasonable copolymers unless specifically indicated otherwise.

Purification of the product nanowires generally removes excess PVP but retains a significant amount of PVP. Experience suggests that some PVP is more tightly associated with the nanowire surface while some PVP remains in solution. Additional purification steps can remove more PVP, and this is exemplified below to understand better the role of PVP. Experiments have not been undertaken to completely remove the PVP. Some examples are presented below with the addition of more PVP, mostly in the context of examining effects on electrical conduction. The amount of PVP over the ranges considered do not qualitatively change the rheology. Ranges of PVP are discussed further below. Of course final ratio of PVP bound to the silver surface, vs. the PVP free in solution, establishes an equilibrium over time and is influenced by a variety of factors including: PVP concentration, silver concentration, silver nanowire size, shape, purification processes and solvent types. PVP also functions as a dispersant.

Silver nanowires can be coated with noble metals to increase their resistance to corrosion. Applicant has developed improved, scalable synthesis approaches, as described in U.S. Pat. No. 9,530,534B2 to Hu et al., entitled "Transparent Conductive Films," incorporated herein by reference. These noble metal coated silver nanowires have been used similarly to silver nanowires in forming transparent conductive coatings. The noble metal coated silver nanowires should perform comparably to silver nanowires for forming concentrated dispersions as described herein. The noble metal coatings should be relevant for any silver nanowire dimensions of interest.

Other metal nanowires are known in the art, such as copper nanowires, gold nanowires, platinum nanowires, cobalt nanowires, and the like. These nanowires can be dispersed with PVP or similar type polymers that can associate with the metal nanowires surfaces. These other nanowire types would exhibit the observed behavior of the silver nanowires as described herein, although electrical conductivity would generally be somewhat lower. There is nothing about the specific metal nanowire chemistry involved in forming the silver nanowire dispersions. Sigma Aldrich sells a range of metal nanowires including gold, copper and cobalt.

The results in the examples suggest that as long as the nanowires can be well dispersed at low concentrations, processing of the nanowires into higher concentrated dispersions and gels can proceed. The stable, low concentrated dispersions of the nanowires are believed to exhibit properties of a Brownian system. The dispersions are discussed in detail in the following section.

Dispersions and Methods of Formation

Advances in silver nanowire dispersion processing has provided for the formation of previously inconceivable materials exhibiting surprising properties commensurate with the new compositions. The incorporation of silver salts allows for process improvements along with providing the capability of reducing the metal salts to form in situ deposited metal that is found to potentially significantly lower the resistivity of a formed metal structure. As discussed above, five distinct silver nanowire dispersion domains have been identified with progressively higher concentrations of silver nanowire relative to solvent. Four of the domains can be referred to as stable dispersions, although only three are flowable. The concentration divisions between the domains has been found to depend significantly on the silver nanowire dimensions and to some degree on the solvent. The nature of the dispersions can be evaluated using rheology, observations of settling or lack of settling, and dilution to a low concentration state along with an evaluation of the low concentration dispersion using evaluation of UV/Vis absorption and stability. The five dispersion domains are:

I—Low concentration, stable dispersion.

II—Moderate concentration, Newtonian rheology with some settling over time, re-dispersible to Domain I.

III—Moderate to high concentration, flowable but non-Newtonian rheology, no observed settling over reasonable periods of time, re-dispersible to Domain I.

IV—High concentration, pastes, non-flowable, shear thinning, spreadable-formable, re-dispersible to Domain I.

V—Non-flowable solid, not re-dispersible to Domain I.

For a particular collection of silver nanowires, the concentrations determine the specific domain exhibited by a dispersion. As noted above, the concentrations of nanowires transitioning between the different domains depends on the nanowire characteristics, in particular the aspect ratio. As the aspect ratio is lowered, it is possible to achieve higher nanowire concentrations for a particular dispersion domain, so flowable dispersions are possible at higher concentrations, but the electrical conductivity of structures formed with the nanowires may be impacted by the change in aspect ratio.

The ability to form the five Domains presumes the ability to form Domain I from the silver nanowires, which requires some minimal quality of the silver nanowires. If the silver nanowires are non-dispersible due to aggregates, either the silver nanowires should be processed, purified or otherwise cleaned up, or they will not be suitable for processing as described herein. The following discussion presumes that sufficient quality nanowires have been obtained and are being used.

Domain I is known in the art and is the primary focus of basic commercial nanowire inks. The concept of transitioning to other silver nanowire domains is not believed to be recognized in the art. In Domain I, the silver nanowires can generally be considered Brownian particles in the sense that with an appropriate solvent, the silver nanowires can remain stably dispersed, substantially free of any observable settling for extensive periods of time, generally months. During storage, the dispersions should be protected against solvent evaporation and other inappropriate disruptions. In a Brownian system, diffusion against development of any concentration gradients compensates for any effects of gravity, such that the particles remain suspended. For silver nanowires in this Domain, there is no lower limit on the concentration. The upper limit of concentration for this Domain generally depends on the nanowire dimensions and the solvent, and some attention in the art has been devoted to exploring the limit of this domain without realizing the distinctions of the Domains or the implications of the dispersion behavior.

For the application of silver nanowires, dilute dispersions can be combined with other process aids, such as surfactants and/or binders, to render inks amenable to various coating methods and/or to be suitable for the resulting components formed form the materials. In some embodiments, the silver nanowires can be blended as fillers into polymers or the like. The focus herein is on dispersions without significant additives, although small amounts of additives generally do not disrupt the dispersions. Additives may also interfere with electrical conduction depending on the specific circumstances. The dispersions described herein, of course, may be blended into various materials.

In general, the dispersions comprise silver nanowires, solvent, polymer dispersant, an optional surfactant, an optional polymer matrix composition or precursors thereof, optional silver salt and metal particulates. Generally, the silver nanowires are free of surface modification what can lower electrical conductivity. The concentration of silver nanowires determines which dispersion Domain is relevant, and the amount of solvent provides the remainder of the composition once the other components are selected. The silver nanowire average aspect ratio and potentially other dimensional parameters help to determine the concentrations dividing the Domains. With respect to Domains I to IV, the silver nanowire concentrations can be up to about 75 wt %, and in other embodiments, can range from about 0.01 wt % to about 65 wt % and in further embodiments from about 0.05 wt % to about 60 wt %. Concentrated silver nanowire dispersions generally can be considered to comprise at least about 8 wt % silver nanowires, in further embodiments at last about 10 wt % silver nanowires, in additional embodiments form about 12 wt %, in other embodiments at least about 15 wt % silver nanowires. In some embodiments, flowable concentrated dispersions can have silver nanowire concentrations up to about 75 wt % silver nanowires, in other embodiments from about 10 wt % to about 70 wt %, in additional embodiments from about 15 wt % to about 65 wt % and in further embodiments from about 20 wt % to about 60 wt % silver nanowires. As noted throughout this application, flowability with respect to a particular concentration of silver nanowires depends significantly on the nanowire aspect ratio. The dispersion can comprise at least about 0.01 wt %, in some embodiments at least about 0.1 wt % polymer dispersant relative to the silver nanowire weight, in further embodiments from about 0.2 wt % to about 60 wt %, in other embodiments form about 0.25 wt % to about 50 wt %, in additional embodiments from about 0.3 wt % to about 20 wt %, and in some embodiments from about 0.35 wt % to about 5 wt % polymer dispersant relative to silver nanowire weight. Suitable polymer dispersants include, for example, polyvinyl pyrrolidone. As noted above, the silver nanowires generally maintain some PVP from the nanowire synthesis that is carried forward through purification. The exemplified silver nanowires generally maintain roughly 5-20 wt % PVP relative to the silver nanowires. Examples are presented in which the ranges of PVP are adjusted through additional purification to reduce the retained PVP or additional PVP is added to the dispersion. With these manipulations, the range of PVP can be from about 0.5-35 wt % PVP relative to silver nanowires. Various surfactants can be used in principle. A wide range of surfactants, such as nonionic surfactants, cationic surfactant, anionic surfactants, zwitterionic surfactants, Gemini surfactants, are commercially available. Fluoro surfactants have found popularity due to various pragmatic reasons. While surfactants are optional, if used, the dispersions generally comprise from about 0.05 wt % to about 3 wt % relative to the dispersion weight. A person of ordinary skill in the art will recognize that additional ranges of dispersion component concentrations within the explicit ranges above are contemplated and are within the present disclosure. In addition, the limiting values for the explicit open ended and closed ranges presented above also can be considered to appropriately disclosed as other alternative open and/or closed ranges with the respective limited exchanged.

The dispersions described herein generally comprise no more than about 50 wt % solid organic compositions, in further embodiments no more than about 40 wt %, in some embodiments no more than about 30 wt %, and in additional embodiments from about 5 wt % to about 20 wt % solid organic compositions. Solid organic compositions refer to compositions in their isolated form being solids and does not consider solubility in the solvent, which is generally desirable. Solid organic compositions can be a precursor for a polymer or adhesive matrix for the silver nanowires that forms upon removal of the solvent. The solvent can comprise polymer matrix precursors that cure, polymerize and/or crosslink, to form a polymer matrix, which can be additionally or alternatively to a dissolved polymer in the ink. Thus, suitable matrix polymers can include, for example, polyethylene terephthalate (PET), polyethylene naphthalate (PEN), polyacrylate, poly(methyl methacrylate), polyamide, polyimide, polysulfone, polysiloxane, polyester, epoxy, polyurethane, polyvinyl alcohol, polyvinyl acetate, copolymers thereof, or blends of these polymers. Corresponding inks can comprise dissolved polymers or polymer precursors or mixtures thereof referring to possible mixtures of polymers, mixtures of polymer precursors or mixtures of polymers and precursors. As noted above, the polymer binder can be provided in the inks as monomers, oligomers, dissolved polymers, or mixtures thereof that may be subsequently further polymerized or crosslinked. A person of ordinary skill in the art will recognize that additional ranges of solid concentrations within the explicit ranges above are contemplated and are within the present disclosure.

The solvent and solvent concentration are selected to provide desired processing and material properties for the dispersion. For a particular silver nanowire geometry, the solvent concentration influences that type of dispersion is formed. If the product material comprises a polymer matrix, the solvent can comprise a precursor, which can be a monomer, oligomer or crosslinkable liquid polymer, that can react to form the polymer matrix. A solvent may or may not be volatile in the sense that it may decompose prior to evaporation. Solvents can comprise solvent blends.

In the context of solvent transfer to higher boiling solvents, PVP has been found to have another role in the resulting materials. PVP is found to potentially retain lower boiling solvents, at least ethanol, in the polymer as ethanol is removed in favor of the transfer solvent. During solvent transfer, generally mild heating and reduced pressure is used to remove the ethanol. Under these process conditions, a significant amount of ethanol can be retained, as described in the examples below. The adjustment of the PVP levels may or may not proportionally change the amount of retained ethanol, as seen in the examples. The retained ethanol is a background issue in the explanation of the observed rheological behavior since the ethanol can lower the viscosity to the extent that it can diffuse into the solvent following solvent transfer. The retained ethanol can be removed during the full drying process of the material.

In contrast to solid organic compositions referenced above, as used herein, "solvent" refers to a liquid composition at room temperature. The process approaches used herein are based on an initial dispersion in a low boiling solvent and then transitioning into a higher boiling solvent if desired, although the dispersion can be maintained in the low boiling solvent. This suggests that solvent transfer is to a higher boiling solvent, but this relationship may not be particularly limiting for the transfer solvent since the initial solvent may be processed under cold or enhanced pressure conditions. For the initial solvent, the solvent should be suitable for forming a dilute stable silver nanowire dispersion and water and low molecular weight alcohols are particularly suitable for forming low concentration good dispersions. If there is a good solvent transfer involved in forming the more concentrated dispersions, the transfer solvent generally should be highly soluble or miscible in an initial dispersion solvent and a solvent in which PVP is soluble to avoid PVP phase separation. Suitable volatile solvents for the dispersions include, for example, water, alcohols, glycols, amides, glycol ethers, sufficiently polar aprotic solvents, such as dimethylsulfoxide, some additional polar solvents and mixtures thereof. Specific volatile solvents include, for example, water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, and mixtures thereof. In some embodiments, it can be desirable to use a nonvolatile solvent. Suitable non-volatile liquids can include, for example, silicone, mineral oils and ionic liquids, such as 1-butyl-3-methylimidazolium bis(trifluoromethylsulfonyl)imide.

While solvents refer to liquid compositions, the solvents can be direct precursors for potential further processing. For example, the solvents can be monomers, or oligomers, or polymers that can polymerize and/or crosslink upon further processing, such a heating, irradiation, blending with additional reactants, combinations thereof, or other suitable approach. Suitable monomers or oligomers include, for example, acrylic type such as hydroxyethyl methacrylate, hydroxyethyl acrylamide, diol or polyol type that is precursor of polyurethane such as tetraethylene glycol, 1,3-propylenediol, epoxy type precursors, such as DGEBA (Bisphenol A diglycidyl ether), Celloxide™ 2021P (Daicel U.S.A., Inc.) or YX8000D (Mitsubishi Chemical Group), radiation curable liquid adhesives, such optical adhesive NOA 85 (Norland Optical), and combinations thereof, which may be cured through various thermal, radiation or chemical means. These polymer precursor solvents may or may not be volatile. These polymer precursor solvents can be blended with volatile solvents referred to in the previous paragraph, which generally would be inert under relevant process conditions.

For a specific batch of silver nanowires, dispersion properties depend on concentration as noted above. It has been found that a certain parameter can be used to help estimate properties of a dispersion based on the concentration and nanowire dimensions. In particular, for dispersions of one dimensional structures such as silver nanowire, some insight can be gained into the system properties by estimating a dimensionless number $\beta$,—which is defined below and reflects the non-spherical nature of the nanowires convoluted with the concentration in a way that is reflected in the resulting rheology, as noted above. This parameter corroborates observed significance of the aspect ratio of the silver nanowires:

$$\beta = vL^3. \tag{1}$$

Where: $v = \#NW/\text{unit volume (cm}^3)$
$L = NW$ length (cm)

As $\beta$, increases due to higher number densities or longer nanowires, or both, the dispersion tends to build up viscosity as tendency for the solid-solid interactions increases. While not being limited by theory, higher $\beta$ numbers for similar systems (for example the same solvent) should indicate higher viscosity and as $\beta \to \infty$ the system progresses from "liquid-like" to more "solid-like." Analysis of equation (1) also indicates why viscosities in longer and thinner nanowires dispersions grow at lower concentrations versus shorter and thicker nanowires since, for a fixed silver loading or amount, both terms in $\beta$ increase as nanowires get thinner and longer (higher aspect ratios). If the shape of the nanowires is assumed to be cylindrical, the following relationship is found $\beta = C \cdot a^2/B$, where B is a constant, C is the concentration expressed as (mg/ml) and a is the aspect ratio. So, to an approximation, the properties of the dispersion are independent of the average diameter and average length.

Silver salt can be included to provide for reduction of the silver salt to improve electrical and/or thermal conductivity. The presence of silver salt is also observed to help coating properties with respect to smoothness of the coating. The silver salt can be provided such that the reduced silver forms a significant fraction of the final metal in a cured deposit of the ink. It has been found that reduction of the silver salt involves significantly higher temperatures and longer times than corresponding silver reduction in transparent conductive films. While one can speculate on the reasons for this, including improved dispersion quality and electrostatics due to the presence of the charged species, the reasons are still not clear. Suitable reducible silver compositions include, for example, silver acetate ($Ag(O_2CCH_3)$), silver trifluoroacetate ($Ag(O_2CCF_3)$), silver heptafluorobutyrate (Ag ($O_2CC_3F_7$)), silver lactate ($Ag(O_2CCH(OH)CH_3)$), silver hexafluoroantimonate ($AgSbF_6$), silver fluoride (AgF), silver tetrafluoroborate ($AgBF_4$), silver nitrate ($AgNO_3$), silver perchlorate ($AgClO_4$), or mixtures thereof, which are generally soluble in solvents of interest. Process conditions can be influenced by the specific silver salt selection, as described further below.

In general, the ink can comprise silver salts or other reducible metal salts, wherein the weight ratio of the metal/silver from the reducible metal ions to the silver nanowires is generally no more than about 50 wt % of the silver nanowires, in some embodiments from about 2.5 wt % to about 40 wt %, in further embodiments from about 5 wt % to about 30 wt % and in other embodiments from about 8 wt % to about 26 wt % relative to the silver nanowire weight. The weight of the full salt depends on the weight of the anion relative to the metal cation. The metal salts should be soluble in the solvent, and the silver or other metal salt concentrations can be relatively high for large silver nanowire loadings. A person of ordinary skill in the art will recognize that additional ranges of component concentrations and relative weights within the explicit ranges above are contemplated and are within the present disclosure.

The silver salts can be reduced to silver based on solvents, such as alcohols or glycols or polymers such as matrix polymers or dispersant polymers, such as cellulose. On additional or alternative embodiments, additives can be added as reducing agents. Suitable reducing agent additives include, for example, ammonium or other salts of oxidizable anions, such as sulfite, hydrosulfite, thiosulfate, phosphite, hydrogenphosphite, oxalate, or the like, phenolic compounds, such as phenol, aminophenol, hydroquinone, pyrogallol, catechol, phenidone, 4-amino-3-hydroxy-1-naphthalenesulfonic acid, and the like; polyols including sugar alcohols; sugars, such as mono-saccharides and disaccharides; hydroxylamine and derivatives; aldehydes; α-hydroxy carbonyl compounds such as benzoin, furoin, hydroxyacetone; hydrazide derivatives such as phthalhydrazide, adipic acid dihydrazide, phenidone, and the like; reduced aromatic compounds such as 1-methyl-1,4-cyclohexadiene, dihydrodiazine, and the like; and combinations thereof. In some embodiments, a reducing agent additive can be incorporated into the dispersion at a concentration from about 0.001 mM to about 1000 mM, in further embodiments from about 0.01 mM to about 100 mM, and in additional embodiments from about 0.1 mM to about 10 mM, and a desired concentration generally is influenced by the chemistry of a selected agent or combination of agents and a person of ordinary skill in the art can evaluate these issue empirically based on the teachings herein. A person of ordinary skill in the art will recognize that additional ranges of reducing agent concentrations within the explicit ranges above are contemplated and are within the present disclosure.

With respect to Domain I, there is no lower limit on the silver nanowire concentration. From a practical sense, there would be diminishing value to inks with silver nanowire concentrations that are below certain values. As the ink concentration is increased, Domain II is reached. If the aspect ratio "a" is smaller, the concentration of at the transition from Domain I to Domain II, Cu, can be larger, which may be desirable for particular applications. In Domain II, the dispersions generally become more viscus due to the increased nanowire concentration. With the higher nanowire concentrations, the interactions between nanowires become more significant. In this Domain, in contrast to Domain I, some settling of the nanowires can be observed after sitting undisturbed for 24 hours. The visible observation of the settling involves a cloudy isolated domain near the bottom of the storage vessel. There has been no attempt to isolate or quantify the "settled" nanowires. While there is some separation of the dispersion that can be clearly identified, the dispersions can be mixed to return the dispersions to a well dispersed visibly uniform dispersion that does not separate again without sitting undisturbed for a significant period of time. While it is not clear what would result from long-term sitting undisturbed, after a week of settling, the dispersions can still be returned to a well-dispersed state. The lack of significant hard aggregation can be confirmed by diluting the dispersion to a low concentration dispersion through dilution with solvent and confirmed to be a well dispersed dilute dispersion, as described in the following section. These results confirm that any settling in Domain II is reversible.

With further increase in silver nanowire concentration in the ink, Domain III is reached. Again, the concentration of silver nanowires at the boundary between Domain II and Domain III, $C_{III}$, depends on the silver nanowire dimensions. The properties of the dispersion in Domain III are remarkable. As noted above, the properties in Domain I can be understood in terms of Brownian motion and particle-particle interactions. In Domain II, without wanting to be limited by theory, it can be rationalized that interactions between nanowires limits the effectiveness of Brownian forces to counteract the forces of gravity so inhomogeneity results. Generally, for dispersions of solid particles in liquids, one can use Stoke's law to estimate the diffusion rate, which influences settling. While still not wanting to be limited by theory, generally settlement is inversely related to difference in particle and fluid density and inversely related to the viscosity; as the NW concentration increases, the viscosity increases which further decreases the settlement. In Domain III, the interaction of the nanowires would be expected to grow more dominant to induce settling, although the increase in viscosity might slow the settling. But the exact opposite is observed. Again, without wanting to be limited by theory, the inter-nanowire interactions seem to result in a stabilization effect, which could the enthalpic, entropic or some combination. The stabilization of the dispersion corresponds with a transition to non-Newtonian rheology, which is described further in the following section. It has not yet been determined if the transition to non-Newtonian behavior exactly corresponds with the stabilization against settling, so there may be a small intermediate region Domain II-Domain III with some properties of each region, either some settling and non-Newtonian behavior or no settling and Newtonian behavior. An intermediate region may not exist if the same forces are responsible for both the rheology behavior changes and the stabilization against settling. As discussed further below, confirmation of the maintenance of highly dispersible silver nanowires can be confirmed by diluting the Domain III dispersion with mixing to form a stable dilute dispersion with expected properties of well dispersed dilute silver nanowires.

As a higher concentration of silver nanowires is reached, the dispersion reaches Domain IV, at which the dispersions are no longer flowable. The resulting pastes exhibit shear thinning behavior, so they can flow with the application of shear even though they exhibit no flow on a slanted surface subject to gravity. As used herein, paste refers to a non-flowable solid that is shear thinning, so that flow can result upon application of shear. Again, the concentration at which the dispersion becomes a paste ($C_{IV}$) depends on the silver nanowire dimensions, and on the solvent. For high aspect ratio silver nanowires, the concentrations can be relatively low. The solvent volume fraction can be quite high. The pastes can exhibit relatively low values of electrical resistivity even though the solvent volume fractions can be high. Even in this paste Domain, the pastes can be re-dispersible as dilute dispersions with expected characteristics of a stable dilute dispersion, as described further below. A very interesting observation is found at high enough silver concentrations where the dispersion itself becomes an efficient conductor of electricity. This is quite remarkable as the paste still contains significant amounts of insulting liquid solvent molecules and organics. The concentration at which the pastes become particularly conductive involving crossing a percolation threshold is dependent on silver nanowire geometry. It should be noted that pastes can be formed that are conductive and dispersible into a dilute unaggregated dispersion.

At some threshold, the mass of silver nanowires becomes a solid material that is no longer capable of dilution and redispersion into a stable dilute material. As a function of concentration, this is referred to herein as Domain V. The resulting material can be highly conductive of electricity. The concentration at the transition into Domain V ($C_V$) depends on the silver nanowire dimensions. At this transition to a non-moldable material, the silver nanowire dispersions exhibit irreversible aggregation.

Figure 4:
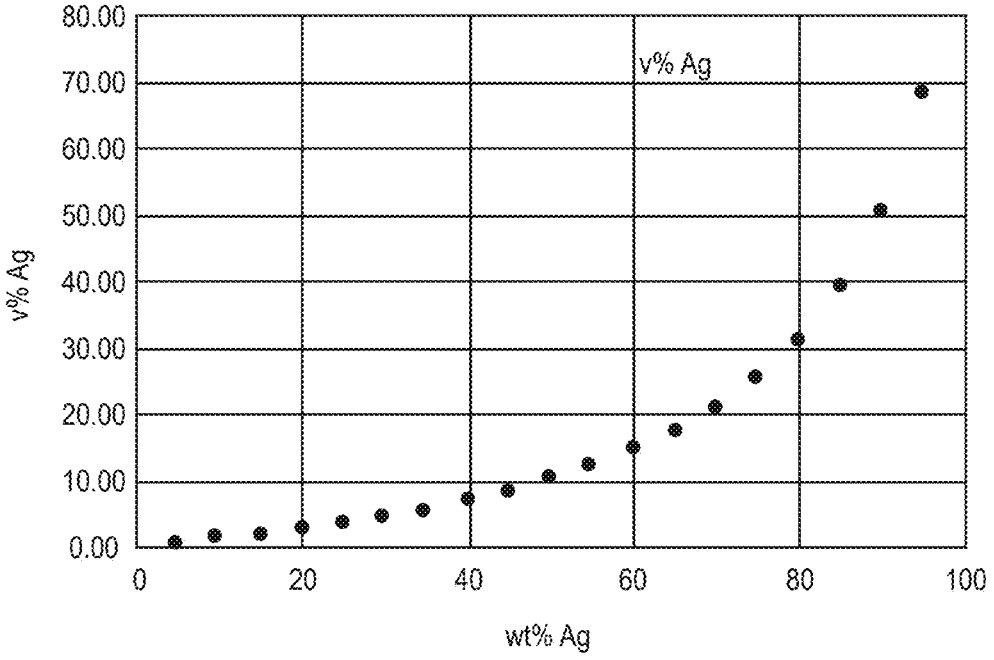
FIG. 4 is a representative plot of volume percent silver as a function of weight percent silver for a dispersion assuming a density of organics of 1.19 g/ml.

The relationship between weight percent and volume percent for the dispersions is plotted in FIG. 4. The remaining volume is solvent, PVP and any optional additional organic solids in accepted low amounts.

Since the materials are very new with no known analogous materials, the boundaries between the Domains is still being explored for additional dimensions and properties, while some information has been obtained with samples to date. Firstly, NWs can exhibit excellent and non-aggregated dispersions over a wide concentration range. Depending on the aspect ratio, solvent, and PVP, the dispersion can exhibit dramatic changes in physical properties like viscosity (for example over more than 106 centipoise, or more than 108 in bulk resistivities) over a silver nanowire weight ratio of less than 10 times.

Approaches are described to effectively form the dispersions with the ranges of concentrations described above. With the recognition of the existence and general characteristics of these materials, it seems likely that alternative formulation protocols could be developed in the future. The successful processing approach developed to date are described next, and these approaches are exemplified below. To form the concentrated dispersions, an initial dilute dispersion can be formed with an appropriate solvent and non-destructive mixing. As noted above, ultrasonic mixing for significant amounts of time has been found to fragment silver nanowires, so suitable mixing generally involves milling style mixing at low to moderate shear without mixing media. A person of ordinary skill in the art can adjust mixing times and conditions based on the nature of the supplied silver nanowires and can verify that significant nanowire fragmentation has not occurred.

Once a good dispersion has been formed, solvent is removed by evaporation to concentrate the nanowires. If the more concentrated dispersion is formed in the same solvent as the initial dilute dispersion, the solvent can be removed using heat and/or vacuum to draw off the solvent with the non-volatile components remaining. Solvent removal is continued until the desired solid concentration is reached. Removed solvent can be collected and recycled, if desired. For solvent transfer, one or more higher boiling solvents, non-volatile solvents or a mixture thereof is added and mixed with the initial dilute dispersion. The amount of transfer solvent added can be based on the desired dispersion concentration with appropriate accounting for any expected loss from evaporation during the solvent removal process. After mixing with the added solvent, the low boiling initial solvent can be removed by evaporation. With solvent transfer, it is generally an objective to remove all of the initial solvent, but small amount of the initial solvent may remain by design or by practical processing considerations. By selecting the amount of added solvent, the desired silver nanowire concentration can be achieved.

While the high concentration dispersions are exciting based on their unique properties, ultimately their commercial value results from their application to make a desired ultimate product. The ability to form concentrated dispersions provides direct advantages with respect to simplifying shipping through the smaller volumes needed to ship a certain weight of silver nanowires and simplifying addition of silver nanowires into various composite materials in which the silver nanowires are introduced at higher concentrations. As noted above, the dispersions can be directly formulated as precursors for a desired composite material, through the introduction of polymer precursors as solvents and/or by dissolving desired polymers into the solvent. These materials can then be processed by drying and curing, as described further below. In particular, the curing can comprise a reduction of a silver salt into in situ deposited silver metal.

Dispersion Characterization

The dispersions can be characterized in various ways to specify to nature of the dispersions. Some properties of the dispersions are visual, such as evaluation of settling and flow properties. Other properties involve measurements on analytical instruments, such as rheology and optical absorption. The rheology follows the general trends noted above, in which Newtonian behavior is observed in Domains I and II, non-Newtonian rheology in Domain III, and qualitative characterization in Domains IV and V. Concentrated dispersions can exhibit significant electrical conductivity, which can be more dependent on silver weight percent than rheology. As noted above, it has been determined that evaluation of the reversible nature of the dispersions can be a good way to evaluate the character of the materials. As noted above, several particular properties are evaluated to classify the dispersions. These are described in more detail in the following.

With respect to settling, this feature can be significant for silver nanowire dispersions in Domains I, II and III as specified above. Domain IV is a paste, while Domain V is a solid, so settling is a somewhat irrelevant concept. Broadly conceived, settling can be viewed as an inhomogeneity. Once well dispersed in a dilute dispersion, if the particles are dominated by Brownian motion and viscous forces dominate gravitational forces, they should remain suspended. While subtle changes over time may disrupt this situation, the particles can remain suspended for long period of time, and commercial nanowire inks can be stable for many months. However, Domain II is characterized by settling. In the Examples below settling in Domain II is characterized by an inhomogeneity that looks like a separate substance toward the bottom of a storage container. The separate substance that settles does not look like agglomerated nanowires, but looks itself like a colloid separated out of the homogenous dispersion. The composition and mass of the separated substance has not been determined.

In Domain I away from the boundary with Domain II, properties and stabilities are familiar since this is where most processing for transparent conductive films has taken place. Nevertheless, near the boundary between Domain I and Domain II, there is a transition from the familiar to the less familiar. To provide some specificity, settling can be specified with respect to a visible phase separation by a person with average visual acuity looking through a clear glass storage vessel as evaluated with no mixing after a 24 hour period. The exact boundary between the Domains is not particularly significant since there is presently no clear reason to operate at this transition, and the transition may be slightly sensitive to variations in room temperature and other environmental variations so that any boundary concentration could be appropriately identified with a range similar to error bars. The rheology remains Newtonian through Domain II, so a change in rheology does not provide any information on the transition into Domain II from Domain I.

The transition between Domain II and Domain III involves the surprising transition involving an end to settling at higher concentrations. At similar concentrations, the rheology becomes non-Newtonian as concentration increases. Specifically, the higher concentration dispersions become shear thinning. While not wanting to be limited by theory, it is possible that the shear thinning behavior, can be attributed to disentanglement and alignment of nanowires under shear. It is not clear then why entanglement of the nanowires would inhibit settling rather than encourage settling at concentrations with high volumes of solvent; it is possible that with higher nanowire concentrations the viscosity builds up sufficient to dominate the settling and surprisingly this appears to occurs via particle-particle interactions which do not lead to larger mass particles which would have a higher tendency to settle. With respect to stability against settling, this can again be evaluated after 24 hours without mixing.

At the achievement of Domain IV, the dispersion becomes a paste, which as used herein indicates that the material does not flow without shear, so it is a solid under no shear and a flowable liquid under shear. So from a practical standpoint, the material stays in place where deposited, but it can be formed or spread. While flow is an everyday experience, it is useful to express the concept in a way to avoid confusing beading due to surface tension with lack of flow. A material is considered non-flowing if a 5 gram amount is placed in a surface in a 1 centimeter diameter area and inclined at a 60 degree angle relative to the horizontal and does not flow down the surface. Clearly this is a qualitative test and not expected with mathematical precision. As with the other transitions between domains, the precise boundary may be influenced by environmental conditions, and it may be useful to consider the boundary as a small range.

The concentrated dispersions are observed to exhibit a surprising degree of electrical conductivity. In the pastes of Domain IV, a transition is observed to occur suggestive of reaching a percolation threshold indicating the availability of new conduction pathways corresponding with a sharp drop in electrical resistance. The drop in electrical resistance is dependent on the silver nanowire length and concentration. While higher loadings of shorter nanowires are achievable with appropriate aspect ratios, the conductivity can be greater for the longer nanowires at lower concentrations. Thus, there are significant material design options depending on the objectives for the use of the material.

As noted above, with the recognition of new forms for silver nanowire dispersions, stability can be specified in an appropriate way to reflect these new materials. As used herein, stability is determined by the lack of hard agglomerates, so that the materials can be redispersed in the original volatile solvent with non-damaging mixing to achieve a stable low concentration dispersion. So in a sense the dispersions are reversible and therefore stable in their concentrated states. The dilute dispersions can be characterized by expected properties upon achieving a well mixed dispersion. While the precise concentration is not important from a property perspective, to provide some specificity to the evaluation process, a concentration of 0.1 wt % solids, 1 wt % solids or similar concentration can be used for the dilute reconstituted dispersion. The reconstituted dilute dispersion should exhibit no formation of hard agglomerates over three days of sitting without stirring, although this time period is likely much longer, the selection of three days provides a practical period for the testing. In addition, an optical spectrum can be used to evaluate the freedom from agglomeration of the dispersed nanowires.

Electrical resistance is measured in units of Ohms. A measured resistance depends on the geometry of the conduction pathway and the conductor. For a material, the resistivity is an intrinsic parameter that it is independent of size and has units of ohms time length. For a uniform material, the resistivity p can be evaluated from the equation $\rho=R\,A/l$, where R is the measured resistance in Ohms, A is the area of the edges of the conductor perpendicular to the conduction path, and l is the length of the conduction path. To obtain resistivity in ohm·cm, A should be in $cm^2$ and l in cm. Electrical resistance of thin coatings can be expressed as a sheet resistance (Rs), which is reported in units of ohms per square ($\Omega/\square$ or ohms/sq) to distinguish the values from bulk electrical resistance values according to parameters related to the measurement process. Sheet resistance along a surface can be generally measured using a four point probe measurement or another suitable process. If the thickness of the structure is known or measurable, the resistivity ($\rho$) can be evaluated as $\rho=R_s\cdot t$, where t is the average thickness.

The concentrated dispersions are found to be conductive with resistivities on the order of 106 ohm cm. For higher concentrations corresponding to the pastes, the resistivity undergoes modest drop in value until a certain concentration is reached at which point the resistivity drops significantly, which seems to indicate a change in conduction mechanism. For one type of silver nanowire, this transition seems to occur around 60 wt % nanowires with resistivities below 1 ohm cm. Pastes generally can exhibit resistivities of no more than about 1 $\Omega$cm, in further embodiments no more than about 0.1 $\Omega$cm, and in other embodiments from about $5\times10^{-2}$ $\Omega$cm to about $5\times10^{-4}$ $\Omega$2 cm. Since rheology properties and electrical conduction do not go together with respect to nanowire dimensions, this transition to lower values of resistivity may be at significantly different loadings. Applicant has measured resistivities of <10 ohm-cm in a variety of concentrated dispersions—i.e. different solvents. A person of ordinary skill in the art will recognize that additional ranges of resistivity within the explicit ranges above are contemplated and are within the present disclosure.

The UV/Vis spectrum can be diagnostic of silver nanowire properties as well as the quality of the dispersion. In general, the evaluation of the absorption spectrum is performed in a dilute dispersion to obtain meaningful spectral measurements. As noted above, stable dispersions can be diluted to form dilute dispersions. UV-Vis spectra of the resulting dilute dispersions can be used to evaluate the dispersions. Thin and uniform silver nanowires dispersed in DMSO solvent were characterized by UV-Vis absorption spectra in the '230 patent cited above. Utilizing UV-Visible extinction to characterize nanowire diameters and quality is well-known to a person of ordinary skill in the field.

The UV Visible absorption spectrum in isopropyl alcohol was used to characterize concentrated dispersions that were diluted to 0.005 wt % silver, although at low concentrations the normalized spectrum generally is not significantly sensitive to the concentration. As used herein, a normalized absorption spectrum sets the highest value to 1 and the lowest value to 0 within the wavelength range of 300 nm to 800 nm. As the average nanowire diameter gets smaller, the extinction maximum tends to shift to lower wavelengths (blue-shift). As the silver nanowires become more uniform, the extinction peak tends to narrow. The tail of the absorption spectrum at higher wavelengths seems to be sensitive to dispersion quality as it indicates aggregation and a decrease in the quality associated with the plasmonic response associated the well-dispersed individual nanowires.

To reduce possible misinterpretation of the extinction spectra due to the solvent or nanowire dimensions, spectra can be compared with absorption spectra obtained from a dilute dispersion formed with the silver nanowires, so an extinction spectra of a sample diluted from a concentrated dispersion can be evaluated in a direct way. Agglomeration of the nanowires is found to alter in particular the longer wavelength tail of the absorption spectrum, and well dispersed nanowires should exhibit a very similar absorption spectrum over the full spectrum.

If solvent is completely removed, the resulting mass reaches a point at which the material can no longer be redispersed. The agglomeration becomes hard and not reversible. The point at reaching the irreversible state again depends on the nanowire geometry and the solvent. The electrical conductivity can be further improved in these masses. In such extreme cases, the nanowires are so aggregated they lose their plasmonic character completely and the characteristic extinction peak associated with the surface plasmon can disappear. When the material is in a paste state, it can be molded into a desired form for complete drying if that is desirable. This is Domain V, which is unique in that it is not stable in the sense presently being used. Once all of the solvent is removed, the electrical conductivity increases, with resistivity values on the order of a hundredth of the resistivity of bulk silver.

While over significant domains of concentration, the viscosity and rheological behavior can be used to characterize the dispersion. But by adjusting the concentration, solvent and potentially additives, desired values of viscosity can be available. Over certain values, the viscosity is generally non-Newtonian. With these perspectives, viscosity is selectable over a reasonable range. The Newtonian character of the viscosity can be evaluated at a low shear value of 0.1 s$^{-1}$. Viscosity can be evaluated using a commercial rotational rheometer, such as from Brookfield or Haake. In some embodiments, the viscosity of a flowable concentrated dispersion can be at least about 500 cP (cP=mPa·s), in further embodiments at least about 750 cP, in other embodiments from about 1000 cP to about from about 1250 cP to about 50,000 cP and in additional embodiments from about 1500 cP to about 40,000 CP. Viscosity and other parameters herein are evaluated at room temperature of about 25° C. A person of ordinary skill in the art will recognize that additional ranges of viscosity within the explicit ranges above are contemplated and are within the present disclosure.

Qualitatively, the concentrated dispersions can be characterized as flowable or non-flowable. As noted above, flowable dispersions can be characterized by flowing down a surface having a 60 degree angle. For use, flowable dispersions provide desirable versatility with respect to delivery in various desired locations. Concentrations and viscosity can be adjusted to be compatible with a selected delivery approach, such as jetting, dispensing, printing or coating. In some embodiments, paste dispersions are suitable for spreading at a particular location for forming a device or structure incorporating the paste-dispersion. At some point, for most application, the dispersion after application is dried or allowed to dry through the removal of the rest of the solvent and/or a curing process to convert the dispersion into a solid. Curing can comprise crosslinking polymer components, polymerizing monomers, oligomers, or small polymers, reducing silver salt to silver metal, or a combination thereof of two or more effects.

In one limit, the dried solid material can take the form of an essentially metallic mass with embedded polymer dispersant and potentially other minor organic components. In another limit, the dried material is a polymer metal composite, which in some embodiments can be an electrically conductive adhesive in accepted terminology, with metal loadings that can span a range of values. Once the dispersion is dried, cured, dried and cured, or the like, as appropriate, there is no immediate reminder of the initial state of the composition at the time of delivery. Nevertheless, the concentration of the dispersion at delivery to for a deposit that is then further processed to form a material can influence the material properties depending on the material compositions.

With respect to materials that are substantially metal formed with primarily silver nanowires, prior work has formed these deposits using moderately concentrated silver nanowire dispersions. See the '732 application cited above. These deposits can comprise no more than about 25 wt % organics, in further embodiments no more than about 15 wt % organics, in some embodiments from about 0.025 wt % to about 10 wt % organics and in other embodiments from about 0.1 wt % to about 7.5 wt % organics. Potential organic components are discussed above in the context of the dispersions, and the materials will comprise the nonvolatile organics as well as organics that polymerize or crosslink to become nonvolatile prior to their evaporation. With respect to the metal component, generally at least about 75 wt % of the metal in the material originates from silver nanowires with the remainder of the metal potentially coming from other metal particulates or reduction from metal salt, such as silver salt. Even well purified silver nanowires have copurified other particulate shapes, primarily nanoparticles, but potentially other shapes such as nanocubes, nanorods or nanoplates. It can be difficult to accurately quantify contaminant levels in a nanowire collection, but reasonable limits can be established. As noted above, the silver salt can be reduced to silver metal, which becomes part of the collective metal contribution of the material. In some embodiments, the portion of metal from silver nanowires can be from about 75 wt % to about 99.5 wt %, in further embodiments from about 80 wt % to about 99 wt % and in other embodiments from about 82.5 wt % to about 95 wt %. In additional embodiments, all of the silver can be provided by purified silver nanowires with the extent of copurified metal contaminants. A person of ordinary skill in the art will recognize that additional ranges of material components within the explicit ranges above are contemplated and are within the present disclosure.

While the materials described in the previous paragraph can comprise various organic components, there is particular interest in composites comprising a polymer matrix surrounding the metal elements of the structure. Low values of resistivity have been obtained with low amounts of metal loading from silver nanowires supplemented with metal from reduced silver salt. See the '737 application cited above. The procedures for forming higher concentration dispersions described herein can be adapted to the formation of composites with higher metal loading in a polymer matrix. Generally, these composites have at least about 25 wt % metal and at least about 10 wt % matrix polymer, although the composites can comprise additional organic components as described above in the context of the dispersions. In some embodiments, the composites comprise from about 25 wt % metal to about 90 wt % metal, in further embodiments from about 35 wt % metal to about 87.5 wt % metal, in other embodiments from about 40 wt % metal to about 86 wt % metal and in additional embodiments from about 50 wt % metal to about 85 wt % metal. Furthermore, the composites can comprise from about 10 wt % to about 75 wt % matrix polymer, in further embodiments from about 12.5 wt % to about 65 wt % matrix polymer, in other embodiments from about 14 wt % to about 60 wt % matrix polymer, and in additional embodiments from about 15 wt % to about 50 wt % matrix polymer. A matrix polymer generally is chemically or physically crosslinked polymer resistant to dissolving in all or most nondestructive solvents. A person of ordinary skill in the art will recognize that additional ranges of composite components within the explicit ranges above are contemplated and are within the present disclosure.

The high loading dispersions described herein are generally directed to forming opaque materials and structures. If applied in a thin enough deposit, it is plausible that some light transmittance can be achieved, but due to the properties of the dispersion forming a thin deposit can be difficult, at least, without diluting the silver nanowire dispersions. While forming the high loading dispersions and subsequently diluting them seems like significant wasted effort, this can be advantageous for shipping purposes. Depending on the balance of efficiencies, this can be a useful approach for product distribution. Starting with a concentrated dispersion, a customer can perform a degree of dilution desired for their use. From this perspective, the ability to form a high loading dispersion amenable to subsequent dilution to a well dispersed dilute dispersion can be advantageously used for a range of applications from transparent to opaque.

Regardless of the specific processing, the dispersions are generally used to form electrically conductive materials. Due to a commonality of mechanisms, good electrical conductors are generally also good thermal conductors, although the correlation should not be expected to be perfect, and many systems are believed to follow the well known Weidemann-Franz law. For example, it has not been established if reduced silver salt improves thermal conductivity in addition to electrical conductivity. Of course, the extent of electrical conductivity can be adjusted for the application and selection of other material properties. As found herein, the use of reduced silver salt can be effective to reduce the resistivity of the material for a given amount of silver nanowires and for the achievement of the lowest achievable resistivity values.

Processing to Form Cured Products

While the term "cured" can take distinct meanings in different field, as used herein, cured broadly refers to processing to form a dried material from a dispersion, even if the dispersion has a resemblance to a solid. In addition to or alternatively to removing solvent, curing may involve, for relevant embodiments, polymerization of monomers or oligomers, crosslinking of polymers, reduction of silver salt, or a combination thereof. Curing can comprise simply aging under conditions to allow evaporation, application of heat for a selected period of time at a specified temperature, delivery of radiation, or a combination thereof. The final material depends on both the composition used to form a deposit that is processed into the material, as well as the processing used.

For use of the concentrated dispersion, a quantity of dispersion is deposited to form a corresponding deposit. The deposition technique is generally correlated with the dispersion properties. For example, paste like material can be extruded, calendered, screen printed or the like. Flowable materials may also be deposited using the methods described for pastes, but also can be deposited using jetting, printing, slot coating, or the like. The dimensions of the deposit are not generally limiting, although pastes and highly viscous concentrated dispersions may be difficult to form in extremely thin deposits that can be readily formed with dilute dispersions. The areal dimensions generally correspond to the dimensions appropriate for the applications. With higher concentration dispersions, the shrinkage resulting from drying is significantly less then observed with the drying of dilute dispersions, and wet dimensions can be selected accordingly to achieve desired dry dimensions.

As explained in detail above, the concentrated dispersions may have higher boiling point solvents or non-volatile solvents. For simply removing higher boiling point, inert solvents, heat may or may not be applied, and reduced pressure can be used if desired to facilitate evaporation. Blowing air or other gas across the deposit with or without heating can also be used to speed evaporation. As noted above, solvent and/or other dispersion components can comprise precursors for a polymer matrix. The polymer matrix may be chemically crosslinked, physically crosslinked or a solidified solid polymer. Formation of physical crosslinks can naturally result from solvent removal through precipitation of a dissolved polymer and/or as a result of polymerization for chain elongation. Chemical crosslinking generally can comprise addition type reactions at polymer side chains. Crosslinking reactions can be free radical reactions, electrophile-nucleophile reactions, redox reactions or any other suitable reactions.

For embodiments based on polymerization and/or crosslinking of polymers, thermal reactions can be most convenient since UV radiation or other suitable radiation generally is not particularly penetrating, so radiation driven curing may be only effective for very thin deposits. For the reduction of silver ions in these dense silver nanowire deposits, it has been found that higher heat for longer time is needed to reduce the silver ion than was observed for transparent conductive films. As seen in the examples, the reduction of the silver ion is observed to significantly reduce the resistivity. The physical effects of the silver deposition is still being explored. To effectuate silver ion reduction and/or polymer curing, the deposited samples can be heated to temperatures of at least about 120° C., in some embodiments from about 130° C. to about 300° C., in further embodiments from about 140° C. to about 275° C., and in additional embodiments from about 150° C. to about 250° C. The heating can be performed for at least about 3 minutes, in further embodiments from about 5 minutes to about 3 hours and in other embodiments from about 8 minutes to about 2 hours. After this processing, the solvent may nor may not be fully removed, and if additional solvent is present, further drying steps can be taken. For deposits with silver salt, a milder heating can be performed to "melt" the deposit, which can be used to facilitate repositioning the deposit, if desired. Following melting, processing to cure the deposit can continue. A person of ordinary skill in the art will recognize that additional ranges of temperature and time within the explicit ranges above are contemplated and are within the present disclosure.

Applications of Concentrated Dispersions

Based on the novelty of the concentrated dispersions, an exploration of suitable applications is at its infancy. In the context of exploring the material properties, applications were discussed above. For example, as noted there, the concentrated dispersions can be a convenient form for distributing silver nanowires, which can be subsequently diluted and dispersed to form a desired silver nanowire dispersion concentration for use. The conductive pastes provide the possibilities of directly using the conductive pastes as electrical and thermal conductors in suitable applications. For these pastes, either a non-volatile solvent can be used or the material can be placed in an environment restricting solvent evaporation.

With respect to the concentrated flowable dispersions, these materials provide greatly enhanced possibilities for the blending with resins for forming silver nanowire loaded polymer composites. The lower solvent levels can facilitate forming higher loadings with less process effort. Highly conductive materials with a high silver content provided by silver nanowires can achieve low values of resistivity. These opaque materials can serve as solder alternatives, printable conductive wires/lines, conductive traces or other desired highly conductive structures that can be effectively placed using appropriate printing or coating processes, which can be performed at lower temperatures than metal deposition while providing comparably low resistivities.

EXAMPLES

General Methods and Materials
Viscosity Measurements

Measurements were performed with two different rotational rheometers. A first rheometer was a Brookfield Model DV-III+ Programmable Rheometer, which was limited to lower viscosity values. For higher viscosity measurements, use was obtained of a TA Instrument ARES-G2 Rheometer fitted with a 25 mm plate spindle. Viscosities were obtained either at a single shear rate or as a function of shear rate. Storage modulus and loss modulus as a function of angular frequency were also measured for selected dispersions. Measurements were carried out at 25° C. unless indicated otherwise.

Resistivity Measurements

Dispersions were shaped into a cylinder using a thin tube when necessary or into rectangular composites. Resistances were then measured for conduction from one end of the tube or rectangular structure to the other using a two point probe equipped with multimeter. Resistivities were then computed from the sample geometry and measure resistances.

H-Nanowires

Silver nanowires referred to as H-nanowires (H-NW) were synthesized in a closed reactor system wherein a heated reaction solution of ethylene glycol (EG), polyvinylpyrrolidone (PVP K30 from BASF) and $NH_4Cl$ was prepared, followed by addition of $AgNO_3$, with continuous stirring for several hours at a temperature of about 160° C. Following completion of the synthesis, the silver nanowires were purified using acetone precipitation, and re-dispersion in water or other solvents. The purified silver nanowires were removed from dispersion, dried, and characterized by electron microscopy as described, for example, in U.S. Pat. No. 10,714,230 to Hu et al. The H-nanowires were prepared with diameters of about 60 nm (H-60). The nanowires had an average length of about 6 microns.

N-Nanowires

Silver nanowires referred to as N-nanowires (N-NW) were obtained from Applicant C3Nano, Inc. with synthetic procedures described in U.S. Pat. No. 10,714,230 to Hu et al. The N-nanowires had an average diameter of about 20-22 nm and a length of about 20 microns.

Solvents

The following solvents were used in the examples:
benzyl alcohol (BnOH),
butoxytriglycol (BTG),
butyl carbitol (BC),
1-butyl-3-methylimidazolium tetrafluoroborate (BMIBF$_4$),
1-butyl-3-methylimidazolium hexafluorophosphate (BMIPF$_6$),
cyclohexanol (CH), deionized $H_2O$ (DIW)
diethylene glycol (DEG),
difunctional cycloaliphatic diepoxide, Celloxide 2021P from Daicel U.S.A., Inc. (Cello),
dimethylacetamide (DMAc),
dimethyl sulfoxide (DMSO),
ethanol (EtOH),
ethoxy triglycol (ETG),
ethyl lactate (ELA),
2-ethyl-4-methylimidazolium tetrafluoroborate (EMIBF$_4$),
ethylene glycol butyl ether (EGBE),
1-hexyl-3-methylimidazolium hexafluorophosphate (HMIPF$_6$),
hydrogenated bisphenol A-type epoxy resin, YX8000D from Mitsubishi Chemical (YX),
N-hydroxyethyl acrylamide (HEAA),
2-hydroxyethyl methacrylate (HEMA)
i-propanol (IPA),
N-methyl-2-pyrrolidone (NMP),
radiation curable optical adhesive, NOA85 from Norland Optical Adhesives (NOA),
propylene glycol (PG), and
triethylene glycol (TEG).

Salts

The following salts were used in the examples:
silver acetate (AgAc),
silver fluoride (AgF),
silver heptafluorobutyrate $C_3F_7CO_2Ag$(AgHFB),
silver perchlorate (AgClO$_4$), and
silver trifluoroacetate (AgTFA).

Overview of Examples 1 and 2

Examples 1A-1H are directed to H-NW and N-NW silver nanowire dispersions in propylene glycol (PG) solvent. Examples 2A-11B are directed to H-NW and N-NW dispersions in various other solvents such as ethyl lactate (ELA), ethanol (EtOH), N-methyl-2-pyrrolidone (NMP), dimethyl sulfoxide (DMSO) and others. The dispersions were evaluated for their rheological and conductivity properties. UV-Vis spectroscopy was used to assess effects of dilution and redispersability from dried films formed from the dispersions. The effects of adding different amounts of PVP to the dispersions before incorporation into solvents were also evaluated. Qualitative assessment of regimes for the dispersions were also carried out.

Example 1A H-Nanowires in PG

Figure 5A:
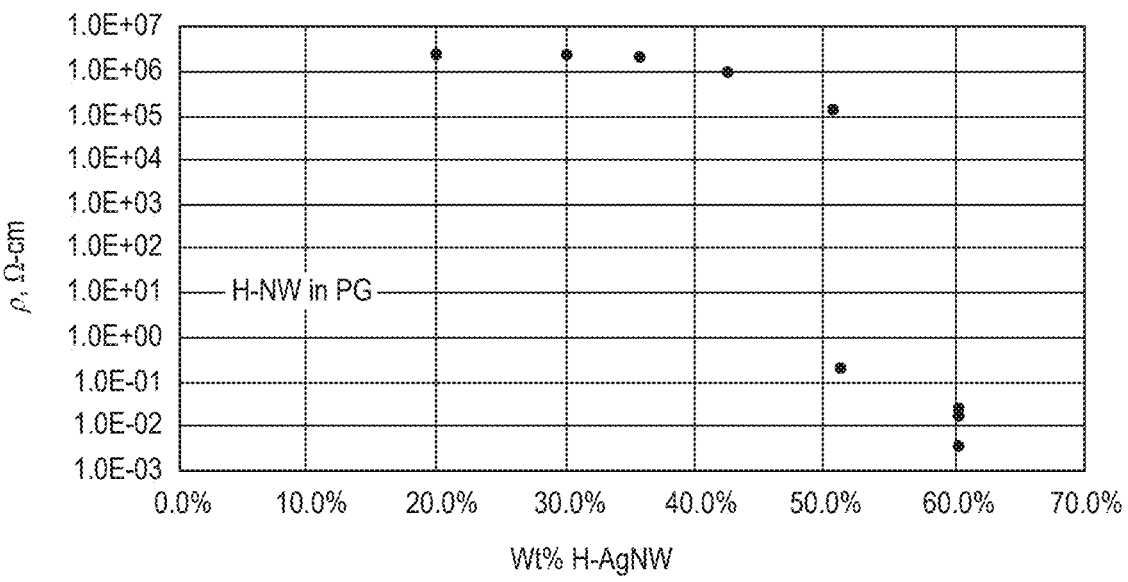
FIG. 5A is a plot of resistivity as a function of weight percent (wt %) for dispersions comprising H nanowires (H-NW) in propylene glycol (PG).
Figure 5B:
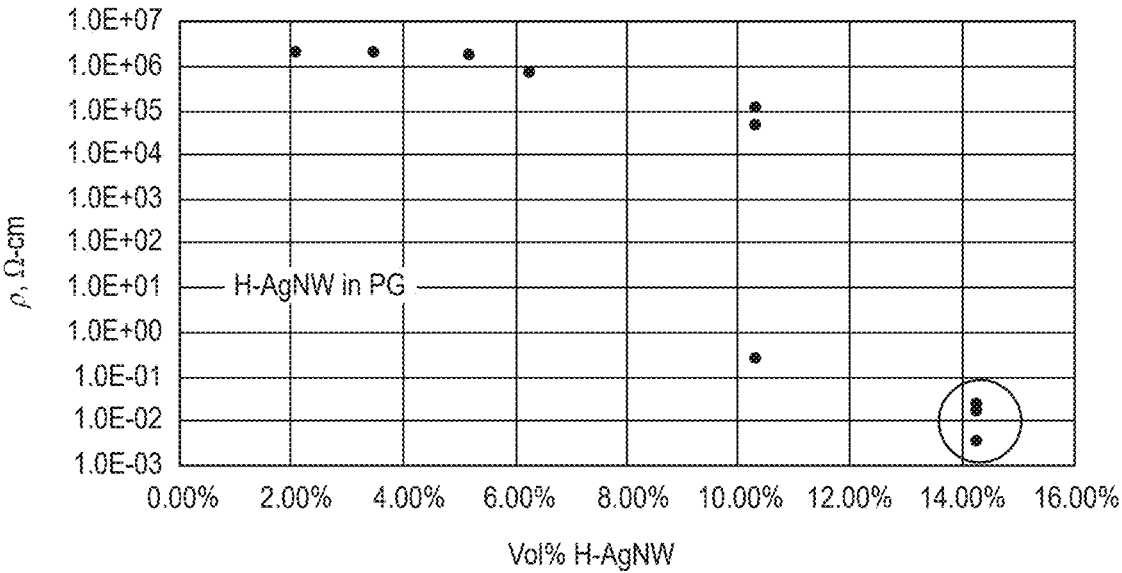
FIG. 5B is a plot of resistivity as a function of volume percent (vol %) for the H-NW dispersions of FIG. 5A.
Figure 6:
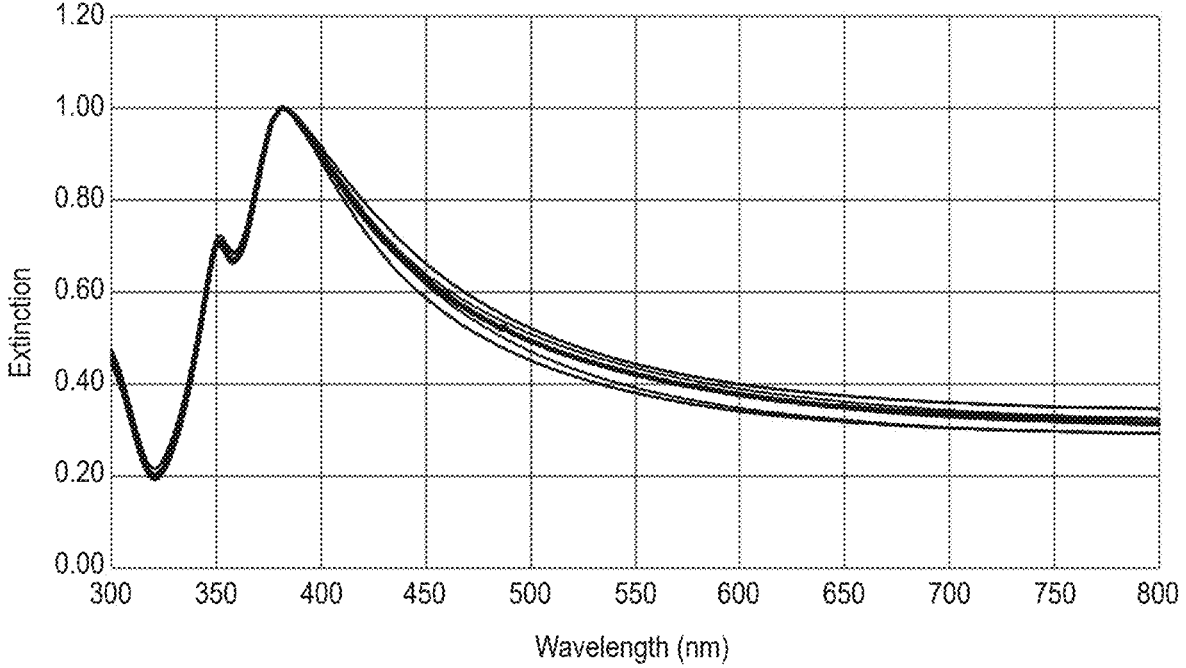
FIG. 6 shows normalized UV-Vis absorption spectra for selected H-NW dispersions in PG, at concentrations ranging from 60 wt % to 20 wt %.

H-Nanowires were initially dispersed in EtOH to obtain a dilute dispersion at a concentration of about 8 wt %. Dispersions at various concentrations of H-NW were directly prepared by addition of PG to the slurry followed by removal of EtOH using rotary evaporation with a bath temperature of about 60° C. While not reported in this example, residual EtOH is retained in the material after the removal process, and this is reported below. Viscosity and resistivity values were obtained and results are shown in Table 1 and FIGS. 5A and 5B. Selected dispersions were diluted with IPA to form dispersions at a concentration of 0.001 wt % solids. FIG. 6 shows normalized UV-Vis absorption spectra for H20-PG, H30-PG, H40-PG, H60-PGa, and H70-PG. The spectra suggest that good dispersion of H-NW was obtained for loadings ranging from 20 wt % to 70 wt % in PG.

TABLE 1

| H-NW Dispersion | Target Loading (wt %) | Calculated Loading (wt %) | Calculated Loading (vol %) | Viscosity, η (cP) 1 s⁻¹ | 10 s⁻¹ | 80 s⁻¹ | Resistivity, ρ (Ohm · cm) |
|---|---|---|---|---|---|---|---|
| H20-PG | 20 | 23.5 | 2.09 | 198 | 318 | 285 | $2.29 \times 10^6$ |
| H30-PG | 30 | 35.6 | 3.48 | 1389 | 1216 | 1143 | $2.38 \times 10^6$ |
| H40-PG | 40 | 42.4 | 5.20 | 2183 | 1607 | 1764 | $2.01 \times 10^6$ |
| | | | | | | | $2.20 \times 10^6$ |
| H45-PG[a] | 45 | 50.1 | | | | | $1.03 \times 10^6$ |
| H45-PG[b] | 45 | 50.1 | | | | | $8.16 \times 10^5$ |
| H50-PG | 50 | | | $6350^a$ | [b] | [b] | |
| H60-PG[a] | 60 | 59.7 | 10.30 | [b] | [b] | [b] | $1.29 \times 10^5$ |
| H60-PG[b] | 60 | | 10.30 | [b] | [b] | [b] | $4.71 \times 10^4$ |
| H60-PG[c] | 60 | 60.4 | 10.30 | [b] | [b] | [b] | $2.01 \times 10^{-1}$ |
| H70-PG[d] | 70 | 71.3 | 14.30 | [b] | [b] | [b] | $1.44 \times 10^{-2}$ |
| | | | | | | | $2.00 \times 10^{-2}$ |
| | | | | | | | $3.38 \times 10^{-3}$ |

Figure 7:
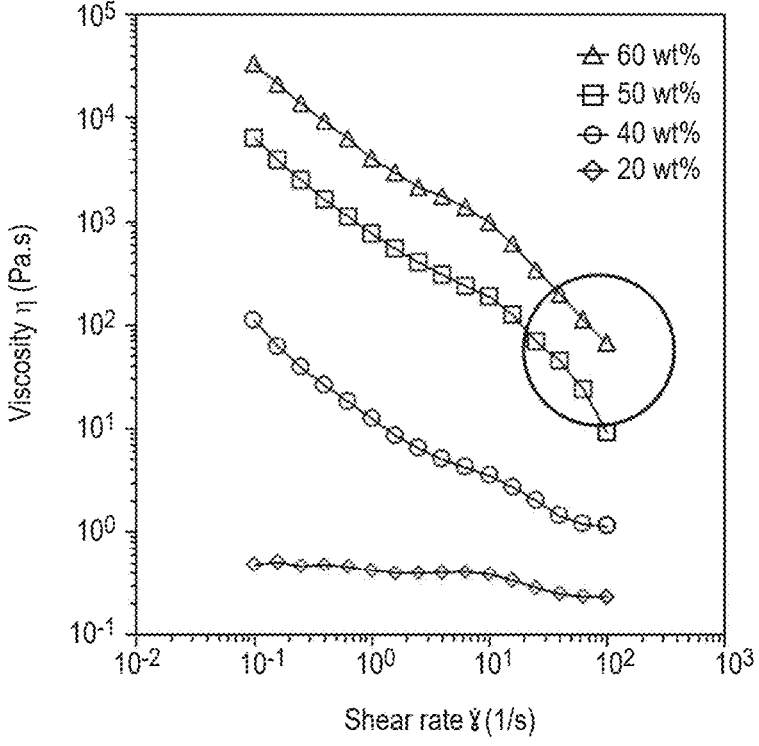
FIG. 7 shows a plot of viscosity as a function of shear rate for selected H-NW dispersions in PG.
Figure 8:
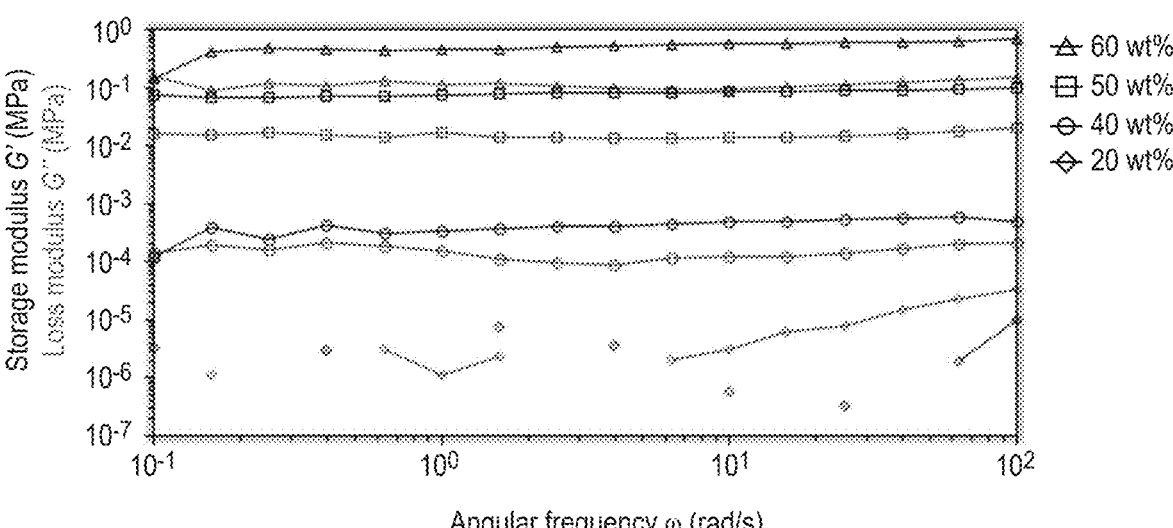
FIG. 8 shows a plot of storage modulus (dark grey) and loss modulus (light grey) as a function of angular frequency for selected H-NW dispersions in PG.

[a] at 0.5 s⁻¹; could not be measured at a higher shear rate
[b] too thick, could not be measured
[c] 2.6 wt % propylene carbonate in PG
[d] avg. resistivity $1.26 \times 10^{-2}$ Ohm · cm, std. deviation $8.47 \times 10^{-3}$ Ohm · cm Viscosity as a function of shear rate was measured for selected dispersions and results are shown in FIG. 7. Data points inside the circle indicate high shear rate dip due to material spinning out of gap which was seen after the end of the experiment. Storage modulus and loss modulus as a function of angular frequency were measured for selected dispersions and results are shown in FIG. 8.

Example 1B Rheology of Serial Dilutions of H70-PG

H-Nanowires were dispersed in EtOH to obtain a dilute dispersion at a concentration of about 2-8 wt %. An initial dispersion of H-NW at 70 wt % in PG (H70-PG) was directly prepared by addition of PG to the slurry followed by removal of EtOH as described for Example 1A. Six diluted samples were then prepared by serial dilution of H70-PG to obtain diluted dispersions H60-PG-dil through H10-PG-dil.

Rheology studies were carried out and data for H10-PG-dil through H40-PG-dil are shown in Tables 2-5, respectively. Data for H50-PG-dil, H60-PG-dil and H70-PG were not obtained as samples were too thick to measure with the particular rheometer.

TABLE 2

| H10-PG-dil Viscosity (cP) | Speed | % Torque | Shear Stress (Pa) | Shear Rate (s⁻¹) |
|---|---|---|---|---|
| 7937.60 | 0.10 | 0.77 | 1.59 | 0.20 |
| 7540.72 | 0.25 | 1.90 | 3.77 | 0.50 |
| 744.15 | 0.40 | 0.27 | 0.60 | 0.80 |
| 198.44 | 0.50 | 0.13 | 0.20 | 1.00 |
| 496.10 | 1.00 | 0.54 | 0.99 | 2.00 |
| 119.06 | 2.50 | 0.26 | 0.60 | 5.00 |
| 148.83 | 4.00 | 0.58 | 1.19 | 8.00 |
| 119.06 | 5.00 | 0.56 | 1.19 | 10.00 |
| 109.14 | 10.00 | 1.07 | 2.18 | 20.00 |
| 99.22 | 25.00 | 2.49 | 4.96 | 50.00 |
| 91.78 | 40.00 | 3.72 | 7.34 | 80.00 |
| 89.30 | 50.00 | 4.50 | 8.93 | 100.00 |
| 86.32 | 100.00 | 8.66 | 17.26 | 200.00 |
| 83.34 | 150.00 | 12.63 | 25.00 | 300.00 |
| 82.85 | 200.00 | 16.66 | 33.14 | 400.00 |
| 85.33 | 100.00 | 8.57 | 17.07 | 200.00 |
| 95.25 | 25.00 | 2.43 | 4.76 | 50.00 |
| 138.91 | 5.00 | 0.72 | 1.39 | 10.00 |
| 39.69 | 2.50 | 0.10 | 0.20 | 5.00 |

TABLE 2-continued

| H10-PG-dil Viscosity (cP) | Speed | % Torque | Shear Stress (Pa) | Shear Rate (s⁻¹) |
|---|---|---|---|---|
| 396.88 | 0.25 | 0.10 | 0.20 | 0.50 |
| 1984.40 | 0.05 | 0.08 | 0.20 | 0.10 |

TABLE 3

| H20-PG-dil Viscosity (cP) | Speed | % Torque | Shear Stress | Shear Rate (s⁻¹) |
|---|---|---|---|---|
| 1984.40 | 0.10 | 0.22 | 0.40 | 0.20 |
| 1587.52 | 0.25 | 0.36 | 0.79 | 0.50 |
| 3472.70 | 0.40 | 1.45 | 2.78 | 0.80 |
| 5953.20 | 0.50 | 2.97 | 5.95 | 1.00 |
| 694.54 | 1.00 | 0.69 | 1.39 | 2.00 |
| 635.01 | 2.50 | 1.64 | 3.18 | 5.00 |
| 520.91 | 4.00 | 2.11 | 4.17 | 8.00 |
| 515.94 | 5.00 | 2.65 | 5.16 | 10.00 |
| 515.94 | 10.00 | 5.24 | 10.32 | 20.00 |
| 432.60 | 25.00 | 10.93 | 21.63 | 50.00 |
| 404.32 | 40.00 | 16.25 | 32.35 | 80.00 |
| 392.91 | 50.00 | 19.82 | 39.29 | 100.00 |
| 357.19 | 100.00 | 35.97 | 71.44 | 200.00 |
| 334.04 | 150.00 | 50.52 | 100.21 | 300.00 |
| 318.00 | 200.00 | 64.12 | 127.20 | 400.00 |
| 356.20 | 100.00 | 35.85 | 71.24 | 200.00 |
| 432.60 | 25.00 | 10.95 | 21.63 | 50.00 |
| 515.94 | 5.00 | 2.64 | 5.16 | 10.00 |
| 555.63 | 2.50 | 1.39 | 2.78 | 5.00 |
| 1587.52 | 0.25 | 0.41 | 0.79 | 0.50 |
| 15875.20 | 0.05 | 0.81 | 1.59 | 0.10 |

TABLE 4

| H30-PG-dil Viscosity (cP) | Speed | % Torque | Shear Stress | Shear Rate (s⁻¹) |
|---|---|---|---|---|
| 29766.00 | 0.10 | 3.03 | 5.95 | 0.20 |
| 8731.36 | 0.25 | 2.21 | 4.37 | 0.50 |
| 3224.65 | 0.40 | 1.25 | 2.58 | 0.80 |
| 2976.60 | 0.50 | 1.48 | 2.98 | 1.00 |
| 4663.34 | 1.00 | 4.69 | 9.33 | 2.00 |
| 2063.78 | 2.50 | 5.15 | 10.32 | 5.00 |
| 1959.60 | 4.00 | 7.93 | 15.68 | 8.00 |

TABLE 4-continued

| H30-PG-dil Viscosity (cP) | Speed | % Torque | Shear Stress | Shear Rate $(s^{-1})$ |
|---|---|---|---|---|
| 1865.34 | 5.00 | 9.42 | 18.65 | 10.00 |
| 1676.82 | 10.00 | 16.85 | 33.54 | 20.00 |
| 1428.77 | 25.00 | 35.98 | 71.44 | 50.00 |
| 1284.90 | 40.00 | 51.82 | 102.79 | 80.00 |
| 1222.39 | 50.00 | 61.63 | 122.24 | 100.00 |
| 0.00 | 0.00 | 0.46 | 0.99 | 0.00 |
| 0.00 | 0.00 | 0.41 | 0.79 | 0.00 |
| 0.00 | 0.00 | 0.49 | 0.99 | 0.00 |
| 0.00 | 0.00 | 2.19 | 4.37 | 0.00 |
| 1397.02 | 25.00 | 35.19 | 69.85 | 50.00 |
| 2043.93 | 5.00 | 10.30 | 20.44 | 10.00 |
| 2103.46 | 2.50 | 5.28 | 10.52 | 5.00 |
| 3968.80 | 0.25 | 1.03 | 1.98 | 0.50 |
| 11906.40 | 0.05 | 0.58 | 1.19 | 0.10 |

TABLE 5

| H40-PG-dil Viscosity (cP) | Speed | % Torque | Shear Stress | Shear Rate $(s^{-1})$ |
|---|---|---|---|---|
| 145853.40 | 0.10 | 14.69 | 29.17 | 0.20 |
| 80169.76 | 0.25 | 20.23 | 40.08 | 0.50 |
| 57547.60 | 0.40 | 23.22 | 46.04 | 0.80 |
| 48419.36 | 0.50 | 24.35 | 48.42 | 1.00 |
| 40084.88 | 1.00 | 40.37 | 80.17 | 2.00 |
| 26908.46 | 2.50 | 67.81 | 134.54 | 5.00 |
| 22795.80 | 4.00 | 91.92 | 182.37 | 8.00 |
| 0.00 | 0.00 | 7.35 | 14.49 | 0.00 |
| 0.00 | 0.00 | 5.78 | 11.51 | 0.00 |
| 0.00 | 0.00 | 5.60 | 11.11 | 0.00 |
| 0.00 | 0.00 | 5.60 | 11.11 | 0.00 |
| 0.00 | 0.00 | 4.48 | 8.93 | 0.00 |
| 0.00 | 0.00 | 4.34 | 8.53 | 0.00 |
| 0.00 | 0.00 | 3.73 | 7.34 | 0.00 |
| 0.00 | 0.00 | 5.21 | 10.32 | 0.00 |
| 0.00 | 0.00 | 6.04 | 11.91 | 0.00 |
| 0.00 | 0.00 | 110.00 | — | 0.00 |
| 0.00 | 0.00 | 3.10 | 6.15 | 0.00 |
| 21510.90 | 2.50 | 54.17 | 107.55 | 5.00 |
| 45244.32 | 0.25 | 11.36 | 22.62 | 0.50 |
| 91282.40 | 0.05 | 4.62 | 9.13 | 0.10 |

Another set of samples was prepared by direct selection of the desired PG concentration using the solvent exchange from EtOH. The initial dilute dispersion of the H-nanowires in EtOH was serially diluted with PG and subjected to the rotary evaporator to remove the EtOH with compositions shown in Table 6. For each concentration, dilution was calculated from the initial loading of 70 wt % and then normalized to 100 g. The percent Recovery is a measure of the actual weight relative to the expected weight after the removal of the EtOH by rotary evaporation (water bath 60° C.). The values over 100 wt % can be explained by the retention of ethanol after the rotary evaporation process. The retained ethanol was independent of the amount of PG.

TABLE 6

| H-NW Dispersion | H-NW (wt %)[a] | % Recovery |
|---|---|---|
| H70-PG | 59.3 | ~118 |
| H60-PG-dil | 52.6 | ~118 |
| H50-PG-dil | 42.4 | ~118 |
| H40-PG-dil | 33.9 | ~118 |
| H30-PG-dil | 25.4 | ~118 |

TABLE 6-continued

| H-NW Dispersion | H-NW (wt %)[a] | % Recovery |
|---|---|---|
| H20-PG-dil | 16.9 | ~118 |
| H10-PG-dil | 8.5 | ~118 |

[a]Normalized to 100 g.

Figure 9A:
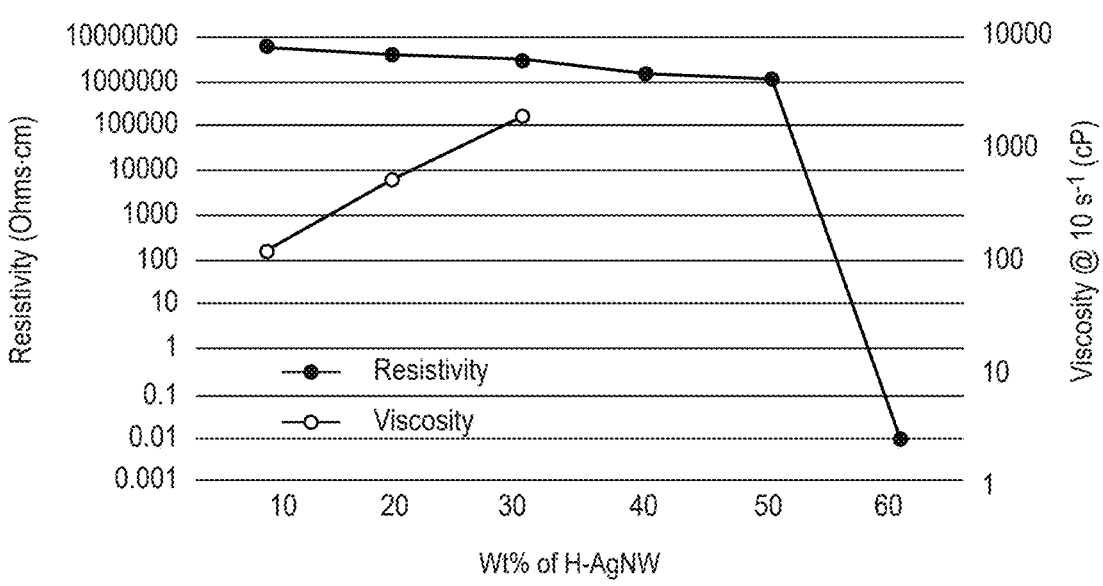
FIG. 9A shows a plot of resistivity and viscosity as a function of wt % for serially diluted dispersions comprising H-NW in PG.
Figure 9B:
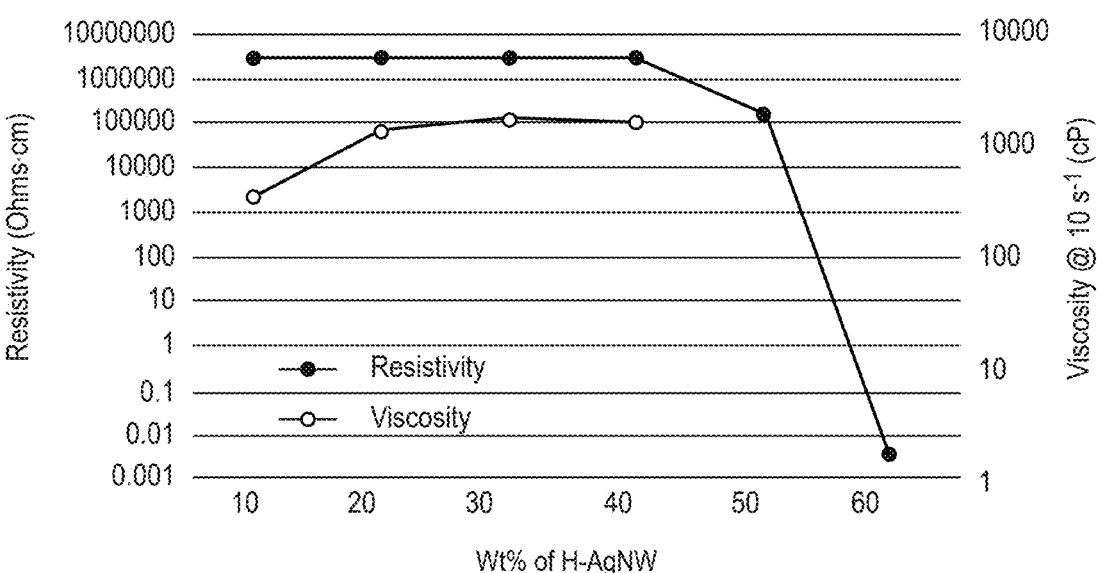
FIG. 9B shows a plot of resistivity and viscosity as a function of wt % for dispersions comprising H-NW in PG.

Example 1C Comparison of Viscosity and Resistivity of Serial Dilutions and Directly Prepared Dispersions of H-NW in PG Viscosity and resistivity were measured for each of the serially diluted samples and the "directly prepared" samples, and results are reported in Tables 7 and 8, respectively. Corresponding plots are shown in FIGS. 9A and 9B. Resistivity was calculated using a cross-sectional area of 2 cm$^2$ and a length of 12-14 cm.

TABLE 7

| H-NW Dispersion | Viscosity[1] at 10 s$^{-1}$ (cP) | Resistance (Ohms) | Resistivity (Ohm · cm) |
|---|---|---|---|
| H60-PG-dil | a | 0.4 | $9.66 \times 10^{-3}$ |
| H50-PG-dil | a | $45 \times 10^6$ | $1.09 \times 10^6$ |
| H40-PG-dil | a | $50 \times 10^6$ | $1.31 \times 10^6$ |
| H30-PG-dil | 1865 | $125 \times 10^6$ | $2.80 \times 10^6$ |
| H20-PG-dil | 516 | $160 \times 10^6$ | $3.86 \times 10^6$ |
| H10-PG-dil | 119 | $243 \times 10^6$ | $6.36 \times 10^6$ | a could not be measured, too thick

TABLE 8

| H-NW Dispersion | Actual Loading (wt %) | Viscosity[1] at 10 s$^{-1}$ (cP) | Resistivity (Ohm · cm) |
|---|---|---|---|
| H70-PG | 56 | a | $3.14 \times 10^{-3}$ |
| H60-PG | 59 | a | $1.29 \times 10^5$ |
| H45-PG | 39 | 1468 | $2.01 \times 10^6$ |
| H40-PG | 33 | 1607 | $2.20 \times 10^6$ |
| H30-PG | 27 | 1216 | $2.38 \times 10^6$ |
| H20-PG | 18 | 318 | $2.29 \times 10^6$ | a could not be measured, too thick

Example 1D Other Characterization of Serial Dilutions of H-NW in PG

Figure 10:
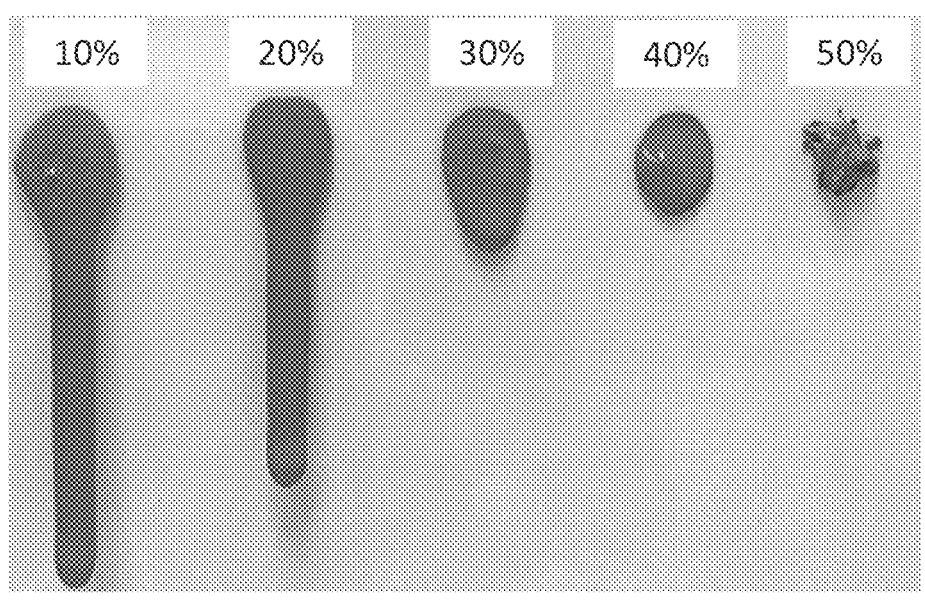
FIG. 10 shows samples of serially diluted dispersions of H-NW dispersed in PG wherein the samples are disposed on glass slides which are then kept at a 60 degree angle for a few minutes.
Figures 11A, 11B, 11C, 11D:
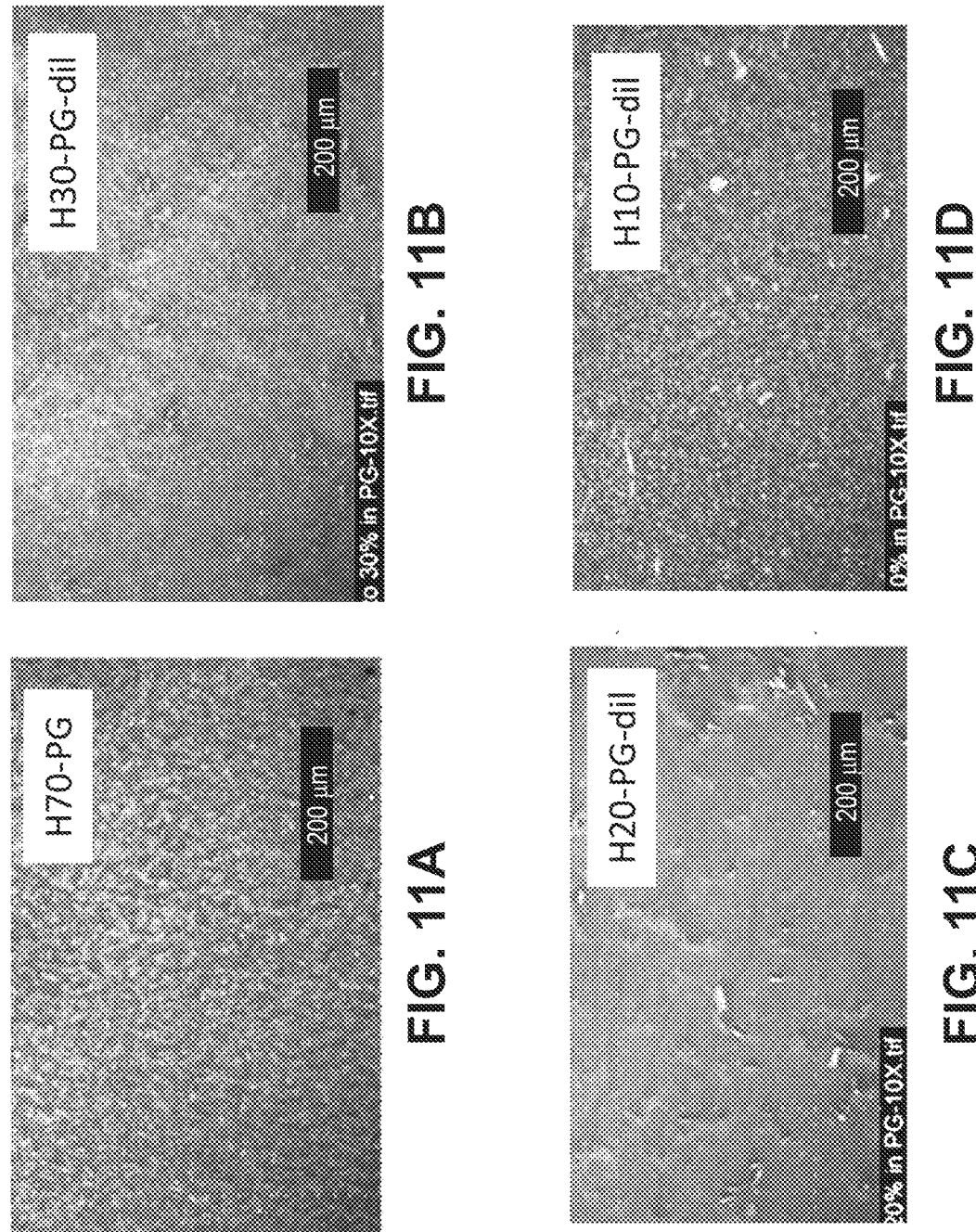
FIG. 11A is an image at 10× magnification of H-NW dispersed in PG at 70 wt % (H70-PG) and formed as an approximately 25 micron film between two glass substrates.
FIG. 11B is an image at 10× magnification of H70-PG serially diluted to 30 wt % and formed as an approximately 25 micron film between two glass substrates.
FIG. 11C is an image at 10× magnification of H70-PG serially diluted to 20 wt % and formed as an approximately 25 micron film between two glass substrates.
FIG. 11D is an image at 10× magnification of H70-PG serially diluted to 10 wt % and formed as an approximately 25 micron film between two glass substrates.

Samples of the serially diluted dispersions were placed on a glass slide at about a 60 degree angle and the glass slide was kept in the angled position for a few minutes. An image of samples H10-PG-dil, H20-PG-dil, H30-PG-dil, H40-PG-dil, and H50-PG-dil, from left to right, is shown in FIG. 10.

For each serially diluted sample, a droplet was injected between two glass substrates and approximate film thickness was determined. Images at 10× magnification were obtained from optical microscopy and selected images are shown in FIGS. 11A-11D for H70-PG, H30-PG-dil, H20-PG-dil and H10-PG-dil, respectively. Regime and approximate film thickness are summarized in Table 9.

TABLE 9

| H-NW Dispersion | Regime | Approximate Film Thickness (microns) |
|---|---|---|
| H70-PG (initial) | Paste/dry | 25 |
| H60-PG-dil | Paste | 20 |

TABLE 9-continued

| H-NW Dispersion | Regime | Approximate Film Thickness (microns) |
|---|---|---|
| H50-PG-dil | Paste/clay | 20 |
| H40-PG-dil | Wet/glossy | 15 |
| H30-PG-dil | Wet/flowing | 5 |
| H20-PG-dil | Flowing | 5 |
| H10-PG-dil | Flowing | 5 |

Example 1E N-Nanowires in PG

N-Nanowires were dispersed in EtOH to obtain a slurry at a concentration of about 2-4 wt %. Dispersions of N-NW at concentrations ranging from 3 wt % to 10 wt % in PG were prepared as described for Example 1A. Viscosities were obtained and results are shown in Table 10.

TABLE 10

| N-NW Dispersion | Loading (wt %) | Viscosity, $\eta$ (cP) | | |
|---|---|---|---|---|
| | | $1\ s^{-1}$ | $10\ s^{-1}$ | $100\ s^{-1}$ |
| N7-PG | 7.0 | 19447 | 4445 | 1254 |
| N5-PG | 5.0 | 7739 | 1726 | 552 |
| N3.5-PG | 3.5 | 1389 | 337 | 101 |
| N3-PG | 3.0 | 3373 | 655 | 179 |

Figure 12A:
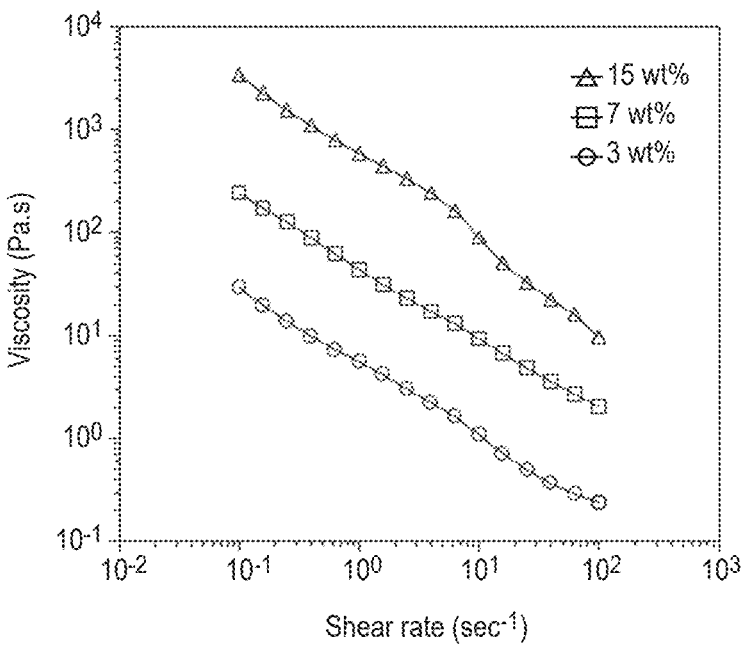
FIGS. 12A and 12B show plots of viscosity as a function of shear rate for dispersions comprising N-nanowires (N-NW) in PG.
Figure 12B:
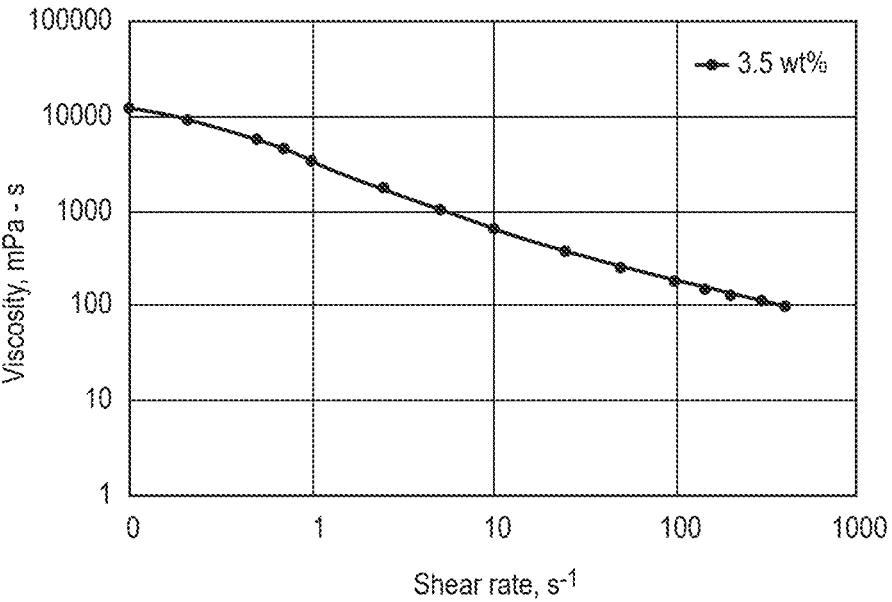
Figure 13:
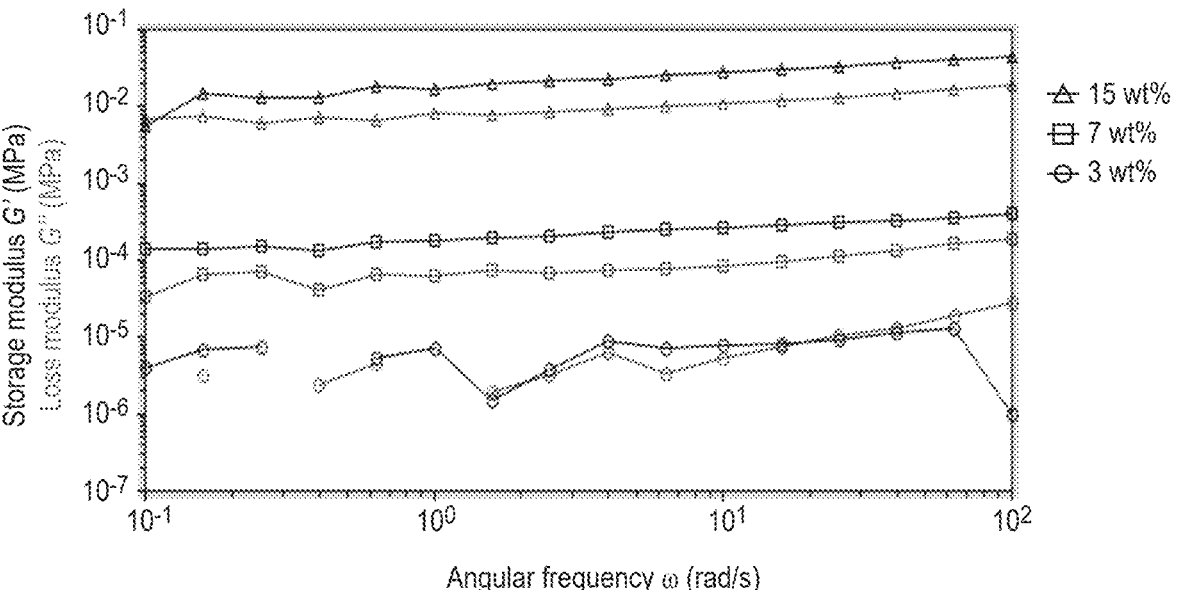
FIG. 13 shows a plot of storage modulus (dark grey) and loss modulus (light grey) as a function of angular frequency for N-NW dispersions in PG.

Viscosity as a function of shear rate was measured and results are shown in FIGS. 12A and 12B. Storage modulus and loss modulus as a function of angular frequency were measured for selected dispersions and results are shown in FIG. 13. With higher aspect ratio silver nanowires (N-wires vs. H-wires), the viscosity became high at relatively low concentration levels. Non-Newtonian rheology was observed at all concentration levels studied.

Example 1F UV-Vis Absorption Spectra for N15-PG

Dispersions of N-NW in PG were prepared by diluting N15-PG (15 wt % silver) as shown in Tables 11A and 11B to target the indicated silver weight percent values ranging from 10 wt % to 3 wt %. The initial dilute dispersion of the N-NW in EtOH was serially diluted with PG and subjected to the rotary evaporator to remove the EtOH. For each concentration, dilution was calculated from the initial loading of 15 wt %. The percent Recovery is a measure of the actual weight relative to the expected weight after the removal of the EtOH. The values over 100 wt % can be explained by the retention of ethanol after the rotary evaporation process. Concentrations of all components described for Tables 11A and 11B are summarized in Table 12.

Figure 14:
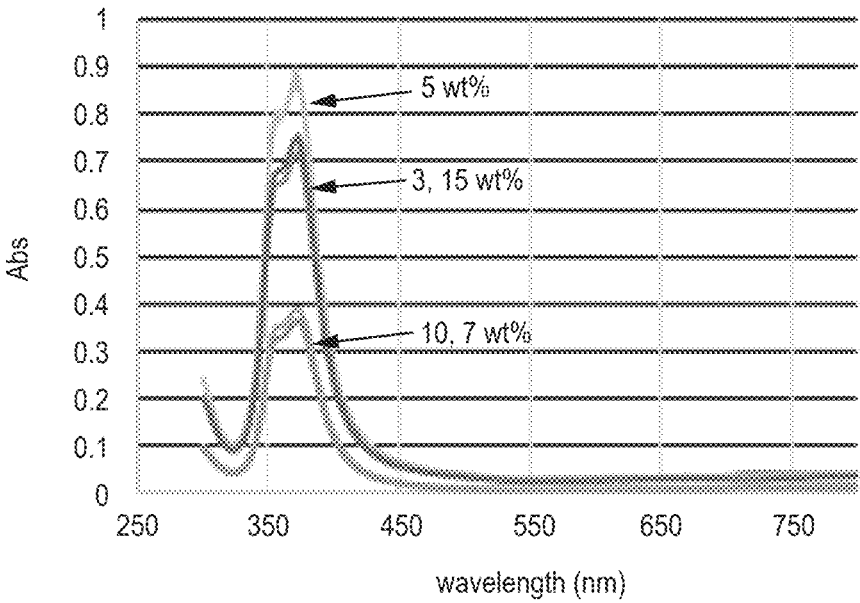
FIG. 14 shows UV-Vis absorption spectra for N-NW dispersions in PG.

The dispersions were subsequently diluted with IPA as shown in Table 13 for obtaining optical measurements. Corresponding UV-Vis absorption spectra are shown in FIG. 14.

TABLE 11A

| N-NW Dispersion | Target N-NW (wt %) | Amount of Mother Batch (g) | AgNW + PG (g) | AgNW (g) | PG (g) |
|---|---|---|---|---|---|
| N15-PG | 15 | mother batch | 7.5 | 1.125 | 6.375 |
| N10-PG | 10 | 1.605 | 1.500 | 0.225 | 1.275 |
| N7-PG | 7 | 1.070 | 1.000 | 0.150 | 0.850 |
| N5-PG | 5 | 0.803 | 0.750 | 0.113 | 0.638 |
| N3-PG | 3 | 0.482 | 0.450 | 0.068 | 0.383 |

TABLE 11B

| N-NW Dispersion | Final Total in PG Soln (g) | PG Added (g) | Total Soln (g) | Actual Final NW in PG + EtOH) (wt %) | Recovery (%) |
|---|---|---|---|---|---|
| N15-PG | — | 0 | 8.025 | 14.0 | 107 |
| N10-PG | 2.250 | 0.750 | 2.355 | 9.6 | 105 |
| N7-PG | 2.143 | 1.143 | 2.213 | 6.8 | 103 |
| N5-PG | 2.250 | 1.500 | 2.303 | 4.9 | 102 |
| N3-PG | 2.250 | 1.800 | 2.282 | 3.0 | 101 |

TABLE 12

| N-NW Dispersion | Ag (vol %) | PG (vol %) | PVP (vol %) | EtOH (vol %) |
|---|---|---|---|---|
| N15-PG | 1.57 | 89.95 | 2.48 | 6.00 |
| N10-PG | 1.02 | 93.01 | 1.61 | 4.36 |
| N7-PG | 0.71 | 95.80 | 1.12 | 2.36 |
| N5-PG | 0.51 | 97.21 | 0.80 | 1.48 |
| N3-PG | 0.30 | 98.61 | 0.48 | 0.62 |

TABLE 13

| N-NW Dispersion | Amount of Dispersion (g) | Total Weight After Adding IPA (g) | Take 0.1 g, dilute in 5 g IPA | Concentration for Measurement | Max Peak |
|---|---|---|---|---|---|
| N15-PG | 0.035 | 4.907 | 0.1/5 | $2 \times 10^{-5}$ | 0.721 |
| N10-PG-IPA | 0.05 | 4.777 | 0.1/5 | $2 \times 10^{-5}$ | 0.361 |
| N7-PG-IPA | 0.07 | 4.745 | 0.1/5 | $2 \times 10^{-5}$ | 0.386 |
| N5-PG-IPA | 0.1 | 4.886 | 0.1/5 | $2 \times 10^{-5}$ | 0.887 |
| N3-PG-IPA | 0.15 | 4.438 | 0.1/5 | $2 \times 10^{-5}$ | 0.756 |

Example 1G PVP Level Effect for N-NW in PG

Samples of 15 wt % N-nanowires in PG (N15-PG) were prepared using the approach described above. Additional quantities of PVP were added to examine the effects on the concentrated dispersions. The organic to silver (O/Ag) weight ratios were formed in the solids for three samples: O/Ag=0.13 for dispersion N15-PG-PVP-Ag, O/Ag=0.26 for dispersion N15-PG-PVP-Ag+1PVP, O/Ag=0.39 for dispersion N15-PG-PVP-Ag+2PVP. Compositions are shown in Tables 14A-14B and 15A-15B. The effects on retained ethanol as percent Recovery and the resulting resistivities are included in Table 15B.

Figure 15:
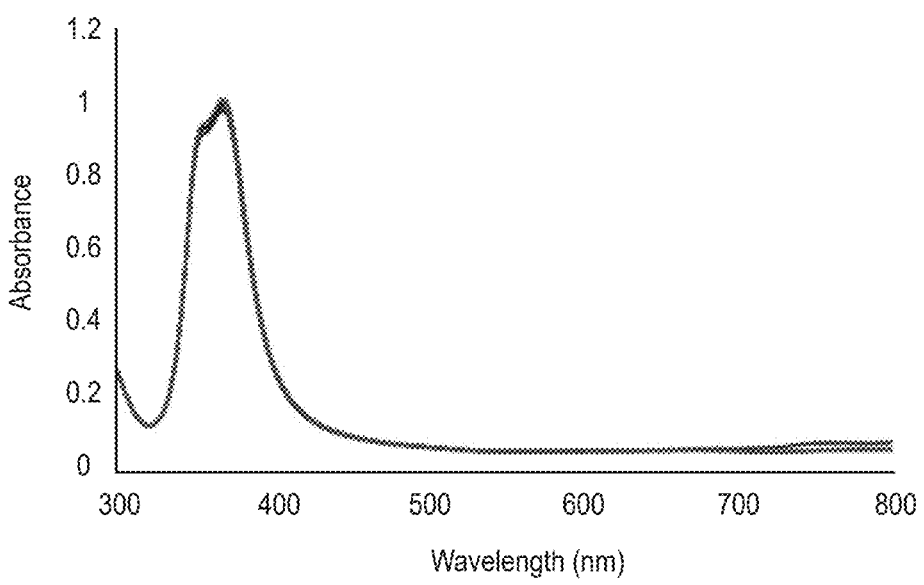
FIG. 15 shows UV-Vis absorption spectra for N-NW dispersions at 15 wt % in PG and including different levels of polyvinylpyrrolidone (PVP) expressed as a ratio of organics to silver (O/Ag) where O/Ag is 0.13, 0.26 and 0.39.
Figure 16:
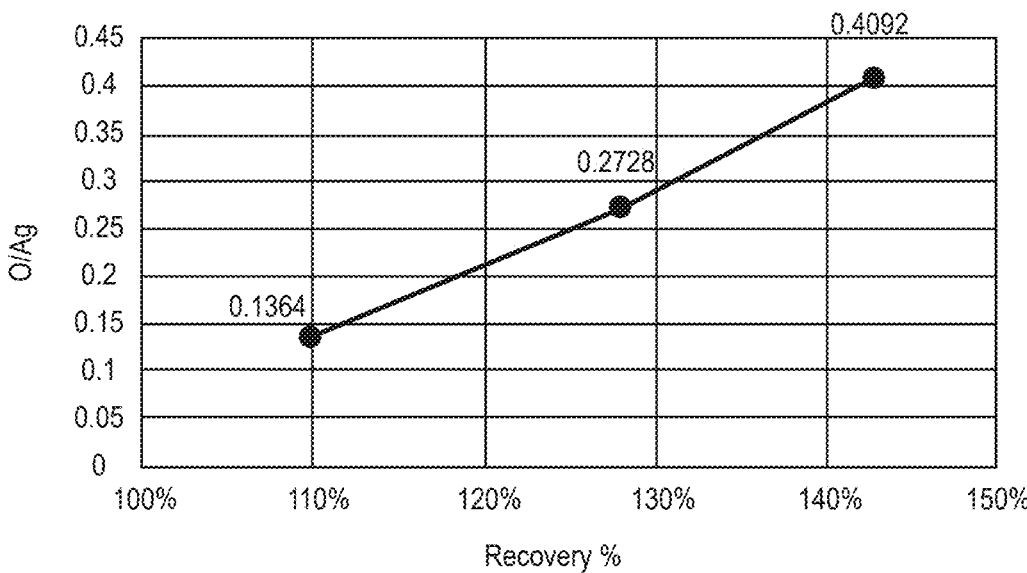
FIG. 16 shows a plot of O/Ag as a function of percent Recovery for the dispersions described in FIG. 15. Percent Recovery is the ratio of actual weight to expected weight expressed as a percentage, where values of greater than 100% indicate an amount of EtOH remaining in the dispersion after rotary evaporation.
Figure 17:
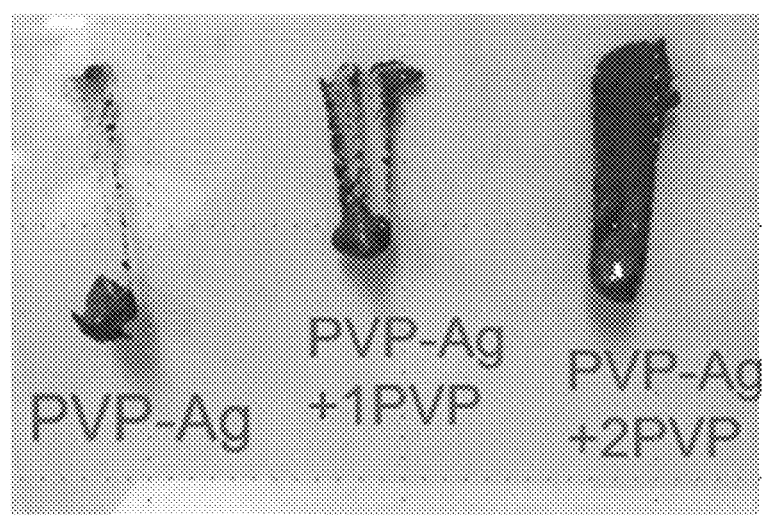
FIG. 17 shows the dispersions described in FIG. 15 in which, from left to right, O/Ag is 0.13, 0.26 and 0.39.

UV-Vis absorption spectra for dispersions N15-PG-PVP-Ag, N15-PG-PVP-Ag+1PVP and N15-PG-PVP-Ag+2PVP are shown in FIG. 15. A plot of O/Ag as a function of Recovery % is shown in FIG. 16. Samples of the three dispersions were placed on a glass slide at about a 60 degree angle and the glass slide was kept in the angled position for a few minutes. An image of samples N15-PG-PVP-Ag, N15-PG-PVP-Ag+1PVP and N15-PG-PVP-Ag+2PVP, from left to right, is shown in FIG. 17.

TABLE 14A

| N-NW Dispersion | N-NW Target (wt %) | N-NW (g) | N-NW (wt %) | PG (g) | PG (wt %) |
|---|---|---|---|---|---|
| N15-PG-PVP-Ag | 15 | 0.9 | 13.37 | 5.1 | 75.78 |
| N15-PG-PVP-Ag + 1PVP | 15 | 0.9 | 11.25 | 5.1 | 63.75 |
| N15-PG-PVP-Ag + 2PVP | 15 | 0.9 | 9.89 | 5.1 | 56.05 |

TABLE 14B

| N-NW Dispersion | PVP (g) | PVP (wt %) | EtOH (g) | EtOH (wt %) | Total Wt (g) |
|---|---|---|---|---|---|
| N15-PG-PVP-Ag | 0.12 | 1.82 | 0.61 | 9.02 | 6.73 |
| N15-PG-PVP-Ag + 1 PVP | 0.25 | 3.07 | 1.75 | 21.93 | 8.00 |
| N15-PG-PVP-Ag + 2PVP | 0.37 | 4.05 | 2.73 | 30.02 | 9.10 |

TABLE 15A

| N15-PG Dispersion | Target N-NW (wt %) | Org/Ag | N-NW (g) | PG (g) |
|---|---|---|---|---|
| N15-PG-PVP-Ag | 15 | 0.13 | 0.9 | 5.1 |
| N15-PG-PVP-Ag + 1PVP | 15 | 0.26 | 0.9 | 5.1 |
| N15-PG-PVP-Ag + 2PVP | 15 | 0.39 | 0.9 | 5.1 |

TABLE 15B

| N15-PG Dispersion | Expected Wt (g) | Obtained Wt (g) | Recovery (%) | Final Ag (%) | Resistivity ($\Omega \cdot cm$) |
|---|---|---|---|---|---|
| N15-PG-PVP-Ag | 6.123 | 6.73 | 110 | 13.37 | $1.04 \times 10^6$ |
| N15-PG-PVP-Ag + 1PVP | 6.245 | 8.0 | 128 | 11.25 | $9.18 \times 10^5$ |
| N15-PG-PVP-Ag + 2PVP | 6.369 | 9.1 | 143 | 9.89 | $3.30 \times 10^5$ |

The results suggest that the increase in the amount of PVP made removal of EtOH increasingly difficult as evidenced by the changes in percent Recovery. The UV-Vis absorption spectra suggest that the wet dispersions could be redispersed well in IPA. In general, the increase in the amount of PVP lead to improved coating quality and increased resistivity.

Effects on conductivity properties for coatings prepared from dispersions N15-PG-PVP-Ag, N15-PG-PVP-Ag+1PVP and N15-PG-PVP-Ag+2PVP dried under different conditions are presented in Table 16. Quantities of these dispersions were dried either in an oven or using high intensity pulsed light (IPL) provided by a system from XENON Corp. Redispersibility of these dispersions is further described in Example 4A. Increasing PVP level resulted in an increase in resistivity.

TABLE 16

| N-NW Dispersion | Dry Method | Resistance ($\Omega$) | Thickness ($\mu m$) | $R_s$ ($\Omega$/sq) 25 $\mu m$ | Resistivity, $\rho$ ($\Omega \cdot cm$) |
|---|---|---|---|---|---|
| N15-PG-PVP-Ag | oven | 0.91 | 7.7 | 0.04 | $9.11 \times 10^{-5}$ |
| N15-PG-PVP-Ag | IPL | 0.98 | 6.3 | 0.03 | $7.20 \times 10^{-5}$ |
| N15-PG-PVP-Ag + 1PVP | oven | 0.93 | 8.3 | 0.04 | $1.00 \times 10^{-4}$ |
| N15-PG-PVP-Ag + 1PVP | IPL | 0.89 | 8.3 | 0.04 | $1.11 \times 10^{-4}$ |
| N15-PG-PVP-Ag + 2PVP | oven | 1.47 | 14.7 | 0.10 | $2.49 \times 10^{-4}$ |
| N15-PG-PVP-Ac + 2PVP | IPL | 1.85 | 8.7 | 0.07 | $1.72 \times 10^{-4}$ |

Example 1H PVP Level Effect for H-NW in PG

Samples of 50 wt % H-nanowires in PG (H50-PG) were prepared using the approach described above. Additional quantities of PVP were added to examine the effects on the concentrated dispersions. The organic to silver (O/Ag) ratios were formed in the solids for three samples: O/Ag=0.25 for dispersion H50-PG-1AP, O/Ag=0.50 for dispersion H50-PG-1AP+PVP, O/Ag=0.25 for dispersion H50-PG-3AP+PVP. For H50-PG-1AP and H50-PG-1AP+PVP, the PVP is from the original batches. For H50-PG-3AP+PVP, the PVP is from H-NW batch that was first treated to obtain O/Ag=0.137. For these samples, the synthesized H-silver nanowires were further purified with 1 or 3 additional acetone precipitation and rinse steps to remove additional PVP (1AP or 3AP). In some samples additional PVP was added back in (+PVP). Compositions are summarized in Tables 17 and 18A-18B.

The effects on retained ethanol as percent Recovery are included in Tables 18A-18B. Target recovery % is 118%. For H50-PG-1AP and H50-PG-1AP+PVP, it takes almost same time/condition to reach 118%. However, for H50-PG-3AP+PVP, it appears to be very easy to pull away the solvent. The added free PVP added does not seem to help retain the solvent.

TABLE 17

| H-NW Dispersion | H-NW (wt %) | PG (wt %) | PVP (wt %) | EtOH (wt %) | Total (g) |
|---|---|---|---|---|---|
| H50-PG-1AP | 37.83 | 37.83 | 9.6 | 14.8 | 7.93 |
| H50-PG-1AP + PVP | 33.94 | 33.94 | 17.2 | 15.0 | 8.84 |
| H50-PG-3AP + PVP | 40.16 | 40.16 | 10.2 | 9.5 | 7.47 |

Form, wet resistivity and conditions for rotary evaporation (to remove EtOH) are shown in Table 19.

TABLE 18A

| H-NW Dispersion | H-NW Target (wt %) | Org/Ag | H-NW (g) | PG (g) | Expected Wt (g) |
|---|---|---|---|---|---|
| H50-PG-1AP | 50 | 0.2528 | 3 | 3 | 6.758 |
| H50-PG-1AP + PVP | 50 | 0.5056 | 3 | 3 | 7.517 |
| H50-PG-3AP + PVP | 50 | 0.2528 | 3 | 3 | 6.758 |

TABLE 18B

| H-NW Dispersion | PVP (g) | EtOH (g) | Obtained Wt (g) | Recovery (%) | Final Ag (wt %) |
|---|---|---|---|---|---|
| H50-PG-1AP | 0.758 | 1.172 | 7.93 | 117 | 37.83 |
| H50-PG-1AP + PVP | 1.517 | 1.323 | 8.84 | 118 | 33.94 |
| H50-PG-3AP + PVP | 0.758 | 0.712 | 7.47 | 111 | 40.16 |

TABLE 19

| H-NW Dispersion | H-NW Target (wt %) | Org/Ag | Form | Wet Resistivity ($\Omega \cdot$ cm) | Rotovap |
|---|---|---|---|---|---|
| H50-PG-1AP | 50 | 0.2528 | slurry | $9.89 \times 10^5$ | ~4 hr 40° C. 0.5 hr 60° C. |
| H50-PG-1AP + PVP | 50 | 0.5056 | liquid | $6.36 \times 10^5$ | ~3 hr 40° C. 0.5 hr 60° C. |
| H50-PG-3AP + PVP | 50 | 0.2528 | paste | $1.50 \times 10^{-2}$ | 0.5 hr 35° C. |

Effects on conductivity properties for dispersions H50-PG-1AP, H50-PG-1AP+PVP and H50-PG-3AP+PVP dried under different conditions are presented in Table 20. Quantities of these dispersions were dried either in an oven or using IPL.

TABLE 20

| H-NW Dispersion | O/Ag | Dry Method | Resistance ($\Omega$) | Thickness ($\mu$m) | $R_s$ ($\Omega$/sq) | $R_s$ ($\Omega$/sq)/25 $\mu$m | Resistivity $\rho$, ($\Omega \cdot$ cm) |
|---|---|---|---|---|---|---|---|
| H50-PG-1AP | 0.2528 | oven | 0.32 | 24 | 3.06 | 0.04 | $9.79 \times 10^{-5}$ |
| H50-PG-1AP | 0.2528 | IPL | 0.24 | 25 | 7.63 | 0.07 | $1.83 \times 10^{-4}$ |
| H50-PG-1AP + PVP | 0.5056 | oven | $4.40 \times 10^5$ | 31 | 4.26 | $7.50 \times 10^4$ | $1.88 \times 10^2$ |
| H50-PG-1AP + PVP | 0.5056 | IPL | 0.38 | 23 | 4.45 | 0.07 | $1.69 \times 10^{-4}$ |
| H50-PG-3AP + PVP | 0.2528 | oven | 0.3 | 28 | 5.51 | 0.07 | $1.65 \times 10^{-4}$ |
| H50-PG-3AP + PVP | 0.2528 | IPL | 0.3 | 47 | 7.99 | 0.10 | $2.40 \times 10^{-4}$ |

An original H-NW dispersion H50-PG-Ace1, having an Org/Ag=0.245, was further processed to reduce the Org/Ag ratio: Org/Ag=0.211 for dispersion H50-PG-Ace2 and Org/Ag=0.137 for dispersion H50-PG-Ace3. Effects on conductivity properties for these dispersions dried under different conditions are presented in Table 21. Quantities of these dispersions were dried either in an oven or using IPL. Resistivity did not decrease as Org/Ag is lowered. Wet dispersion resistivities are shown in Table 22.

TABLE 21

| H-NW Dispersion | Org/Ag | Dry Method | Resistance ($\Omega$) | Thickness ($\mu$m) | $R_s$ ($\Omega$/sq)/25 $\mu$m | Resistivity $\rho$, ($\Omega \cdot$ cm) |
|---|---|---|---|---|---|---|
| H50-PG-Ace1 | 0.2438 | oven | 0.29 | 39.7 | 0.06 | $1.38 \times 10^{-4}$ |
| H50-PG-Ace1 | 0.2438 | IPL | 0.24 | 36.7 | 0.05 | $1.23 \times 10^{-4}$ |
| H50-PG-Ace2 | 0.2110 | oven | 0.23 | 52 | 0.06 | $1.55 \times 10^{-4}$ |
| H50-PG-Ace2 | 0.2110 | IPL | 0.23 | 64.7 | 0.08 | $1.98 \times 10^{-4}$ |
| H50-PG-Ace3 | 0.1367 | oven | 0.27 | 48 | 0.08 | $2.04 \times 10^{-4}$ |
| H50-PG-Ace3 | 0.1367 | IPL | 0.2 | 45 | 0.06 | $1.56 \times 10^{-4}$ |

TABLE 22

| H-NW Dispersion | Wet Resistivity, $\rho$ ($\Omega \cdot$ cm) |
|---|---|
| H50-PG-Ace1 | $6.98 \times 10^{-3}$ |
| H50-PG-Ace2 | $1.97 \times 10^{-2}$ |
| H50-PG-Ace3 | $1.55 \times 10^{-1}$ |

Example 2A H-Nanowires in Ethyl Lactate

Figure 18:
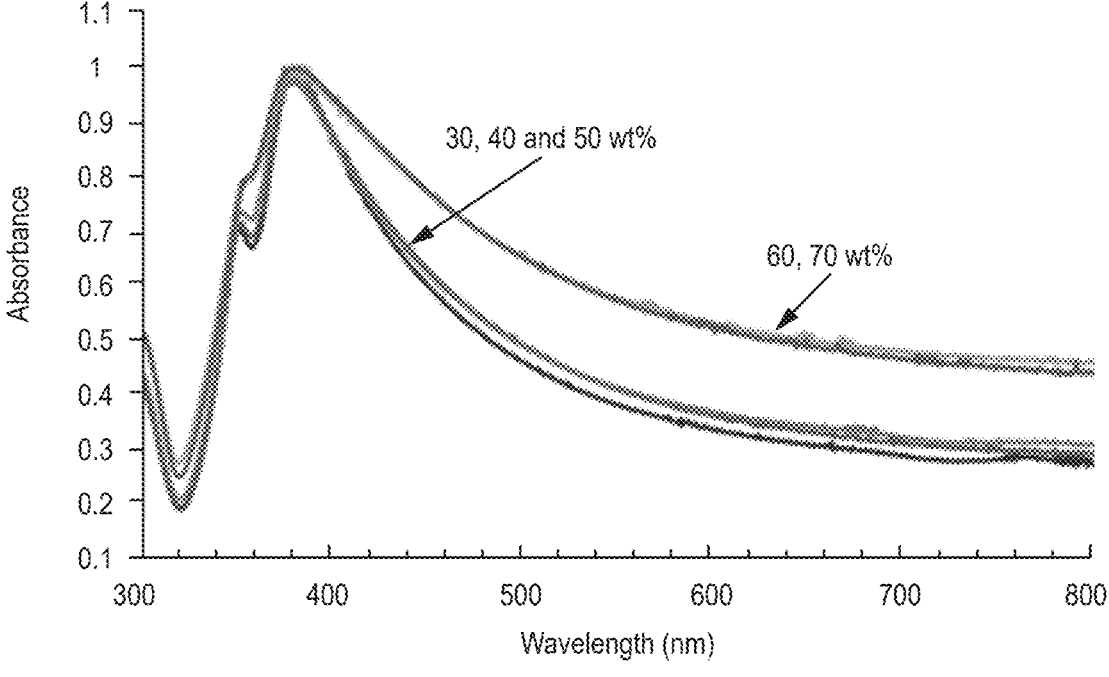
FIG. 18 shows UV-Vis absorption spectra for H-NW dispersions in ethyl lactate (ELA).
Figure 19A:
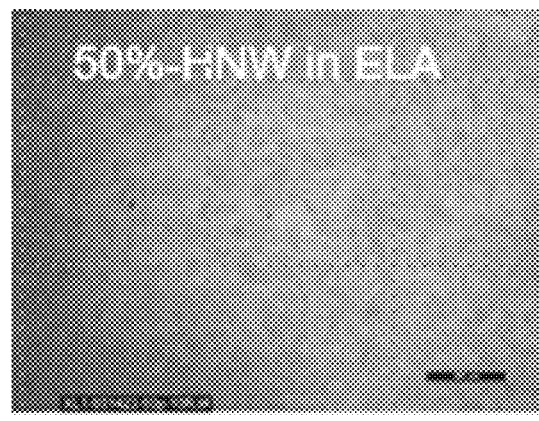
FIGS. 19A-19C are images at 10× magnification of H-NW in ELA at concentrations of 50 wt %, 60 wt % and 70 wt %, respectively.
Figure 19B:
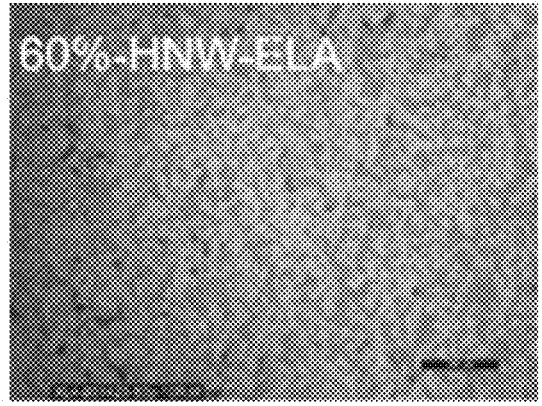
Figure 19C:
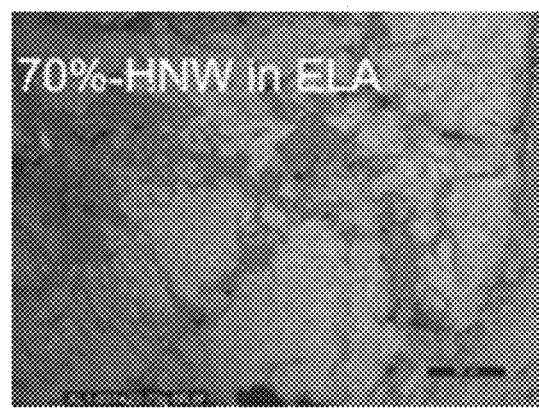

H-Nanowires were dispersed in EtOH to obtain a slurry at a concentration of about 2-8 wt %. Dispersions of H-NW at concentrations ranging from 30 wt % to 70 wt % in ELA were directly prepared by addition of ELA to the slurry followed by removal of EtOH using rotary evaporation with a bath temperature of about 60° C. Compositions are described in Table 23. UV-Vis absorption spectra of the ELA dispersions are shown in FIG. 18 and suggest dispersion quality degraded for samples with loadings of 60 wt % and 70 wt %. Resistivity values were obtained and results are shown in Table 24. Visual assessments of regime are also shown in Table 24. Images at 10× magnification obtained from optical microscopy are shown in FIGS. 19A-19C.

TABLE 23

| H-NW Dispersion | Target H-NW (wt %) | H-NW (g) | ELA (g) | Flask2-flask1 (g) | Recovery (%) | Final (wt %) |
|---|---|---|---|---|---|---|
| H30-ELA | 30 | 0.9 | 2.1 | 3.24 | 104 | 27.8 |
| H40-ELA | 40 | 1.2 | 1.8 | 3.45 | 107 | 34.8 |
| H50-ELA | 50 | 1.5 | 1.5 | 3.67 | 112 | 40.8 |
| H60-ELA | 60 | 1.8 | 1.2 | 3.48 | 105 | 51.7 |
| H70-ELA | 70 | 2.1 | 0.9 | 3.66 | 108 | 57.4 |

TABLE 24

| Dispersion | Loading (wt %) | Resistivity, $\rho$ (Ohm · cm) | Regime |
|---|---|---|---|
| H30-ELA | 30 | $4.00 \times 10^5$ | Slurry |
| H40-ELA | 40 | $4.87 \times 10^5$ | Slurry |
| H50-ELA | 50 | $4.08 \times 10^5$ | Paste |
| H60-ELA | 60 | $2.10 \times 10^{-1}$ | Solid like |
| H70-ELA | 70 | $6.55 \times 10^{-3}$ | Solid |

Example 2B N-Nanowires in ELA

N-Nanowires were dispersed in EtOH to obtain a slurry at a concentration of about 2 wt %. Dispersions of N-NW at concentrations ranging from 3 wt % to 10 wt % in ELA were directly prepared by addition of ELA to the slurry followed by removal of EtOH using rotary evaporation with a bath temperature of about 60° C. Compositions are described in Table 25. Viscosity and resistivity values were obtained, and results are shown in Table 26. Visual assessments of regime are also shown in Table 26.

TABLE 25

| N-NW Dispersion | Target N-NW (wt %) | N-NW (g) | ELA (g) | Flask2-flask1 (g) | Recovery (%) | Final (wt %) |
|---|---|---|---|---|---|---|
| N3-ELA | 3 | 0.09 | 2.91 | 3.06 | 102 | 2.9 |
| N5-ELA | 5 | 0.15 | 2.85 | 3.20 | 106 | 4.7 |

TABLE 25-continued

| N-NW Dispersion | Target N-NW (wt %) | N-NW (g) | ELA (g) | Flask2-flask1 (g) | Recovery (%) | Final (wt %) |
|---|---|---|---|---|---|---|
| N7-ELA | 7 | 0.21 | 2.79 | 3.37 | 111 | 6.2 |
| N10-ELA | 10 | 0.30 | 2.70 | 3.31 | 110 | 9.0 |

TABLE 26

| N-NW Dispersion | Target N-NW (wt %) | Viscosity, $\eta$ (cP) 1 $s^{-1}$ | 10 $s^{-1}$ | 100 $s^{-1}$ | Resistivity, $\rho$ (Ohm · cm) | Regime |
|---|---|---|---|---|---|---|
| N3.5-ELA | 3.5 | 1191 | 258 | 54 | | |
| N3-ELA | 3 | | | | $4.24 \times 10^5$ | Slurry |
| N5-ELA | 5 | | | | $3.53 \times 10^5$ | Slurry |
| N7-ELA | 7 | | | | $1.71 \times 10^5$ | Slurry |
| N10-ELA | 10 | | | | $6.56 \times 10^4$ | Thick slurry |

Example 3 N- and H-Nanowires in EtOH

A dispersion of N-NW at 7 wt % loading was prepared and viscosities at three different shear rates were measured. Results are shown in Table 27. UV-Vis absorption spectra for a starting dispersion of N-NW at 1.9 wt % in EtOH which was then concentrated to 12 wt % showed little change, suggesting that the dispersion quality remained good at the higher concentration of N-NW. The dispersion at 12 wt % was redispersed and excellent redispersability was obtained.

A dispersion of H-NW at 70 wt % loading was prepared. As indicated in Table 27, the viscosity could not be measured because the instrument stopped after two measurements due to excess viscosity.

TABLE 27

| Ag Dispersion | Target Loading (wt %) | Calc. AgNW (%) | Viscosity, $\eta$ (mPa s) 1 $s^{-1}$ | 10 $s^{-1}$ | 100 $s^{-1}$ | Comments |
|---|---|---|---|---|---|---|
| N7-EtOH | 7 | 7 | 11311 | 2242 | 462 | Sample prepared within last 5 days |
| H70-EtOH | 70 | 70 | | | | Stopped after two measurements |

Figure 20:
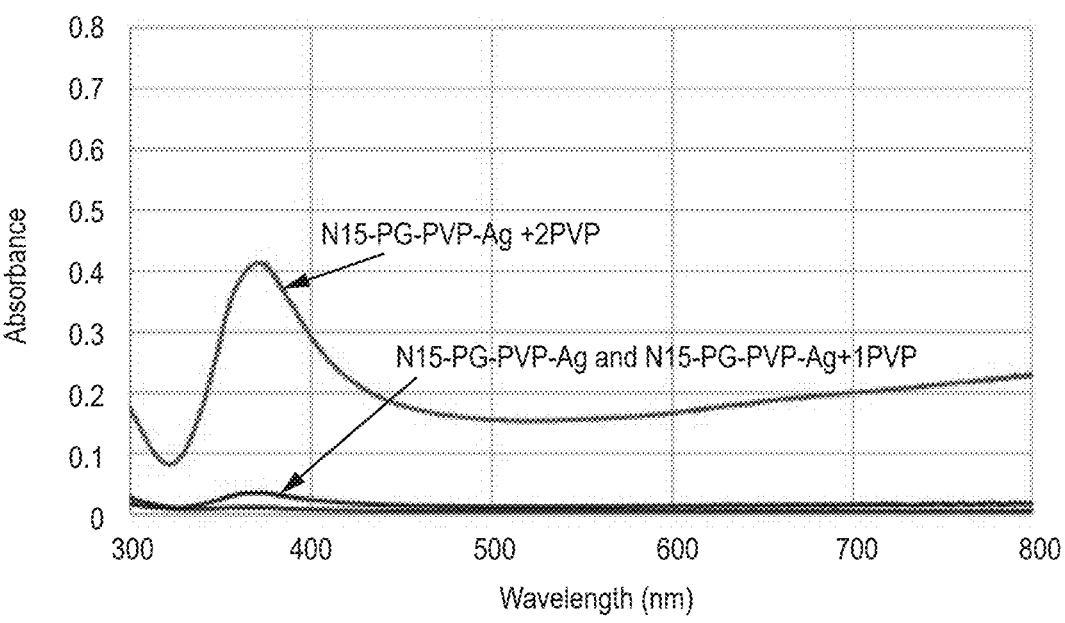
FIG. 20 shows UV-Vis absorption spectra of N-NW in IPA prepared by redispersing dried films of the N-NW.

Example 4A PVP Level Effect for N-NW in PG, Redispersion in EtOH, IPA and PG N-NW dispersions having close to zero solvent were prepared and redispersability of these dispersions in different solvents were explored. Dispersions N15-PG-PVP-Ag, N15-PG-PVP-Ag+1PVP and N15-PG-PVP-Ag+2PVP were dried under different conditions as described in Example 1G and Table 16. UV-Vis absorption spectra of redispersed samples in IPA are shown in FIG. 20 and suggest that the dried samples could not be redispersed into a good dispersion. More PVP can help to decrease some of the aggregation after sample had reached close to zero solvent. Dispersion N15-PG-PVP-Ag+2PVP redispersed in EtOH appears more cloudy as compared to the others.

Example 4B PVP Level Effect for H-NW in PG, Redispersion in EtOH, IPA and PG

Figure 21:
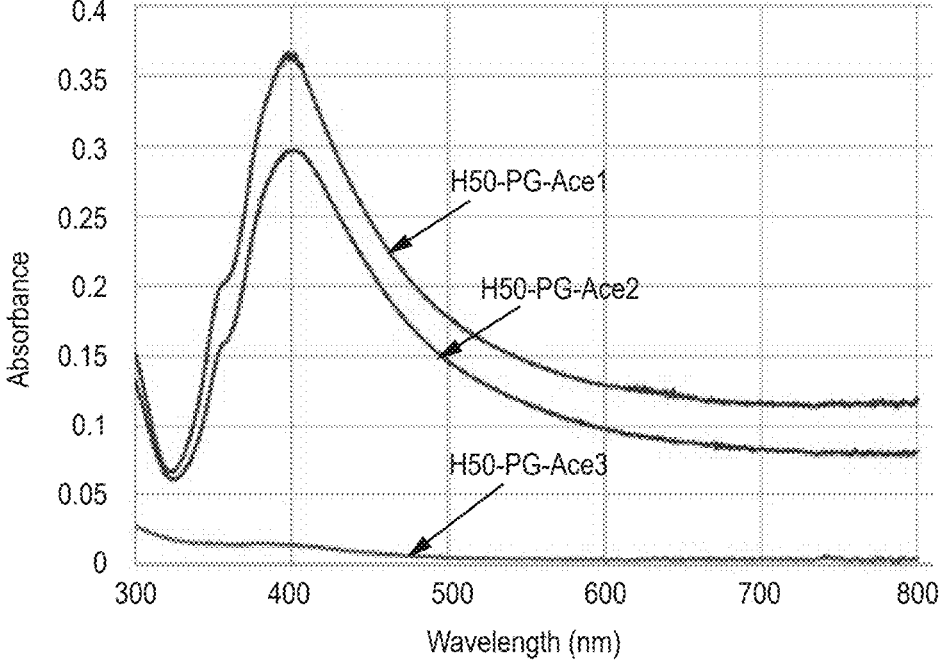
FIG. 21 shows UV-Vis absorption spectra of H-NW in IPA prepared by redispersing dried films of the H-NW.

H-NW dispersions having close to zero solvent were prepared and redispersability of these dispersions in different solvents were explored. Dispersions H50-PG-Ace1, H50-PG-Ace2 and H50-PG-Ace3 were dried under different conditions as described in Example 1H and Table 21. Also, a dispersion comprising H-NW at 50 wt % in PG was prepared and dried in which the nanowires were not subject to an acetone precipitation step (H50-PG-Ace0). UV-Vis absorption spectra of redispersed samples in IPA are shown in FIG. 21 and suggest that the dried samples could not be redispersed into a good dispersion. Again, additional PVP helps to a detectable extent.

Example 5 H-Nanowires in TEG, EGBE and PG; Redispersion in IPA

Dispersions of H-NW were directly prepared by addition of TEG or EGBE to slurries (2-8 wt %) followed by removal of EtOH using rotary evaporation with a bath temperature of about 60° F. The resulting concentrated dispersions were redispersed in IPA. UV-Vis absorption spectra suggested some degraded dispersion quality at high loading in both solvents.

Figure 22A:
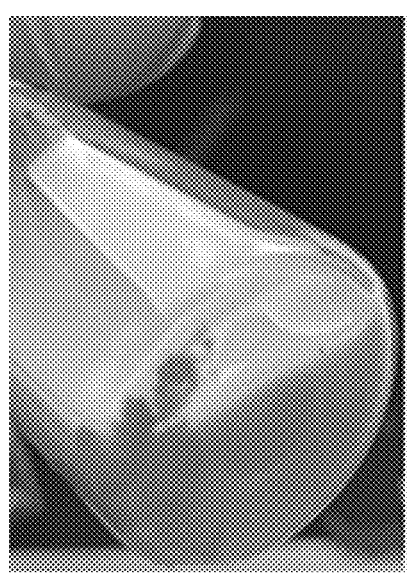
FIGS. 22A and 22B show redispersability and settling of H-NW in IPA prepared by redispersing dried films of the H-NW dispersed in triethylene glycol and ethylene glycol butyl ether (EGBE), respectively.
Figure 22B:
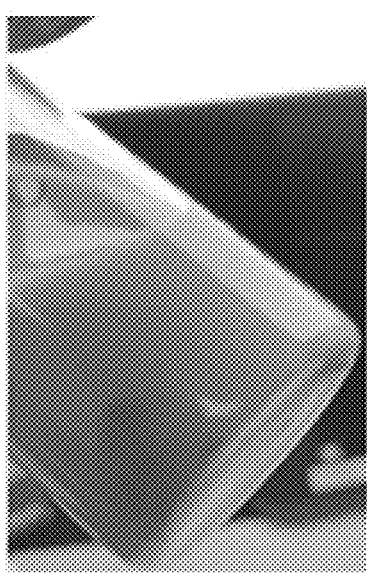

H-NW dispersion having Ag at 5.247 wt % and O/Ag wt ratio=0.2528 was used to prepare dispersions at 90 wt % in PG and EGBE, H90-PG and H90-EGBE, respectively. Compositions and % Recovery are shown Table 28. The data suggest that ethanol retention/affinity is stronger in PG as compared to EGBE. The dispersion prepared with EGBE dried faster compared to the dispersion prepared with PG. Removal of EtOH was more difficult at high target loading. Aggregation observed although a significant fraction could still be redispersed. Dispersions diluted with IPA were prepared and UV-Vis absorption spectra showed some degraded dispersion quality for H80-EGBE. FIGS. 22A and 22B are images showing settling observed for the IPA diluted dispersions H90-PG and H90-EGBE, respectively. Wet resistivities for H90-PG and H90-EGBE were determined and results are shown in Table 28.

TABLE 28

| H-NW Disp. | NW (g) | PG (g) | EGBE (g) | PVP (g) | Final Wt (g) | Adjusted Recovery (%) | Adjusted Ag (wt %) | Ag (vol %) | Wet Resistivity (Ω · cm) |
|---|---|---|---|---|---|---|---|---|---|
| H90-PG | 4.5 | 0.5 | — | 1.14 | 8 | 156 | 56.3 | 10 | $4.40 \times 10^{-3}$ |
| H90-EGBE | 4.5 | — | 0.5 | 1.14 | 7.5 | 146 | 60 | 11.7 | $5.34 \times 10^{-3}$ |

Example 6A H-Nanowires in HEAA, HEMA and EGBE

H-Nanowires were dispersed in EtOH to obtain a slurry at a concentration of about 2-8 wt %. Dispersions at various concentrations of H-NW were directly prepared by addition of a solvent to the slurry followed by removal of EtOH using rotary evaporation with a bath temperature of about 60° F. The following solvents were used: HEAA, HEMA, EGBE and CH. Viscosities were obtained and results are shown in Table 29.

TABLE 29

| | | Measured | | Calc. | Viscosity, η (cP) | | |
|---|---|---|---|---|---|---|---|
| H-NW Dispersion | | Solids (%) | Recovery (%) | AgNW (%) | 1 $s^{-1}$ | 10 $s^{-1}$ | 100 $s^{-1}$ |
| H20-HEAA | | | 113.2 | 17.7 | 198 | 278 | 264 |
| H20-HEAA | | | 113.2 | 17.7 | | | 562 |
| H20-HEMA | | | 110.6 | 18.1 | | | |
| H20-HEMA | | | 110.6 | 18.1 | | | 32 |
| H30-EGBE | | | 109 | 27.5 | 1786 | 218 | 74[a] |
| H35-EGBE | | 37 | 108 | 32.4 | 172 | 142 | 128[a] |
| H40-EGBE | | 33 | 111 | 36.0 | 397 | 238 | 134[a] |
| H50-EGBE | | 49 | 117 | 42.7 | 256384[b] | | |

[a]at 80 $s^{-1}$

[b]at 0.5 $s^{-1}$

Example 6B N-Nanowires in HEAA, HEMA and Others

Figure 23:
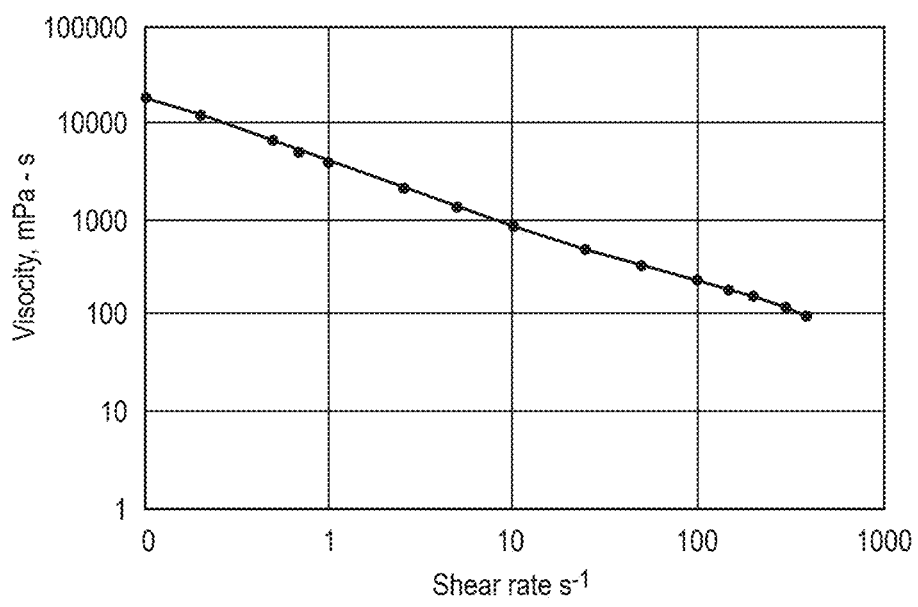
FIG. 23 shows a plot of viscosity as a function of shear rate for an N-NW dispersion comprising N-NW at 3.5 wt % in hydroxyethyl methacrylate.

N-Nanowires were dispersed in EtOH to obtain a dilute dispersion at a concentration of about 2 wt %. Dispersions at various concentrations of H-NW were directly prepared by addition of a solvent to the slurry followed by removal of EtOH using rotary evaporation with a bath temperature of about 60° C. The following solvents were used: HEAA, HEMA, Celloxide™ 2021P which is a difunctional cycloaliphatic diepoxide from Daicel U.S.A., Inc. (Cello); YX8000D which is a hydrogenated bisphenol A-type epoxy resin from Mitsubishi Chemical Group (YX); and NOA 85 which is a a radiation curable optical adhesive from Norland Optical Adhesives (NOA). Viscosities were obtained and results are shown in Table 30. The samples exhibited strong shear thinning, non-Newtonian behavior. Viscosity as a function of shear rate was measured for N-NW at 3.5 wt % in HEMA and results are shown in FIG. 23.

TABLE 30

| N-NW Dispersion | Recovery (%) | Calc. AgNW (%) | Viscosity, η (cP) | | |
|---|---|---|---|---|---|
| | | | 1 s$^{-1}$ | 10 s$^{-1}$ | 100 s$^{-1}$ |
| N3.5-HEAA | 110 | 3.2 | 2183 | 417 | 139 |
| N3.5-HEAA | 108 | 3.2 | 3770 | 833 | 228 |
| N5-HEMA | 106 | 4.7 | 11311 | 2877 | 669 |
| N5-HEMA | 106 | 4.7 | 5953 | 1349 | 327 |
| N3.5-Cello | 109 | 3.2 | 13891 | 2302 | 762 |
| N3.5-Cello | 109 | 3.2 | 52388 | 5318 | 1292 |
| N5-YX | | | 115294 | 10934 | — |
| N3.5-YX | 109 | 3.2 | 36910 | 3651 | 524 |

TABLE 30-continued

| N-NW Dispersion | Recovery (%) | Calc. AgNW (%) | Viscosity, η (cP) | | |
|---|---|---|---|---|---|
| | | | 1 s$^{-1}$ | 10 s$^{-1}$ | 100 s$^{-1}$ |
| N20-NOA | 109 | 18.3 | 143274 | 16510 | 1232 |
| N30-NOA | | | 43260 | 7719 | 673 |

Example 7 H-Nanowires in CH

Dispersions of H-NW at 10 wt % and 20 wt % in cyclohexanol (CH) were directly prepared by addition of CH to a slurry of H-NW in EtOH followed by removal of EtOH using rotary evaporator. The dispersions were observed and imaged at time intervals up to 30 hours. For H-NW at 10 wt % loading, settling began after 5 hours and increased as a function of time. After 24 hours, a significant quantity of H-NW10 precipitated and settled at the bottom of the glass cylinder. For H-NW at 20 wt % loading, no significant visual change or precipitation was observed after at least 27 hours.

Example 8A H-Nanowires in NMP and DMSO

Figure 24A:
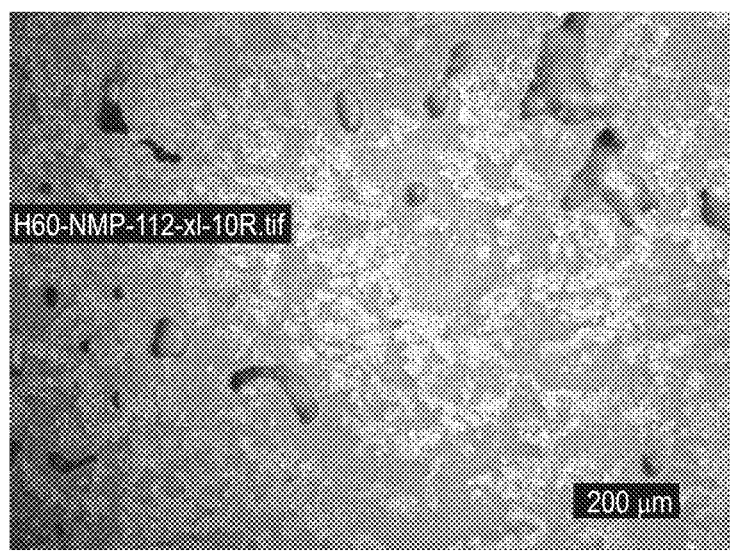
FIG. 24A shows an image at 10× magnification an H-NW dispersion comprising H-NW at 60 wt % in N-methyl-2-pyrrolidone.
Figure 24B:
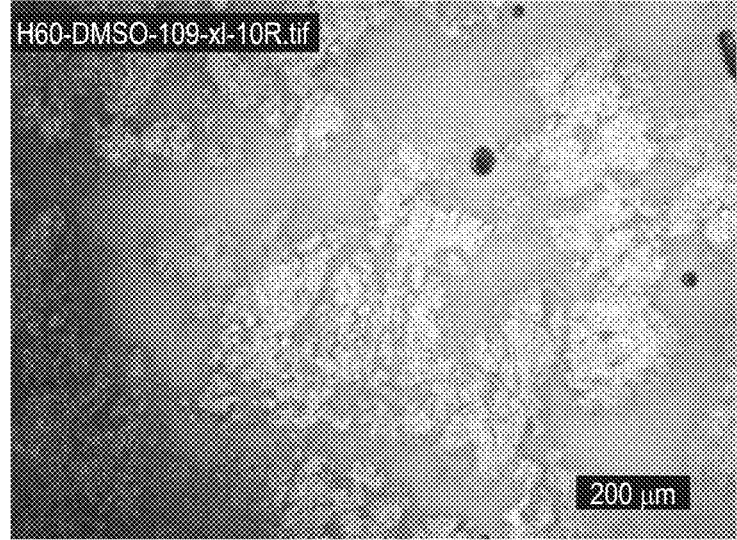
FIG. 24B shows an image at 10× magnification an H-NW dispersion comprising H-NW at 60 wt % in dimethyl sulfoxide.

Dispersions of H-NW at 60 wt % in solvents NMP and DMSO were directly prepared by addition of the solvent to a slurry of H-NW (at 5.724 wt %) in EtOH followed by removal of EtOH using rotary evaporation with a bath temperature of about 60° C. Compositions and regime are reported in Table 31. Overall, dispersion quality seemed good. Images at 10× magnification were obtained from optical microscopy and selected images are shown in FIG. 24A for NMP and FIG. 24B for DMSO. The images suggest a mixture of solid and liquid.

TABLE 31

| H-NW Dispersion | H-NW Target (wt %) | H-NW (g) | Solvent (g) | Flask2-flask1 (g) | Recovery (%) | Final (wt %) | State |
|---|---|---|---|---|---|---|---|
| H60-NMP | 60 | 3.0 | 2.0 | 6.03 | 109 | 49.75 | slurry |
| H60-DMSO | 60 | 3.0 | 2.0 | 6.2 | 112 | 48.39 | slurry |

Example 8B N-Nanowires in NMP, DMSO and PG

Dispersions of N-NW at 15 wt % in solvents NMP, DMSO and PG were directly prepared by addition of the solvent to a slurry of N-NW in EtOH followed by removal of EtOH using rotary evaporation with a bath temperature of about 60° C. For N15-NMP, N15-DMSO, compositions and regime are reported in Table 32. Overall, dispersion quality seemed good.

TABLE 32

| N-NW Dispersion | N-NW Target (wt %) | N-NW (g) | Solvent (g) | Flask2-flask1 | Recovery (%) | Final Ag (wt %) | State |
|---|---|---|---|---|---|---|---|
| N15-NMP | 15 | 0.9 | 5.1 | 6.25 | 102 | 14.40 | slurry |
| N15-DMSO | 15 | 0.9 | 5.1 | 6.3 | 103 | 14.29 | slurry |

Example 9A H-Nanowires in $H_2O$

Dispersions of H-NW at 80 wt %, 70 wt % and 60 wt % in $H_2O$ were directly prepared by addition of $H_2O$ to a slurry of H-NW (at 9.49 wt %) in EtOH followed by removal of EtOH using rotary evaporation with a bath temperature of about 60° C. Compositions and regime are reported in Table 33. Weight and volume percentages for the dispersions are shown in Tables 34-36.

TABLE 33

| H-NW Dispersion | Loading (wt %) | H-NW (g) | $H_2O$ (g) | Flask2-flask1 | Recovery (%) | Final Ag (wt %) | State |
|---|---|---|---|---|---|---|---|
| H80-H2O | 80 | 4.8 | 1.2 | 7.59 | 111 | 63 | solid |
| H70-H2O | 70 | 4.2 | 1.8 | 6.79 | 101 | 62 | solid |
| H60-H2O | 60 | 3.6 | 2.4 | 7 | 105 | 51 | slurry |

TABLE 34

| Component | H-NW Target (wt %) | H-NW Wt % | H-NW Vol % | Ratio H-NW Vol %/ H-NW Wt % |
|---|---|---|---|---|
| H-NW | 80 | 63.24 | 13.86 | 0.22 |
| PVP | | 11.38 | 22.08 | 1.94 |
| $H_2O$ | | 15.81 | 36.39 | 2.30 |
| EtOH | | 0.10 | 28.22 | 295.02 |

TABLE 35

| Component | H-NW Target (wt %) | Wt % | Vol % | Ratio Vol %/Wt % |
|---|---|---|---|---|
| H-NW | 70 | 61.86 | 13.92 | 0.23 |
| PVP | | 11.13 | 22.35 | 2.01 |
| $H_2O$ | | 26.51 | 62.65 | 2.36 |
| EtOH | | 0.01 | 1.53 | 305.36 |

TABLE 36

| Component | H-NW Target (wt %) | Wt % | Vol % | Ratio Vol %/Wt % |
|---|---|---|---|---|
| H-NW | 60 | 51.43 | 9.19 | 0.18 |
| PVP | | 9.26 | 14.77 | 1.60 |
| $H_2O$ | | 34.29 | 64.36 | 1.88 |
| EtOH | | 0.05 | 12.20 | 242.67 |

Example 9B N-Nanowires in DIW

Dispersions of N-NW at 15 wt % and 20 wt % in DIW were directly prepared by addition of $H_2O$ to a slurry of N-NW (at 1.997 wt %) in EtOH followed by removal of EtOH using rotary evaporation with a bath temperature of about 60° C. During rotary evaporation, N-NW dried up on the flask's sidewall and formed silver mirror. All water removed from dispersions due to water-ethanol azeotrope which forms at EtOH molecular percentage of about 91 wt % (about 96 vol %). Dispersion of N-NW at 15 wt % has about 35 g of EtOH which can result in removal of about 3.2 g $H_2O$. Dispersion of N-NW at 20 wt % has about 45 g of EtOH which can result in removal of about 4 g H20 which is the amount in the dispersion. A dispersion of N-NW in 20 wt % in DIW was prepared as described above. During rotary evaporation, a silver mirror formed on the sidewall of the flask with about 100% recovery. Recovery near 100% suggests that water is effective to displace ethanol that tends to be entrapped in the material. About 3.4 g concentrate (from a 5 g batch) was recovered from the bottom middle section of the flask; actual concentration of collected sample may be less than 20%. Compositions and results are reported in Table 37. UV-Vis absorption spectra suggested good dispersion quality. Viscosity as a function of shear rate was measured and results are shown in Table 38.

TABLE 37

| N-NW Dispersion | Loading (wt %) | N-NW (g) | DIW (g) | Recovery (%) |
|---|---|---|---|---|
| N15-DIW | 15 | 38 | 4.25 | 66 |
| N20-DIW | 20 | 50 | 4 | 33 |
| N20-DIW[a] | | | | 100 |

[a]Began with 200 wt % DIW.

TABLE 38

| Viscosity (cP) | Speed | % Torque | Shear Stress | Shear Rate ($s^{-1}$) |
|---|---|---|---|---|
| — | 0.10 | 13.89 | 27.58 | 0.20 |
| 64691.44 | 0.25 | 16.33 | 32.35 | 0.50 |
| 47129.50 | 0.40 | 18.99 | 37.70 | 0.80 |
| 44847.44 | 0.50 | 22.56 | 44.85 | 1.00 |
| 25697.98 | 1.00 | 25.90 | 51.40 | 2.00 |
| 14446.43 | 2.50 | 36.36 | 72.23 | 5.00 |
| 10814.98 | 4.00 | 43.60 | 86.52 | 8.00 |
| 9604.50 | 5.00 | 48.36 | 96.04 | 10.00 |
| 5685.31 | 10.00 | 57.30 | 113.71 | 20.00 |
| 2857.54 | 25.00 | 72.03 | 142.88 | 50.00 |
| 2140.67 | 40.00 | 86.26 | 171.25 | 80.00 |

Example 10 H-Nanowires and N-Nanowires in DMAc

Figure 25:
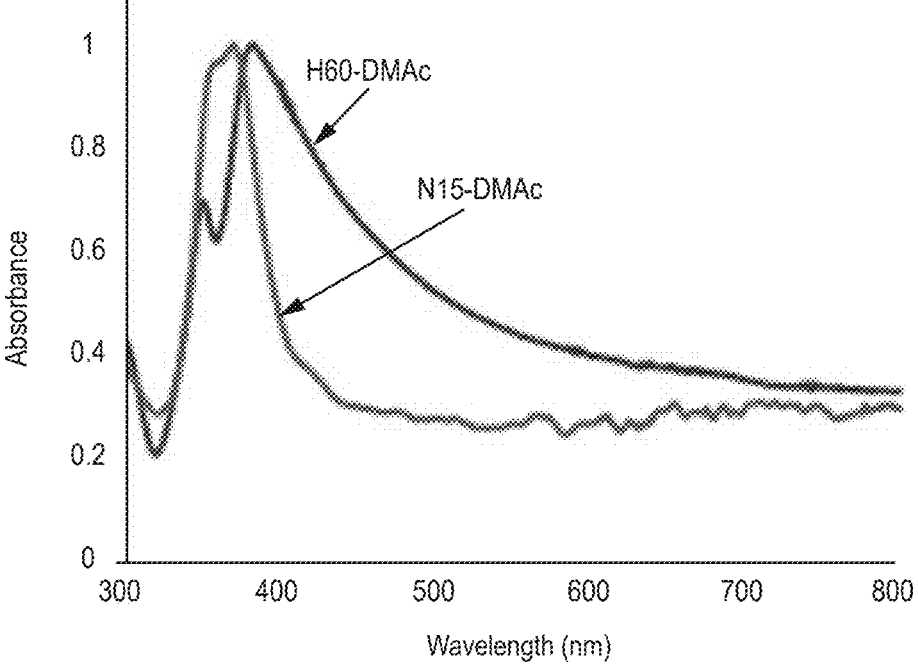
FIG. 25 shows UV-Vis absorption spectra for dispersions comprising H-NW at 60 wt % and N-NW at 15 wt % in dimethylacetamide.

Dispersion of H-NW at 60 wt % in DMAc was directly prepared by addition of 2 g DMAc to 3 g of H-NW slurry (at 9.81 wt % and O/Ag=0.1862) in EtOH followed by removal of EtOH using rotary evaporation with a bath temperature of about 60° C. Dispersion of N-NW at 15 wt % in DMAc was directly prepared by addition of 4.25 g DMAc to 0.75 g of N-NW slurry (at 1.997 wt %) in EtOH followed by removal of EtOH using rotary evaporation with a bath temperature of about 60° C. UV-Vis absorption spectra for diluted samples of H60-DMAc and N15-DMAc are shown in FIG. 25. For H60-DMAc, some settling was observed when diluted and was found to be easily redispersible. For N15-DMAc, severe settling observed when diluted with IPA and found to not be dispersible. The dispersions were very thick. Selected data are shown in Table 39.

TABLE 39

| Dispersion | Physical Form | Recovery (%) | Normalized Ag wt % | Resistivity, $\rho$ ($\Omega \cdot cm$) | Viscosity at 10 s$^{-1}$ (cP) |
|---|---|---|---|---|---|
| H60-DMAC | Liquid | 122 | 49.2 | $2.12 \times 10^5$ | N/A |
| N15-DMAC | Semi-solid | 101 | 14.88 | $7.30 \times 10^4$ | N/A |

Example 11A H-Nanowires in EGBE

Figure 26:
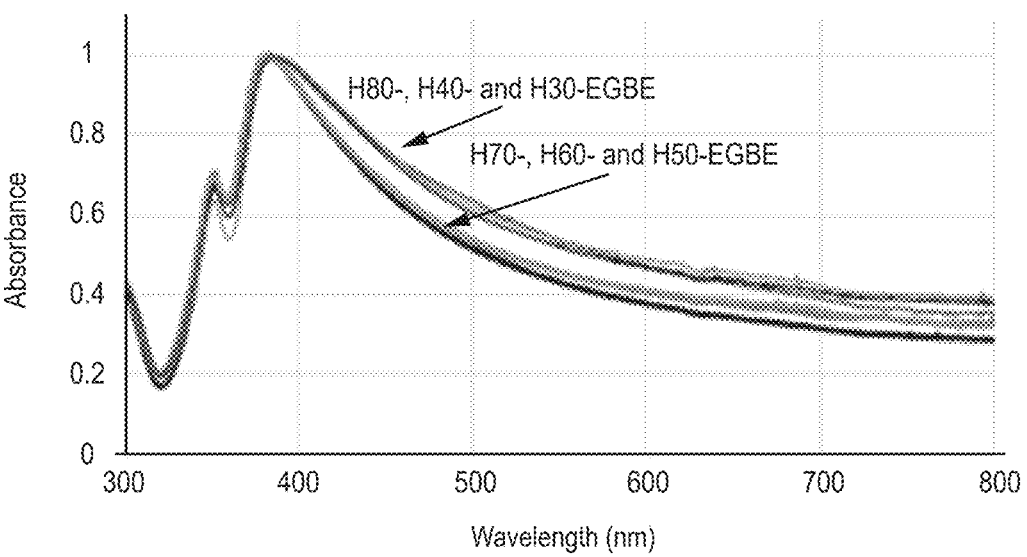
FIG. 26 shows UV-Vis absorption spectra for dispersions comprising H-NW at 80 wt % to 30 wt % in EGBE.
Figure 27:
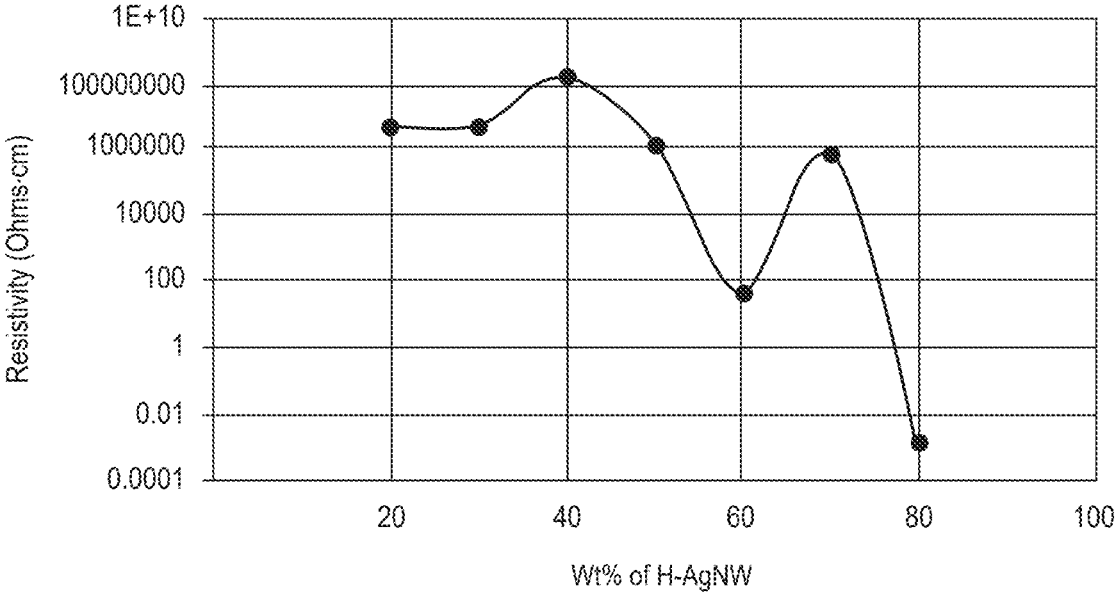
FIG. 27 is a plot of resistivity as a function of wt % for dispersions comprising H-NW at 80 wt % to 20 wt % in EGBE.

Dispersions of H-NW at concentrations ranging from 80 to 20 wt % in EGBE were directly prepared by addition of EGBE to a slurry of H-NW in EtOH followed by removal of EtOH using rotary evaporation with a bath temperature of about 60° C. UV-Vis absorption spectra for diluted samples of H80-, H70-, H60-H50-, H40- and H30-EGBE are shown in FIG. 26. Selected data are shown in Tables 40 and 41. A plot of resistivity as a function of wt % of H-NW is shown in FIG. 27. Viscosity as a function of shear rate was obtained for H20-, H30-, H40- and H50-EGBE and results are shown in Tables 42-45, respectively. Shear stress and Torque % are conventional parameters measured using a rheometer, where shear stress is force per unit area.

TABLE 40

| H-NW Dispersion | Physical Form | Recovery (%) | Normalized Ag wt % | Resistivity, $\rho$ ($\Omega \cdot cm$) | Viscosity at 10 s$^{-1}$ (cP) |
|---|---|---|---|---|---|
| H80-EGBE | Solid paste | 132 | 61 | $1.43 \times 10^{-3}$ | N/A |
| H70-EGBE | Semi-solid | 106 | 66 | $7.59 \times 10^5$ | N/A |
| H60-EGBE | Semi-solid | 109 | 55 | $5.50 \times 10^1$ | N/A |
| H50-EGBE | Liquid | 120 | 41.7 | $1.27 \times 10^6$ | 2242.4 |
| H40-EGBE | Liquid | 114 | 35 | $1.40 \times 10^8$ | 301.6 |
| H30-EGBE | Liquid | 102 | 29.4 | $5.30 \times 10^6$ | 789.7 |
| H20-EGBE | Liquid | 108 | 18.5 | $5.06 \times 10^6$ | 19.84 |

TABLE 41

| H-NW Dispersion | AgNW wt % Corrected | Viscosity, $\eta$ (cP) 1 s$^{-1}$ | 10 s$^{-1}$ | 100 s$^{-1}$ |
|---|---|---|---|---|
| H20-EGBE | 18.5 | — | 19.8 | 15.9 |
| H30-EGBE | 29.4 | 4880 | 790 | 55.2 |
| H40-EGBE | 35.0 | 1987 | 302 | 102 |
| H50-EGBE | 41.7 | 13891 | 2242 | — |

TABLE 42

| H20-EGBE | | | | |
|---|---|---|---|---|
| Viscosity (cP) | Speed | % Torque | Shear Stress | Shear Rate (s$^{-1}$) |
| 0.00 | 0.10 | −0.02 | 0.00 | 0.20 |
| 0.00 | 0.25 | −0.11 | 0.00 | 0.50 |
| 0.00 | 0.40 | −0.07 | 0.00 | 0.80 |

TABLE 42-continued

| H20-EGBE | | | | |
|---|---|---|---|---|
| Viscosity (cP) | Speed | % Torque | Shear Stress | Shear Rate (s$^{-1}$) |
| 0.00 | 0.50 | −0.13 | 0.00 | 1.00 |
| 0.00 | 1.00 | 0.04 | 0.00 | 2.00 |
| 0.00 | 2.50 | 0.04 | 0.00 | 5.00 |
| 24.81 | 4.00 | 0.08 | 0.20 | 8.00 |
| 19.84 | 5.00 | 0.10 | 0.20 | 10.00 |
| 19.84 | 10.00 | 0.17 | 0.40 | 20.00 |
| 11.91 | 25.00 | 0.32 | 0.60 | 50.00 |
| 17.36 | 40.00 | 0.68 | 1.39 | 80.00 |
| 15.88 | 50.00 | 0.77 | 1.59 | 100.00 |
| 14.88 | 100.00 | 1.54 | 2.98 | 200.00 |

TABLE 43

| H30-EGBE | | | | |
|---|---|---|---|---|
| Viscosity (cP) | Speed | % Torque | Shear Stress | Shear Rate (s$^{-1}$) |
| 3924.00 | 0.03 | 3.23 | 0.78 | 0.20 |
| 7897.05 | 0.07 | 16.11 | 3.95 | 0.50 |
| 5916.66 | 0.11 | 19.30 | 4.73 | 0.80 |
| 4880.48 | 0.13 | 19.85 | 4.88 | 1.00 |
| 2857.16 | 0.27 | 23.29 | 5.71 | 2.00 |
| 1692.23 | 0.67 | 34.49 | 8.46 | 5.00 |
| 702.03 | 1.07 | 22.88 | 5.62 | 8.00 |
| 789.71 | 1.33 | 32.16 | 7.90 | 10.00 |
| 316.37 | 2.67 | 25.79 | 6.33 | 20.00 |
| 107.91 | 6.67 | 22.04 | 5.40 | 50.00 |
| 70.51 | 10.67 | 23.00 | 5.64 | 80.00 |
| 55.18 | 13.33 | 22.52 | 5.52 | 100.00 |
| 54.57 | 26.67 | 44.48 | 10.91 | 200.00 |
| 51.58 | 40.00 | 63.15 | 15.48 | 300.00 |

TABLE 44

| H40-EGBE | | | | |
|---|---|---|---|---|
| Viscosity (cP) | Speed | % Torque | Shear Stress | Shear Rate (s$^{-1}$) |
| 4782.38 | 0.03 | 3.91 | 0.96 | 0.20 |
| 3629.70 | 0.07 | 7.44 | 1.81 | 0.50 |
| 2636.44 | 0.11 | 8.64 | 2.11 | 0.80 |
| 1986.53 | 0.13 | 8.12 | 1.99 | 1.00 |
| 674.44 | 0.27 | 5.52 | 1.35 | 2.00 |
| 171.68 | 0.67 | 3.47 | 0.86 | 5.00 |
| 340.28 | 1.07 | 11.08 | 2.72 | 8.00 |
| 301.66 | 1.33 | 12.25 | 3.02 | 10.00 |
| 197.43 | 2.67 | 16.09 | 3.95 | 20.00 |
| 117.23 | 6.67 | 23.95 | 5.86 | 50.00 |
| 103.01 | 10.67 | 33.56 | 8.24 | 80.00 |
| 102.27 | 13.33 | 41.74 | 10.23 | 100.00 |
| 93.56 | 26.67 | 76.30 | 18.71 | 200.00 |

TABLE 45

| H50-EGBE | | | | |
|---|---|---|---|---|
| Viscosity (CP) | Speed | % Torque | Shear Stress | Shear Rate (s$^{-1}$) |
| 19844.00 | 0.10 | 1.96 | 3.97 | 0.20 |
| 10318.88 | 0.25 | 2.65 | 5.16 | 0.50 |
| 15379.10 | 0.40 | 6.17 | 12.30 | 0.80 |
| 13890.80 | 0.50 | 6.98 | 13.89 | 1.00 |
| 4564.12 | 1.00 | 4.56 | 9.13 | 2.00 |
| 3016.29 | 2.50 | 7.64 | 15.08 | 5.00 |
| 2257.26 | 4.00 | 9.06 | 18.06 | 8.00 |

TABLE 45-continued

| H50-EGBE | | | | |
|---|---|---|---|---|
| Viscosity (CP) | Speed | % Torque | Shear Stress | Shear Rate (s⁻¹) |
| 2242.37 | 5.00 | 11.30 | 22.42 | 10.00 |
| 2569.80 | 10.00 | 25.87 | 51.40 | 20.00 |

Example 11B N-Nanowires in EGBE

Figure 28:
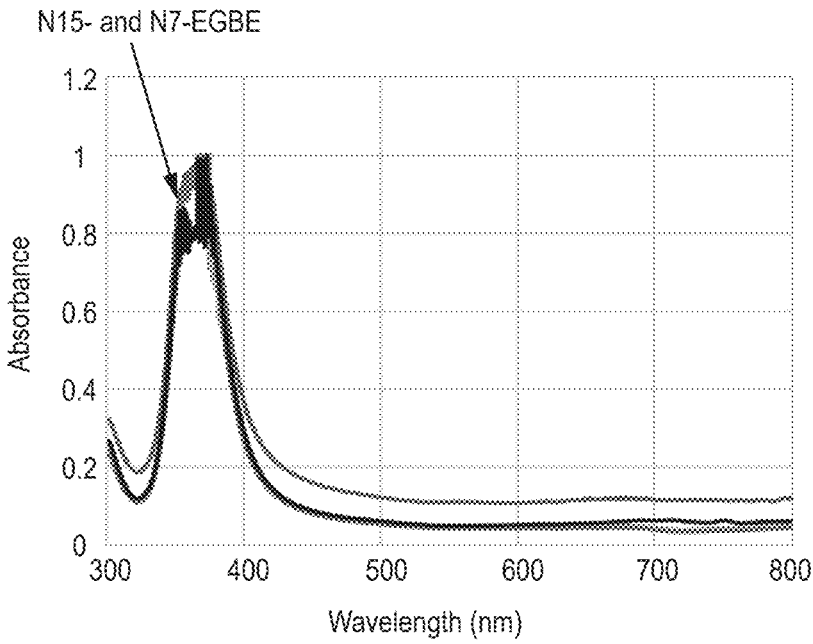
FIG. 28 shows UV-Vis absorption spectra for dispersions comprising N-NW at 15 wt % to 7 wt % in EGBE.

Dispersions of N-NW at concentrations of 15 wt %, 10 wt % and 7 wt % in EGBE were directly prepared by addition of EGBE to a slurry of N-NW in EtOH followed by removal of EtOH using rotary evaporation with a bath temperature of about 60° C. Compositions are shown in Table 46. UV-Vis absorption spectra for diluted samples of N15-, N10- and N7-EGBE are shown in FIG. 28. Selected data are shown in Tables 47 and 48. Viscosity as a function of shear rate was obtained for N15-, N10- and N7-EGBE and results are shown in Tables 49-51, respectively.

TABLE 46

| N-NW Dispersion | Loading (wt %) | N-NW (g) | EGBE (g) | % Ag (wt %) | Org/Ag (wt) |
|---|---|---|---|---|---|
| N15-EGBE | 15 | 0.75 | 4.25 | 1.997 | |
| N10-EGBE | 10 | 1 | 9 | 1.92 | 0.1363 |
| N7-EGBE | 7 | 0.35 | 4.65 | 1.997 | |

TABLE 47

| N-NW Dispersion | Physical Form | Recovery (%) | Normalized Ag wt % | Resistance (Ω) | Viscosity at 100 s⁻¹ (cP) |
|---|---|---|---|---|---|
| N15-EGBE | Semi-solid | 117 | 12.86 | 175 × 10⁶ | 1458.53 |
| N10-EGBE | Liquid | 102 | 9.79 | OL[1] | 1307.72 |
| N7-EGBE | Liquid | 103 | 6.84 | OL[1] | 682.63 |

[1]above limit of multimeter

TABLE 48

| N-NW Dispersion | AgNW wt % Corrected | Viscosity, η (cP) 1 s⁻¹ | 10 s⁻¹ | 100 s⁻¹ |
|---|---|---|---|---|
| N15-EGBE | 6.84 | 18058 | 1945 | 683 |
| N10-EGBE | 9.79 | 29766 | 7461 | 1308 |
| N7-EGBE | 12.9 | 58341 | 12204 | 1459 |

TABLE 49

| N15-EGBE | | | | |
|---|---|---|---|---|
| Viscosity (cP) | Speed | % Torque | Shear Stress | Shear Rate (s⁻¹) |
| — | 0.10 | 21.06 | 41.87 | 0.20 |
| 93663.68 | 0.25 | 23.65 | 46.83 | 0.50 |
| 71190.35 | 0.40 | 28.74 | 56.95 | 0.80 |
| 58341.36 | 0.50 | 29.37 | 58.34 | 1.00 |
| 35123.88 | 1.00 | 35.43 | 70.25 | 2.00 |
| 20121.82 | 2.50 | 50.72 | 100.61 | 5.00 |
| 14163.66 | 4.00 | 57.11 | 113.31 | 8.00 |
| 12204.06 | 5.00 | 61.52 | 122.04 | 10.00 |

TABLE 49-continued

| N15-EGBE | | | | |
|---|---|---|---|---|
| Viscosity (cP) | Speed | % Torque | Shear Stress | Shear Rate (s⁻¹) |
| 7074.39 | 10.00 | 71.35 | 141.49 | 20.00 |
| 3766.39 | 25.00 | 94.93 | 188.32 | 50.00 |
| 0.00 | 0.00 | 20.09 | 39.89 | 0.00 |
| 1458.53 | 50.00 | 73.54 | 145.85 | 100.00 |
| 746.13 | 100.00 | 75.23 | 149.23 | 200.00 |
| 551.00 | 150.00 | 83.32 | 165.30 | 300.00 |

TABLE 50

| N10-EGBE | | | | |
|---|---|---|---|---|
| Viscosity (cP) | Speed | % Torque | Shear Stress | Shear Rate (s⁻¹) |
| 80368.20 | 0.10 | 8.07 | 16.07 | 0.20 |
| 40084.88 | 0.25 | 10.11 | 20.04 | 0.50 |
| 31006.25 | 0.40 | 12.54 | 24.81 | 0.80 |
| 29766.00 | 0.50 | 15.03 | 29.77 | 1.00 |
| 17363.50 | 1.00 | 17.54 | 34.73 | 2.00 |
| 11231.70 | 2.50 | 28.34 | 56.16 | 5.00 |
| 8210.46 | 4.00 | 33.15 | 65.68 | 8.00 |
| 7461.34 | 5.00 | 37.60 | 74.61 | 10.00 |
| 3988.64 | 10.00 | 40.20 | 79.77 | 20.00 |
| 2071.71 | 25.00 | 52.19 | 103.59 | 50.00 |
| 1515.59 | 40.00 | 61.06 | 121.25 | 80.00 |
| 1307.72 | 50.00 | 65.91 | 130.77 | 100.00 |
| 866.19 | 100.00 | 87.26 | 173.24 | 200.00 |

TABLE 51

| N7-EGBE | | | | |
|---|---|---|---|---|
| Viscosity (CP) | Speed | % Torque | Shear Stress | Shear Rate (s⁻¹) |
| 34727.00 | 0.10 | 3.53 | 6.95 | 0.20 |
| 19050.24 | 0.25 | 4.77 | 9.53 | 0.50 |
| 15627.15 | 0.40 | 6.32 | 12.50 | 0.80 |
| 18058.04 | 0.50 | 9.10 | 18.06 | 1.00 |
| 7739.16 | 1.00 | 7.81 | 15.48 | 2.00 |
| 3770.36 | 2.50 | 9.52 | 18.85 | 5.00 |
| 2207.65 | 4.00 | 8.95 | 17.66 | 8.00 |
| 1944.71 | 5.00 | 9.85 | 19.45 | 10.00 |
| 1369.24 | 10.00 | 13.75 | 27.38 | 20.00 |
| 908.86 | 25.00 | 22.93 | 45.44 | 50.00 |
| 749.11 | 40.00 | 30.18 | 59.93 | 80.00 |
| 682.63 | 50.00 | 34.40 | 68.26 | 100.00 |
| 493.12 | 100.00 | 49.70 | 98.62 | 200.00 |
| 398.86 | 150.00 | 60.34 | 119.66 | 300.00 |

Example 12A H- and N-Nanowires and Silver Salts in PG

Figure 29:
FIG. 29 is an image showing dispersions comprising H-NW at 55 wt % in PG (H55-PG), H55-PG with silver heptafluorobutyrate, and H55-PG with silver fluoride, from left to right, respectively.

Dispersions of H-NW at concentrations of 55 wt % in PG were prepared without silver salt and with silver salts AgHFB and AgF as shown in Table 52. Form, resistivity and redispersion in IPA are summarized in Table 53. FIG. 29 is an image showing dispersions H55-PG, H55-PG-AgHFB and H55-PG-AgF, from left to right, respectively.

TABLE 52

| H-NW/Ag Salt Dispersion | H-NW (wt %) | Org/Ag (wt) | Recovery (%) | Ag Salt | AgSalt/AgNW (wt) | Ag+/AgNW (wt) |
|---|---|---|---|---|---|---|
| H55-PG | 43.4 | 0.253 | 126.8 | none | NA | NA |
| H55-PG-AgHFB | 41.1 | 0.253 | 133.9 | AgHFB | 25.3 | 8.5 |
| H55-PG-AgF | 42.6 | 0.253 | 129.2 | AgF | 13.8 | 11.7 |

TABLE 53

| H-NW/Ag Salt Dispersion | Form | Resistivity ρ, (Ω · cm) | Redispersion in IPA |
|---|---|---|---|
| H55-PG | paste like | $7.37 \times 10^{-3}$ | mostly redispersed |
| H55-PG-AgHFB | dough like | $1.05 \times 10^{-2}$ | very difficult to redisperse, significant fraction of solids present as aggregates on bottom of flask |
| H55-PG-AgF | non-brittle solids | $8.07 \times 10^{-3}$ | extremely difficult to redisperse, majority of solids as aggregates stay on bottom of flask |

Dispersions of N-NW at concentrations of 10 wt % in PG were prepared with and without silver salt AgF as shown in Table 54. The sample prepared with silver salt exhibited significant aggregation of a semi-solid form as indicated in Table 54.

TABLE 54

| N-NW/Ag Salt Dispersion | N-NW Loading (wt %) | Org/Ag | Ag Salt | Form |
|---|---|---|---|---|
| N10-PG | 10 | 0.113 | none | viscous flowing liquid |
| N10-PG-AgF | 10 | 0.113 | AgF | aggregation, semi-solid |

Example 12B H-Nanowires without Silver Salts in Imidazolium-Based Solvents

Dispersions of H-NW at concentrations of about 50 wt % and about 70 wt % in solvents BMIBF$_4$, BMIPF$_6$, HMIPF$_6$ and EMIPF4 as shown in Table 55. Coatings were prepared from the dispersions and resistivities were measured. Results are shown in Table 55. Coatings prepared with BMIBF$_4$ and BMIPF$_6$, without nanowires, were also prepared and resistivities are included.

TABLE 55

| H-NW Dispersion | H-NW Loading (wt %) | Solvent | Resistivity ρ, (Ω · cm) |
|---|---|---|---|
| BMIBF$_4$ | none | BMIBF$_4$ | $4.35 \times 10^{3}$ |
| BMIPF$_6$ | none | BMIPF$_6$ | $7.95 \times 10^{3}$ |
| H50-BMIBF$_4$ | 50 | BMIBF$_4$ | $7.63 \times 10^{2}$ |
| H50-BIMPF$_6$ | 50 | BIMPF$_6$ | $1.38 \times 10^{2}$ |
| H70-HMIPF$_6$ | 70 | HMIPF$_6$ | $4.32 \times 10^{-3}$ |
| H70-EMIPF$_4$ | 70 | EMIPF$_4$ | $4.71 \times 10^{-3}$ |

Example 13 H-Nanowires and Ag Salts in Various Solvents

Dispersions of H-NW at concentrations of about 50 wt % in various solvents were prepared without silver salt and with silver salts as shown in Table 56.

TABLE 56

| H-NW/Ag Salt Dispersion | Ag (wt %) | PVP (wt %) | Recovery (%) | Ag Salt | % Ag Salt to Ag | Solvent | Melting* |
|---|---|---|---|---|---|---|---|
| H50-TEG | 47 | 1.4 | 101 | none | NA | TEG | N |
| H50-TEG-AgTFA | 48 | 1.4 | 106 | AgTFA | 5.4 | TEG | Y |
|  | 54 | 1.6 | 102 |  | 5.0 |  | Y |
|  | 51 | 1.5 | 103 |  | 5.4 |  | Y, ~57° C. |
| H50-TEG-AgTFA + PVP | 50 | 21.6 | 106 | AgHFB | 5.3 | TEG | Y |
| H50-TEG-AgAc | 51 | 1.5 | 104 | AgF | 5.2 | TEG | N |
| H50-TEG-AgClO$_4$ | 48 | 1.4 | 109 | AgTFA | 5.2 | TEG | Y, ~60° C. |
| H50-HMIPF$_6$-AgTFA | 51 | 1.5 | 100 | AgTFA | 5.1 | HMIPF$_6$ | N |
| H50-BC-AgTFA | 54 | 1.6 | 103 | AgTFA | 5.1 | BC | N |
| H50-BC-AgF | 52 | 1.5 | 102 | AgF | 5.0 | BC | N |
| H50-BTG-AgTFA | 51 | 1.5 | 102 | AgTFA | 5.3 | BTG | Y, ~60° C. |
| H50-EGBE-AgTFA | 57 | 1.5 | 92 | AgTFA | 5.3 | EGBE | N |
| H50-DEG-AgTFA | 50 | 1.5 | 104 | AgTFA | 5.2 | DEG | Y, ~48° C. |
| H50-DIW-AgTFA | 47 | 1.4 | 106 | AgTFA | 10.9 | DIW | N |
| H50-DIW-AgTFA | 56 | 1.7 | 93 | AgTFA | 5.1 | DIW | N |
| H50-DMA-AgTFA | 47 | 1.4 | 108 | AgTFA | 10.3 | DMAC | Y |
| H50-DMAC-AgTFA | 56 | 1.7 | 92 | AgTFA | 5.0 | DMAC | Y, ~50° C. |
| H50-BnOH-AgTFA | 51 | 1.5 | 101 | AgTFA | 5.1 | BnOH | Y, ~58° C. |

*Melting = Substantial Decrease in Viscosity from heating

Figure 30:
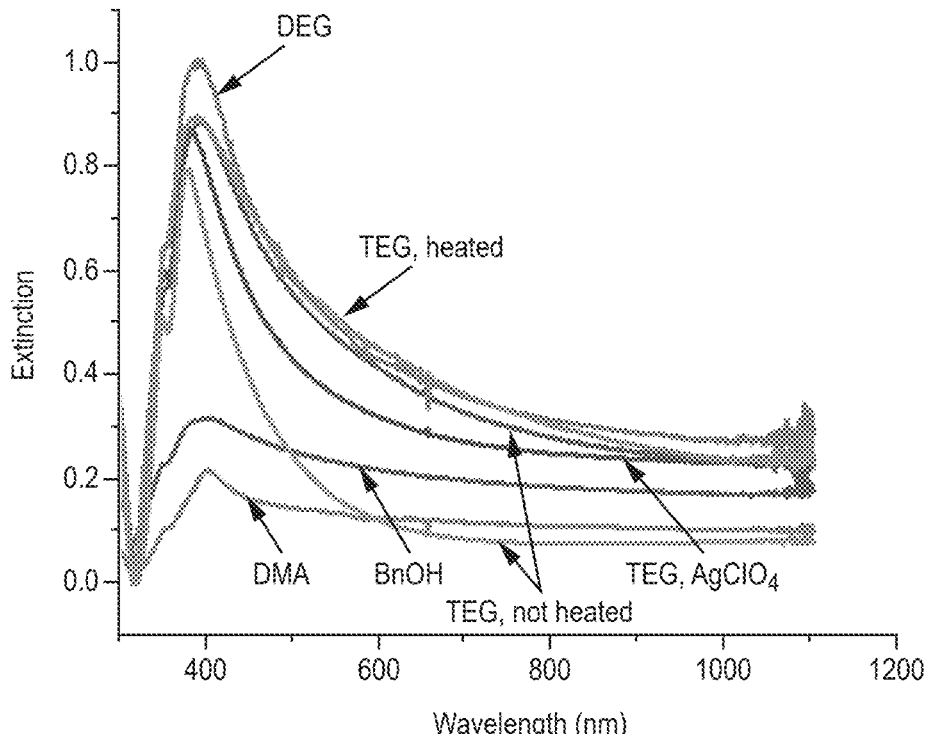
FIG. 30 shows UV-Vis absorption spectra for dispersions comprising H-NW at 50 wt % with silver trifluoroacetate (TFA) or silver perchlorate and prepared with different solvents.

UV-Vis absorption spectra for selected diluted samples are shown in FIG. 30. The two spectra labelled "TEG, not heated" correspond to repeats of H50-TEG-AgTFA that were not heated, and the spectrum labelled "TEG, heated" corresponds to one of the samples that was heated. Other spectra are labelled as follows: "DEG"=H50-DEG-AgTFA; "DMAc"=H50-DMAc-AgTFA; "BnOH"=H50-BnOH-AgTFA and "TEG, AgClO$_4$"=H50-TEG-AgClO$_4$.

Figure 31A:
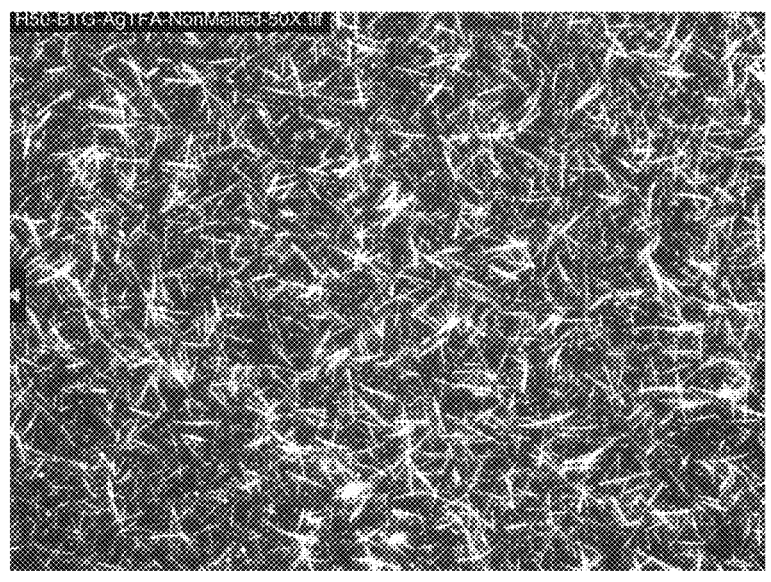
FIGS. 31A and 31B are images at 50× magnification for H-NW at 50 wt % in butoxytriglycol before and after heating in an oven for 5 minutes at 150° C., respectively.
Figure 31B:
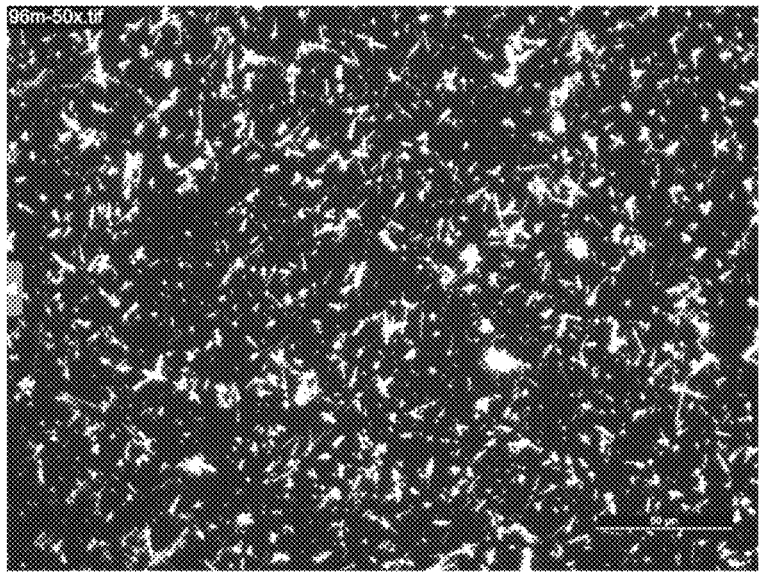

Images at 50× magnification obtained from optical microscopy for H50-BTG-AgTFA, before and after heating in an oven for 5 minutes at 150° C., are shown in FIGS. 31A and 31B, respectively.

Effects on conductivity properties for coatings dried under different conditions were investigated. Dispersions shown in Table 57 were prepared and dried using either IPL or in an oven for 30 minutes at 200° C. Resistivity of each coating was measured before and after treatment were measured and results are shown in Table 58.

TABLE 57

| H-NW/Ag Salt Dispersion | Ag (wt %) | PVP (wt %) | Recovery (%) | Ag Salt | % Ag Salt to Ag | Solvent |
|---|---|---|---|---|---|---|
| H40-TEG | 37 | 1.1 | 108 | none | NA | TEG |
| H40-TEG-AgTFA | 36 | 1.1 | 111 | AgTFA | 5.0 | TEG |
| H40-BC | 39 | 1.2 | 102 | none | NA | BC |
| H40-BC-AgTFA | 36 | 1.1 | 110 | AgTFA | 5.0 | BC |

TABLE 58

| H-NW/ NonAg Salt Dispersion | Treatment | Before Treatment Resistivity ρ, (Ω · cm) | After Treatment Resistivity ρ, (Ω · cm) |
|---|---|---|---|
| H40-TEG | IPL | 0.271 | 0.0172 |
|  | 30 min @ 200° C. | 0.316 | 0.00511 |
| H40-TEG-AgTFA | IPL | 2300 | 0.000105 |
|  | 30 min @ 200° C. | 12,600 | 0.000246 |
| H40-BC | IPL | OL[1] | 0.00532 |
|  | 30 min @ 200° C. | 2,040,000 | 0.0241 |
| H40-BC-AgTFA | IPL | 64,800 | 0.00224 |
|  | 30 min @ 200° C. | 59,300 | 0.000960 |

[1]above limit of multimeter

Example 14 H5 and H2 Nanowires and AgTFA in BC and ETG

H5 nanowires were prepared with average diameters of about 60 nm and average lengths of about 5 microns. H2 nanowires having an average length of about 2 microns were prepared by sonicating the H5 nanowires. Dispersions of the H2 nanowires at concentrations of about 60 wt % in BC and ETG were prepared with and without AgTFA as shown in Table 59. Dispersions of the H5 nanowires at concentrations of about 30 wt % were also prepared as shown in Table 59.

TABLE 59

| Dispersion | Ag (wt %) | Ag Salt | % Ag Salt to Ag | Solvent |
|---|---|---|---|---|
| H2A-BC | 60 | none | NA | BC |
| H2A-BC-AgTFA | 60 | AgTFA | 20 | BC |
| H2A-ETG | 60 | none | NA | ETG |
| H2A-ETG-AgTFA | 60 | AgTFA | 20 | ETG |
| H2B-BC | 60 | none | NA | BC |
| H2B-BC-AgTFA | 60 | AgTFA | 20 | BC |

TABLE 59-continued

| Dispersion | Ag (wt %) | Ag Salt | % Ag Salt to Ag | Solvent |
|---|---|---|---|---|
| H2B-ETG | 60 | none | NA | ETG |
| H2B-ETG-AgTFA | 60 | AgTFA | 20 | ETG |
| H5A-BC | 30 | none | NA | BC |
| H5A-BC-AgTFA | 30 | AgTFA | 20 | BC |
| H5A-ETG | 30 | none | NA | ETG |
| H5A-ETG-AgTFA | 30 | AgTFA | 20 | ETG |
| H5B-BC | 30 | none | NA | BC |
| H5B-BC-AgTFA | 30 | AgTFA | 20 | BC |
| H5B-ETG | 30 | none | NA | ETG |
| H5B-ETG-AgTFA | 30 | AgTFA | 20 | ETG |

Figure 32:
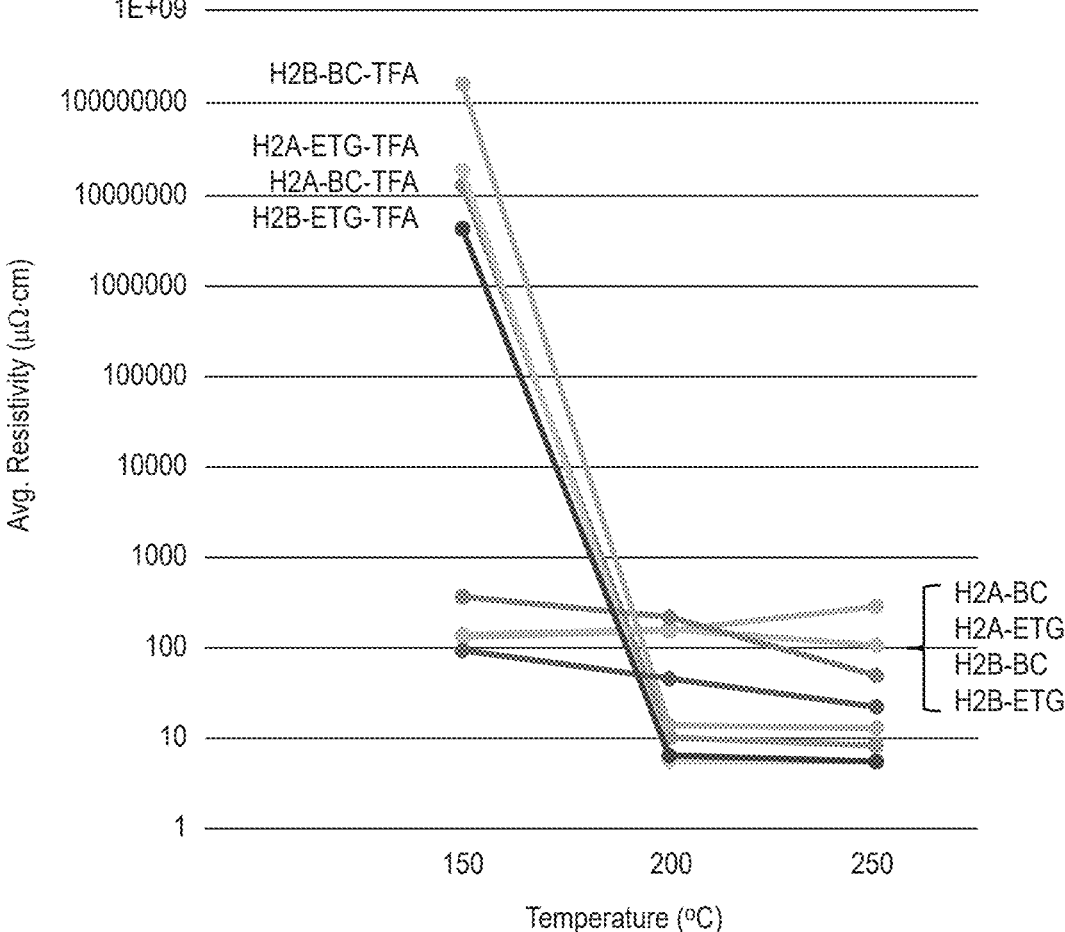
FIG. 32 shows a plot of average resisistivity as a function of temperature for H-NW having an average length of about 2 microns (H2) at 60 wt % in various solvents and with and without TFA.
Figure 33:
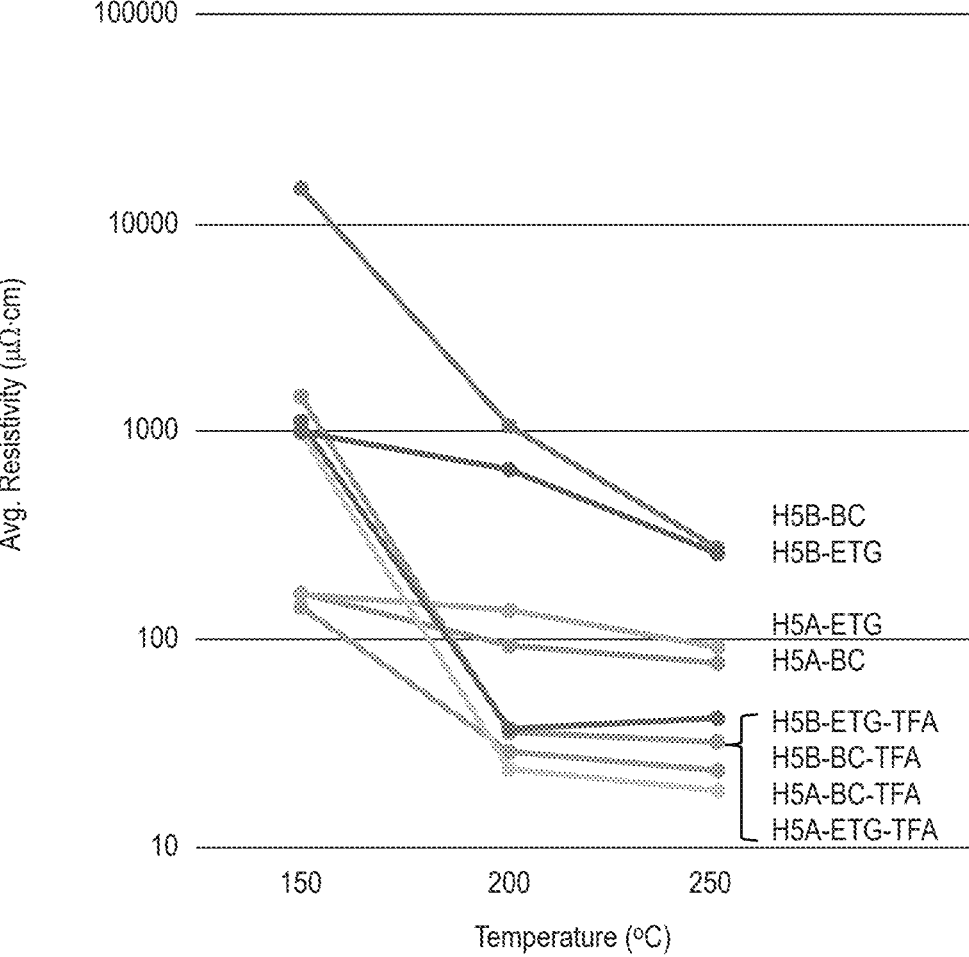
FIG. 33 shows a plot of average resisistivity as a function of temperature for H-NW having an average length of about 5 microns (H5) at 30 wt % in various solvents and with and without TFA.
Figure 34:
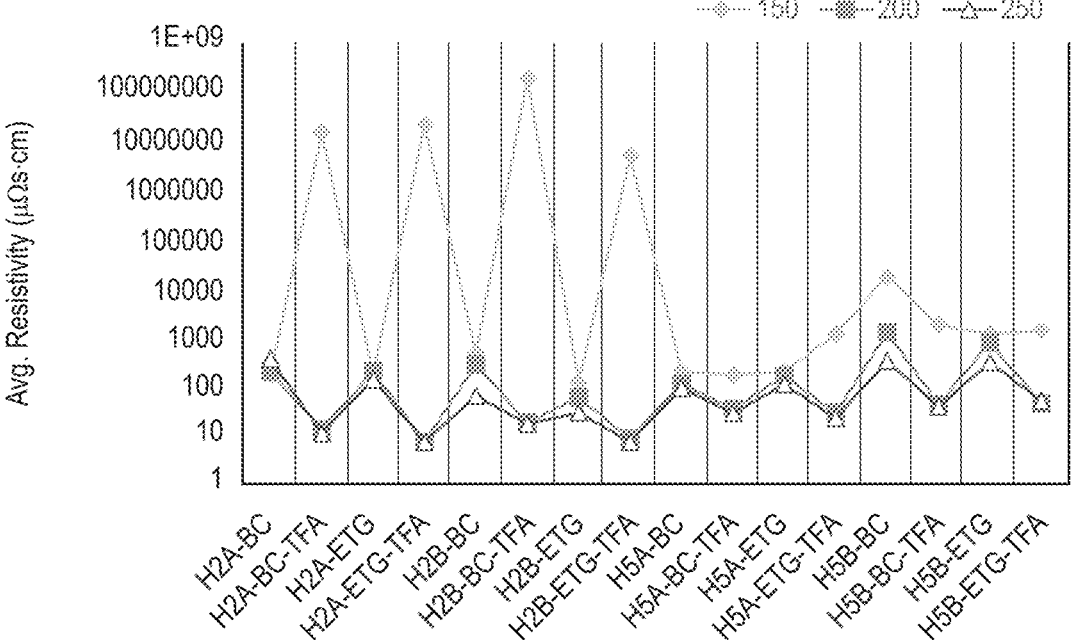
FIG. 34 shows a combination plot showing resistivities for both H2 and H5 nanowires of FIGS. 32 and 33.

Effects on conductivity properties for coatings dried under at different temperatures were investigated. Dispersions shown in Table 59 were prepared and dried in an oven for 30 minutes at temperatures of 150° C., 200° C. and 250° C. Resistivities are shown in Table 60. Resistivities for the H2 and H5 nanowire dispersions are plotted in FIGS. 32 and 33, respectively. A combination plot showing resistivities for both H2 and H5 nanowire dispersions is shown in FIG. 34.

TABLE 60

| Dispersion | Average Resistivity ρ, (μΩ · cm) | | |
|---|---|---|---|
|  | 150° C. | 200° C. | 250° C. |
| H2A-BC | 140 | 165 | 303 |
| H2A-BC-AgTFA | $1.27 \times 10^7$ | 11 | 9 |
| H2A-ETG | 149 | 171 | 114 |
| H2A-ETG-AgTFA | $1.89 \times 10^7$ | 6 | 6 |
| H2B-BC | 388 | 233 | 53 |
| H2B-BC-AgTFA | $1.67 \times 10^8$ | 15 | 14 |
| H2B-ETG | 100 | 49 | 24 |
| H2B-ETG-AgTFA | $4.32 \times 10^6$ | 7 | 6 |
| H5A-BC | 166 | 93 | 77 |
| H5A-BC-AgTFA | 143 | 29 | 23 |
| H5A-ETG | 164 | 1388 | 91 |
| H5A-ETG-AgTFA | 988 | 24 | 19 |
| H5B-BC | 14722 | 1056 | 274 |

TABLE 60-continued

| Dispersion | Average Resistivity ρ, (μΩ · cm) | | |
|---|---|---|---|
| | 150° C. | 200° C. | 250° C. |
| H5B-BC-AgTFA | 1466 | 36 | 32 |
| H5B-ETG | 989 | 654 | 258 |
| H5B-ETG-AgTFA | 1106 | 37 | 42 |

Figure 35A:
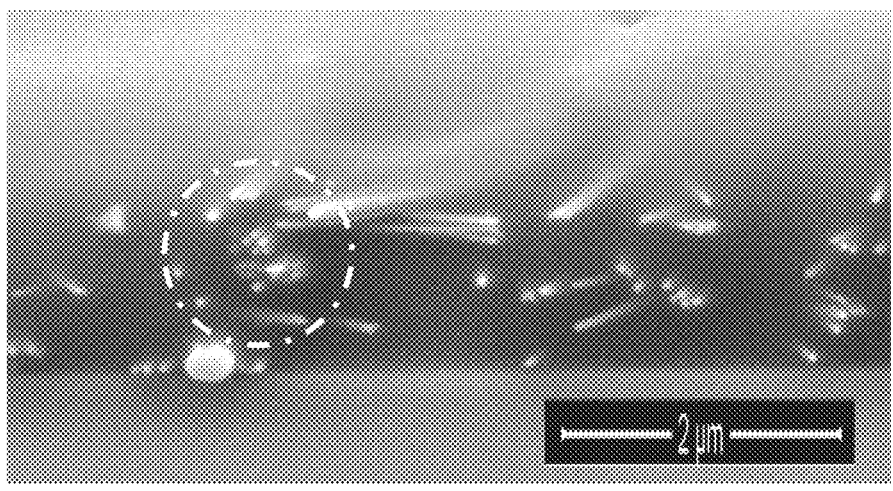
FIGS. 35A and 35B are images at 25,000× magnification for H2 nanowires at 60 wt % in butyl carbitol before and after heating for 5 minutes at 150° C., respectively.
Figure 35B:
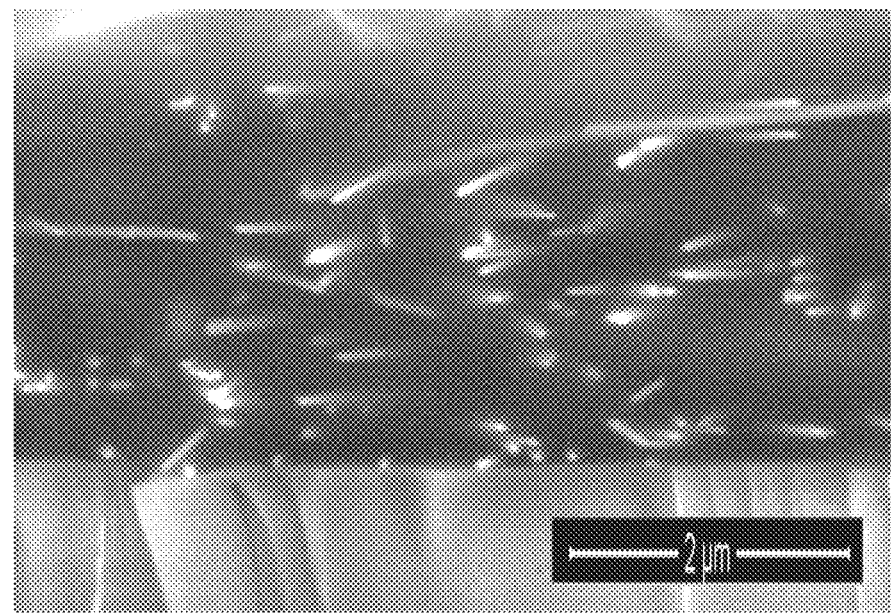

Dispersions of the H2 nanowires at concentrations of about 60 wt % in BC were prepared with and without AgTFA as shown in Table 61. Coatings were dried for 30 minutes at a temperature of 150° C. Resistivities are shown in Table 61. Images at 25,000× magnification obtained from optical microscopy for H260-BC and H260-BC-AgTFA (1% AgTFA to Ag) are shown in FIGS. 35A and 35B, respectively. The dotted circle in FIG. 35A indicates an example of aggregation of the nanowires which occurs to a greater extent when silver salt is not used to form the dispersion and coating.

TABLE 61

| Dispersion | % Ag Salt to Ag | Resistivity ρ, (Ω · cm) |
|---|---|---|
| H260-BC | 0 | $3.6 \times 10^{-4}$ |
| H260-BC-AgTFA | 1 | $9.3 \times 10^{-5}$ |
| H260-BC-AgTFA | 2 | $4.8 \times 10^{-5}$ |
| H260-BC-AgTFA | 4 | $2.3 \times 10^{-5}$ |
| H260-BC-AgTFA | 6 | $3.9 \times 10^{-5}$ |
| H260-BC-AgTFA | 10 | $1.1 \times 10^{-5}$ |
| H260-BC-AgTFA | 13 | $3.0 \times 10^{-5}$ |
| H260-BC-AgTFA | 20 | $8.1 \times 10^{-6}$ |

Further Inventive Concepts

A1. A flowable concentrated dispersion useful for forming conductive composites and adhesives, the dispersion comprising at least about 8 weight percent silver nanowires, a soluble polymeric dispersant, and a polar solvent comprising a liquid polymer precursor having functional group suitable for polymerization and/or crosslinking, wherein the silver nanowires are substantially non-aggregated and uniformly distributed and the dispersion exhibits a viscosity of at least about 100 cPs when subject to 0.1 $s^{-1}$ shear rates.

A2. The flowable concentrated dispersion of inventive concept A1 wherein the liquid polymer precursor comprises a monomer or oligomer that can be polymerized and/or crosslinked.

A3. The flowable concentrated dispersion of inventive concept A1 wherein the liquid polymer precursor comprises an acrylate monomer.

A4. The flowable concentrated dispersion of inventive concept A1 wherein the polar solvent further comprises water, an alcohol, a glycol, an amide, a glycol ether, a polar aprotic solvent, or mixtures thereof A5. The flowable concentrated dispersion of inventive concept A1 wherein the polar solvent further comprises water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, and mixtures thereof.

A6. The flowable concentrated dispersion of inventive concept A1 comprising at least about 15 wt % silver nanowires.

A7. The flowable concentrated dispersion of inventive concept A1 comprising at least about 20 wt % silver nanowires.

A8. The flowable concentrated dispersion of inventive concept A1 wherein the silver nanowires have an average aspect ratio from about 50 to about 500.

A9. The flowable concentrated dispersion of inventive concept A1 comprising from about 0.25 wt % polymer dispersant to about 20 wt % polymer dispersant relative to the silver nanowire weight, wherein the polymer dispersant comprises polyvinylpyrrolidone or a copolymer thereof.

A10. The flowable concentrated dispersion of inventive concept A1 wherein the viscosity at a shear rate of 0.1 $s^{-1}$ is from about 500 cP to about 5000 cP.

A11. The flowable concentrated dispersion of inventive concept A1 further comprising a salt providing up to about 50 wt % silver ions relative to the weight of silver nanowires.

A12. The flowable concentrated dispersion of inventive concept A11 further comprising a reducing agent additive at a concentration from about 0.001 mM to about 1000 mM.

A13. The flowable concentrated dispersion of inventive concept A1 wherein the flowable concentrated dispersion is observed to be shear thinning.

A14. The flowable concentrated dispersion of inventive concept A1 wherein the silver nanowires have an average diameter from about 35 nm to about 80 nm.

A15. The flowable concentrated dispersion of inventive concept A1 wherein flow is observed is a quantity of the flowable concentrated dispersion is placed on a surface at a 60 degree angle from the horizontal.

A16. A solid material comprising the flowable concentrated dispersion of inventive concept A1 following curing.

A17. A solid material comprising the flowable concentrated dispersion of inventive concept A11 following curing.

B1. A flowable dispersion of silver nanowires comprising polar solvent, at least about 5 wt % silver nanowires, polymer dispersant and silver salt in an amount at least about 1 wt % of the silver nanowire weight, wherein the silver nanowires have an average aspect ratio from about 30 to about 1000, wherein the dispersion has a non-Newtonian viscosity at a shear rate of 0.1 $s^{-1}$.

B2. The flowable dispersion of silver nanowires of inventive concept B1 wherein the dispersion exhibits no visible settling over the course of a week and wherein dilution of the dispersion with isopropyl alcohol to a concentration of 0.1 wt % results in a stable dispersion.

B3. The flowable dispersion of silver nanowires of inventive concept B1 comprising at least about 8 wt % silver nanowires and from about 5 wt % to about 50 wt % silver ions relative to the weight of silver nanowires.

B4. The flowable dispersion of silver nanowires of inventive concept B1 wherein the polar solvent comprises water, an alcohol, a glycol, an amide, a glycol ether, a polar aprotic solvent, or mixtures thereof B5. The flowable dispersion of silver nanowires of inventive concept B1 wherein the polar solvent comprises water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, and mixtures thereof.

B6. The flowable dispersion of silver nanowires of inventive concept B1 wherein the polar solvent comprises a monomer or oligomer that can be polymerized and/or crosslinked.

B7. The flowable dispersion of silver nanowires of inventive concept B1 wherein the polar solvent comprises an acrylate monomer.

B8. The flowable dispersion of silver nanowires of inventive concept B1 comprising at least about 15 wt % silver nanowires.

B9. The flowable dispersion of silver nanowires of inventive concept B1 comprising at least about 20 wt % silver nanowires.

B10. The flowable dispersion of silver nanowires of inventive concept B1 wherein the silver nanowires have an average aspect ratio from about 50 to about 500.

B11. The flowable dispersion of silver nanowires of inventive concept B1 further comprising from about 0.1 wt % polymer dispersant to about 5 wt % polymer dispersant, wherein the polymer dispersant comprises polyvinylpyrrolidone or copolymers thereof.

B12. The flowable dispersion of silver nanowires of inventive concept B1 wherein the viscosity at a shear rate of 0.1 s$^{-1}$ is at least 100 cP.

B13. The flowable dispersion of silver nanowires of inventive concept B1 further comprising a salt providing up to about 50 wt % silver ions relative to the weight of silver nanowires.

B14. The flowable dispersion of silver nanowires of inventive concept B1 wherein the non-Newtonian behavior is observed to be shear thinning.

B15. The flowable dispersion of silver nanowires of inventive concept B1 wherein the silver nanowires have an average diameter from about 35 nm to about 80 nm.

B16. The flowable dispersion of silver nanowires of inventive concept B1 wherein flow is observed is a quantity of the flowable concentrated dispersion is placed on a surface at a 60 degree angle from the horizontal.

B17. The flowable dispersion of silver nanowires of inventive concept B1 further comprising a reducing agent additive in a concentration from about 0.001 mM to about 1000 mM.

C1. An electrically conductive material comprising at least about 95 wt % silver, wherein the silver has a structure formed from the reduction of silver salt in the presence of a silver nanowire deposit comprising at least about 50 wt % of the silver originating from silver nanowires having an aspect ratio of at least about 30.

C2. The electrically conductive material of inventive concept C1 wherein the silver is formed from a reduced silver salt and at least about 75 wt % silver nanowires having an aspect ratio of at least about 50.

C3. The electronically conductive material of inventive concept C1 comprising from about 0.1 wt % to about 5 wt % polymer dispersant.

C4 The electrically conductive material of inventive concept C1 wherein the silver is formed from at least about 90 wt % silver nanowires.

C5. The electronically conductive material of inventive concept C1 wherein silver from in situ reduced silver ions are from about 5 wt % to about 30 wt % relative to the weight of the silver nanowires.

C6. The electronically conductive material of inventive concept C1 having a resistivity of no more than about $1\times10^4$ Ohm-cm.

C7. The electronically conductive material of inventive concept C1 having a resistivity from about $5\times10^{-5}$ Ohm-cm to about $4\times10^{-6}$ Ohm-cm.

D1. A silver paste consisting essentially of a uniform distribution of silver nanowires and optional additional silver nanostructures, a polymer dispersant, optionally a salt providing up to about 50 wt % metal ions relative to the weight of silver nanowires, and polar solvent, wherein the dispersion is stable with respect to phase separation and does not flow under zero shear, and wherein dilution and non-damaging mixing of the electrically conductive dispersion with isopropyl alcohol to a metal concentration of 0.1 weight percent results in a well dispersed solution.

D2. The silver paste of inventive concept D1 wherein the silver nanowires have an average aspect ratio of at least about 250 and the total metal concentration is at least about 12 wt % with at least about 80 wt % of the metal being silver nanowires.

D3. The silver paste of inventive concept D1 wherein the silver nanowires have an average aspect ratio from about 15 to about 250 and the total metal concentration is at least about 25 wt % with at least about 80 wt % of the metal being silver nanowires.

D4. The silver paste of inventive concept D1 wherein the total metal concentration is at least about 40 wt %.

D5. The silver paste of inventive concept D1 having no more than about 20 weight percent polymer dispersant.

D6. The silver paste of inventive concept D1 wherein the polymer dispersant comprises polyvinylpyrrolidone or copolymers thereof.

D7. The silver paste of inventive concept D1 further comprising a salt providing up to about 50 wt % silver ions relative to the weight of silver nanowires.

D8. The silver paste of inventive concept D1 wherein the silver paste can be spread with the application of shear and, on a surfaced inclined 60 degrees from the horizontal, does not flow.

D9. The silver paste of inventive concept D1 wherein the polar solvent comprises water, an alcohol, a glycol, an amide, a glycol ether, a polar aprotic solvent, or mixtures thereof D10. The silver paste of inventive concept D1 wherein the polar solvent comprises water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, and mixtures thereof.

D11. The silver paste of inventive concept D1 wherein the polar solvent comprises a monomer or oligomer that can be polymerized and/or crosslinked.

D12. The silver paste of inventive concept D1 wherein the polar solvent comprises an acrylate monomer.

D13. The silver paste of inventive concept D1 having a resistivity of no more than about $5\times10^{-2}$ Ohm-cm.

E1. A method of forming a concentrated silver nanowire dispersion, the method comprising:

evaporating a low boiling temperature solvent component of a silver nanowire dispersion comprising a polar solvent, wherein the low boiling temperature solvent component has a boiling point at atmospheric pressure of no more than about 125° C. and wherein removal of the low boiling temperature solvent results in the formation of a well dispersed concentrated silver nanowire dispersion with a solid concentration of at least about 5 wt %, wherein prior to evaporating the low boiling temperature solvent component, the silver nanowire dispersion is a stable dispersion with no more than about 10 wt % silver nanowires.

E2. The method of inventive concept E1 wherein a silver salt is added to the silver nanowire dispersion with the low boiling solvent in an amount from about 1 wt % silver ions to about 50 wt % silver ions relative to the silver nanowire weight. E3. The method of inventive concept E1 wherein the low boiling solvent is replaced with a higher boiling point solvent and wherein the low boiling point solvent comprise an alcohol.

E4. The method of inventive concept E3 wherein the alcohol is ethanol or isopropanol.

E5. The method of inventive concept E3 wherein the higher boiling point solvent comprises water, an alcohol, a glycol, an amide, a glycol ether, a polar aprotic solvent, or mixtures thereof E6. The method of inventive concept E3 wherein the higher boiling point solvent comprises water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, and mixtures thereof.

E7. The method of inventive concept E3 wherein the amount of higher boiling point solvent is selected to yield a desired silver concentration following effective removal of the lower boiling point solvent.

E8. The method of inventive concept E3 wherein the higher boiling point solvent comprises a monomer or oligomer that can be polymerized and/or crosslinked.

E9. The method of inventive concept E2 wherein the silver salt comprises silver acetate($Ag(O_2CCH_3)$), silver trifluoroacetate ($Ag(O_2CCF_3)$), silver heptafluorobutyrate ($Ag(O_2CC_3F_7)$), silver lactate ($Ag(O_2CCH(OH)CH_3)$), silver hexafluoroantimonate ($AgSbF_6$), silver fluoride (AgF), silver tetrafluoroborate ($AgBF_4$), silver nitrate ($AgNO_3$), silver perchlorate ($AgClO_4$), or mixtures thereof.

E10. The method of inventive concept E1 wherein following removal of low boiling temperature solvent component, the concentrated silver nanowire dispersion comprises from about 10 wt % silver nanowires to about 70 wt % silver nanowires.

E11. The method of inventive concept E10 wherein the concentrated silver nanowire dispersion comprises from about 2.5 wt % to about 40 wt % silver ions relative to the silver nanowire weight.

E12. The method of inventive concept E1 wherein the concentrated silver nanowire dispersion is flowable.

E13. The method of inventive concept E12 wherein the concentrated silver nanowire dispersion has non-Newtonian behavior.

E14. The method of inventive concept E1 wherein the concentrated silver nanowire dispersion is a paste.

E15. A method of forming a conductive silver based material, the method comprising:
forming a concentrated silver nanowire dispersion according to the method of inventive concept E1; and
curing the concentrated silver nanowire dispersion to form the conductive silver based material.

F1. A method for forming an electrically conductive solid structure comprising silver, the method comprising:
heating a three dimensional deposit comprising silver nanowires and silver salt at a temperature of at least about 120° C. for at least about 5 minutes to reduce the silver salt to form the electrically conductive solid structure, the deposit prior to curing having at least about 25 wt % silver nanowires and at least about 1 wt % silver ions relative to the silver nanowire weight.

F2. The method of inventive concept F1 wherein the three dimensional deposit comprises a concentrated silver nanowire dispersion comprising a polar solvent, and the method further comprises removing the polar solvent by blowing gas across the three dimensional deposit.

F3. The method of inventive concept F2 wherein the polar solvent comprises water, an alcohol, a glycol, an amide, a glycol ether, a polar aprotic solvent, or mixtures thereof.

F4. The method of inventive concept F2 wherein the concentrated silver nanowire dispersion comprises a monomer or oligomer that can be polymerized and/or crosslinked.

F5. The method of inventive concept F4 wherein the monomer or oligomer is thermally polymerized and/or crosslinked.

F6. The method of inventive concept F2 wherein dilution of the concentrated silver nanowire dispersion with isopropyl alcohol to a concentration of 0.1 wt % results in a stable dispersion.

$F_7$. The method of inventive concept F2 wherein the concentrated silver nanowire dispersion has non-Newtonian rheology.

F8. The method of inventive concept F1 wherein the heating is to a temperature of t least about 150° C. for at least about 30 minutes.

F9. The method of inventive concept F1 wherein blowing is provided to facilitate solvent removal.

F10. The method of inventive concept F1 wherein reduced pressure is applied to facilitate solvent removal.

F11. The method of inventive concept F1 wherein the heating results in a cured material comprising at least about 25 wt % silver that forms the electrically conductive solid structure.

F12. The method of inventive concept F11 wherein the cured material comprises a polymer matrix and from about 5 wt % to about 75 wt % organic compositions.

F13. The method of inventive concept F11 wherein the cured material comprises at least about 95 wt % silver.

F14. The method of inventive concept F11 wherein the cured material comprises at least about 75 wt % silver and at least about 5 wt % organic compositions.

F15. The method of inventive concept F1 wherein the electrically conductive solid structure has a resistivity of no more than about $1\times10^4$ Ohm-cm.

F16. The method of inventive concept F1 wherein the electrically conductive solid structure has a resistivity from about $5\times10^{-5}$ Ohm-cm to about $4\times10^{-6}$ Ohm-cm.

F17. The method of inventive concept F1 wherein the conductive solid structure is opaque and has an average thickness of at least about 2 microns.

G1. A composite material in an opaque structure comprising at least about 5 wt % of a polymer matrix and at least about 25 wt % silver, wherein the silver is formed with a mass of silver nanowires in a three dimensional structure through which silver salt is reduced to silver metal to contribute to an electrical conductive composite.

G2. The composite material of inventive concept G1 where in the polymer matrix is thermally crosslinked.

G3. The composite material of inventive concept G1 comprising at least about 50 wt % silver.

G4. The composite material of inventive concept G1 comprising from about 75 wt % silver to about 90 wt % silver.

G5. The composite material of inventive concept G1 wherein silver from reduced silver is from about 2 wt % to about 40 wt % relative to the silver nanowires.

G6. The composite material of inventive concept G1 wherein silver from reduced silver is from about 2.5 wt % to about 40 wt % relative to the silver nanowires.

G7. The composite material of inventive concept G1 wherein the silver nanowires have an aspect ratio of at least about 75.

G8. The composite material of inventive concept G1 wherein the silver nanowires have an average diameter from about 35 nm to about 80 nm.

G9. The composite material of inventive concept G1 wherein the matrix polymer is a ispolyethylene terephthalate (PET), polyethylene naphthalate (PEN), polyacrylate, poly(methyl methacrylate), polyamide, polyimide, polysulfone, polysiloxane, polyester, epoxy, polyurethane, polyvinyl alcohol, polyvinyl acetate, copolymers thereof, or blends of these polymers.

G10. The composite material of inventive concept G1 further comprising from about 0.1 wt % and 5 wt % polymer dispersant.

G11. The composite material of inventive concept G1 having a resistivity of no more than about $1 \times 10^{-3}$ Ohm·cm.

G12. The composite material of inventive concept G1 having a resistivity from about $5 \times 10^{-5}$ Ohm-cm to about $4 \times 10^{-6}$ Ohm-cm.

H1. A dispersion of silver nanowires consisting essentially of a uniform distribution of at least about 8 wt % silver nanowires and optional additional silver nanostructures, polymer dispersant, optionally a silver salt providing at least about 0.5 wt % silver ions relative to the silver nanowire weight, and polar solvent, wherein the dispersion is stable with respect to phase separation, and wherein dilution and non-damaging mixing of the electrically conductive dispersion with isopropyl alcohol to a metal concentration of 1 weight percent results in a well dispersed solution.

H2. The dispersion of silver nanowires of inventive concept H1 wherein the silver nanowires have an average aspect ratio of at least about 250 and the total metal concentration is at least about 12 weight percent.

H3. The dispersion of silver nanowires of inventive concept H1 wherein the silver nanowires have an average aspect ratio from about 15 to about 250 and the total metal concentration is at least about 25 wight percent.

H4. The dispersion of silver nanowires of inventive concept H1 wherein the total metal concentration is at least about 40 weight percent.

H5. The dispersion of silver nanowires of inventive concept H1 having no more than about 20 weight percent polymer dispersant.

H6. The dispersion of silver nanowires of inventive concept H1 wherein the polymer dispersant comprises polyvinylpyrrolidone, and wherein the silver dispersion has from about 0.1 wt % to about 5 wt % polyvinylpyrrolidone and/or copolymers thereof relative to the silver weight.

H7. The dispersion of silver nanowires of inventive concept H1 wherein the dispersion is flowable.

H8. The dispersion of silver nanowires of inventive concept H1 wherein the dispersion is non-flowable paste.

H9. The dispersion of silver nanowires of inventive concept H1 wherein the dispersion exhibits no visible settling over the course of a week and wherein dilution of the dispersion with isopropyl alcohol to a concentration of 0.1 wt % results in a stable dispersion.

H10. The dispersion of silver nanowires of inventive concept H1 comprising at least about 8 weight silver nanowires and from about 5 wt % to about 50 wt % silver ions relative to the weight of silver nanowires.

H11. The dispersion of silver nanowires of inventive concept H1 wherein the polar solvent comprises water, an alcohol, a glycol, an amide, a glycol ether, a polar aprotic solvent, or mixtures thereof H12. The dispersion of silver nanowires of inventive concept H1 wherein the polar solvent comprises water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, and mixtures thereof.

H13. The dispersion of silver nanowires of inventive concept H1 wherein the polar solvent comprises a monomer or oligomer that can be polymerized and/or crosslinked.

H14. The dispersion of silver nanowires of inventive concept H1 comprising at least about 15 wt % silver nanowires.

H15. The dispersion of silver nanowires of inventive concept H1 comprising at least about 20 wt % silver nanowires.

H16. The dispersion of silver nanowires of inventive concept H1 wherein the silver nanowires have an average aspect ratio from about 40 to about 500.

H17. The dispersion of silver nanowires of inventive concept H1 wherein the viscosity at a shear rate of 0.1 $s^{-1}$ is at least 100 cP.

H18. The dispersion of silver nanowires of inventive concept H1 further comprising a salt providing up to about 50 wt % silver ions relative to the weight of silver nanowires.

H19. The dispersion of silver nanowires of inventive concept H1 wherein the non-Newtonian behavior is observed to be shear thinning.

H20. The dispersion of silver nanowires of inventive concept H1 wherein the silver nanowires have an average diameter from about 35 nm to about 80 nm.

H21. The dispersion of silver nanowires of inventive concept H1 wherein flow is observed is a quantity of the flowable concentrated dispersion is placed on a surface at a 60 degree angle from the horizontal.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term "about" herein refers to expected uncertainties in the associated values as would be understood in the particular context by a person of ordinary skill in the art.

What is claimed is:

1. A flowable concentrated dispersion comprising polar solvent, at least about 8 wt % silver nanowires, and from about 0.1 wt % to about 60 wt % soluble polymer dispersant relative to the silver concentration, wherein the silver nanowires have an average aspect ratio of at least about 25, wherein the dispersion has a non-Newtonian viscosity, wherein the dispersion exhibits no visible settling over the course of a week and wherein dilution of the dispersion with isopropyl alcohol to a concentration of 0.1 wt % results in a stable dispersion.

2. The flowable concentrated dispersion of claim 1 wherein the polar solvent comprises water, an alcohol, a glycol, an amide, a glycol ether, a polar aprotic solvent, or mixtures thereof.

3. The flowable concentrated dispersion of claim 1 wherein the polar solvent comprises water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, or mixtures thereof.

4. The flowable concentrated dispersion of claim 1 wherein the polar solvent comprises a monomer or oligomer that can be polymerized and/or crosslinked.

5. The flowable concentrated dispersion of claim 1 wherein the polar solvent comprises an acrylate monomer.

6. The flowable concentrated dispersion of claim 1 comprising at least about 15 wt % silver nanowires.

7. The flowable concentrated dispersion of claim 1 comprising at least about 20 wt % silver nanowires.

8. The flowable concentrated dispersion of claim 1 wherein the silver nanowires have an average aspect ratio from about 50 to about 500.

9. The flowable concentrated dispersion of claim 1 comprising from about 0.1 wt % polymer dispersant to about 20 wt % polymer dispersant, wherein the polymer dispersant comprises polyvinylpyrrolidone.

10. The flowable concentrated dispersion of claim 1 wherein the viscosity at a shear rate of $0.1 \text{ s}^{-1}$ is at least about 100 cP.

11. The flowable concentrated dispersion of claim 1 further comprising a silver salt providing up to about 50 wt % silver ions relative to the weight of silver nanowires.

12. The flowable concentrated dispersion of claim 11 further comprising a reducing agent additive having a concentration from about 0.001 mM to about 1000 mM.

13. The flowable concentrated dispersion of claim 1 wherein the non-Newtonian behavior is observed to be shear thinning.

14. The flowable concentrated dispersion of claim 1 wherein the silver nanowires have an average diameter from about 35 nm to about 80 nm.

15. The flowable concentrated dispersion of claim 1 wherein flow is observed is a quantity of the flowable concentrated dispersion is placed on a surface at a 60 degree angle from the horizontal.

* * * * *